United States Patent
Shiozaki et al.

(10) Patent No.: US 7,093,434 B2
(45) Date of Patent: Aug. 22, 2006

(54) HYDRAULIC CONTINUOUSLY VARIABLE TRANSMISSION AND POWER TRANSMISSION APPARATUS

(75) Inventors: Shuji Shiozaki, Osaka (JP); Takeshi Oouchida, Osaka (JP); Hiroshi Matsuyama, Osaka (JP); Hisanori Mori, Osaka (JP); Kunihiko Sakamoto, Osaka (JP); Yukio Kubota, Osaka (JP)

(73) Assignee: Yanmar Co., Ltd., (JP)

( * ) Notice: Subject to any disclaimer, the term of this patent is extended or adjusted under 35 U.S.C. 154(b) by 136 days.

(21) Appl. No.: 10/482,071

(22) PCT Filed: Jun. 18, 2002

(86) PCT No.: PCT/JP02/06051

§ 371 (c)(1),
(2), (4) Date: Dec. 23, 2003

(87) PCT Pub. No.: WO03/002894

PCT Pub. Date: Jan. 9, 2003

(65) Prior Publication Data

US 2004/0182076 A1    Sep. 23, 2004

(30) Foreign Application Priority Data

| Jun. 28, 2001 | (JP) | 2001-196295 |
| Jun. 28, 2001 | (JP) | 2001-196296 |
| Jun. 28, 2001 | (JP) | 2001-196297 |
| Jun. 28, 2001 | (JP) | 2001-196299 |

(51) Int. Cl.
    *F16D 31/02*    (2006.01)
(52) U.S. Cl. ..................................... 60/489
(58) Field of Classification Search ............... 60/489
    See application file for complete search history.

(56) References Cited

U.S. PATENT DOCUMENTS 4,854,125 A  *  8/1989  Inoue ..................... 60/489
6,122,914 A     9/2000  Hayashi et al.

FOREIGN PATENT DOCUMENTS

JP        2002-31209        1/2002

* cited by examiner

*Primary Examiner*—F. Daniel Lopez
(74) *Attorney, Agent, or Firm*—Caesar, Rivise, Bernstein, Cohen & Pokotilow, Ltd.

(57) ABSTRACT

A hydraulic continuously variable transmission has a variable displacement type first hydraulic system having a first plunger and a plunger abutting section which actuates the first plunger, and a second hydraulic system having a second plunger and provided with an output rotary section which rotates with abutment on the second plunger. A cylinder block rotates about an axis and has a first plunger hole and a second plunger hole which respectively retain the first and second plungers. A hydraulic closing circuit connects the first and second plunger holes and circulates a working oil between the first and second plunger holes. The continuously variable transmission has a distributing valve for controlling circulation of the working oil in the hydraulic closing circuit, a valve hole, formed in the cylinder block, for retaining the distributing valve, and a shaft which penetrates the cylinder block. The shaft and the cylinder block rotate synchronously and the output rotary section is rotatably supported around the shaft. The valve hole is formed in parallel to the shaft, and restriction means is arranged inclined with respect to the shaft and rotates in synchronism with the cylinder block to reciprocate the distributing valve with the distributing valve being restricted.

8 Claims, 45 Drawing Sheets

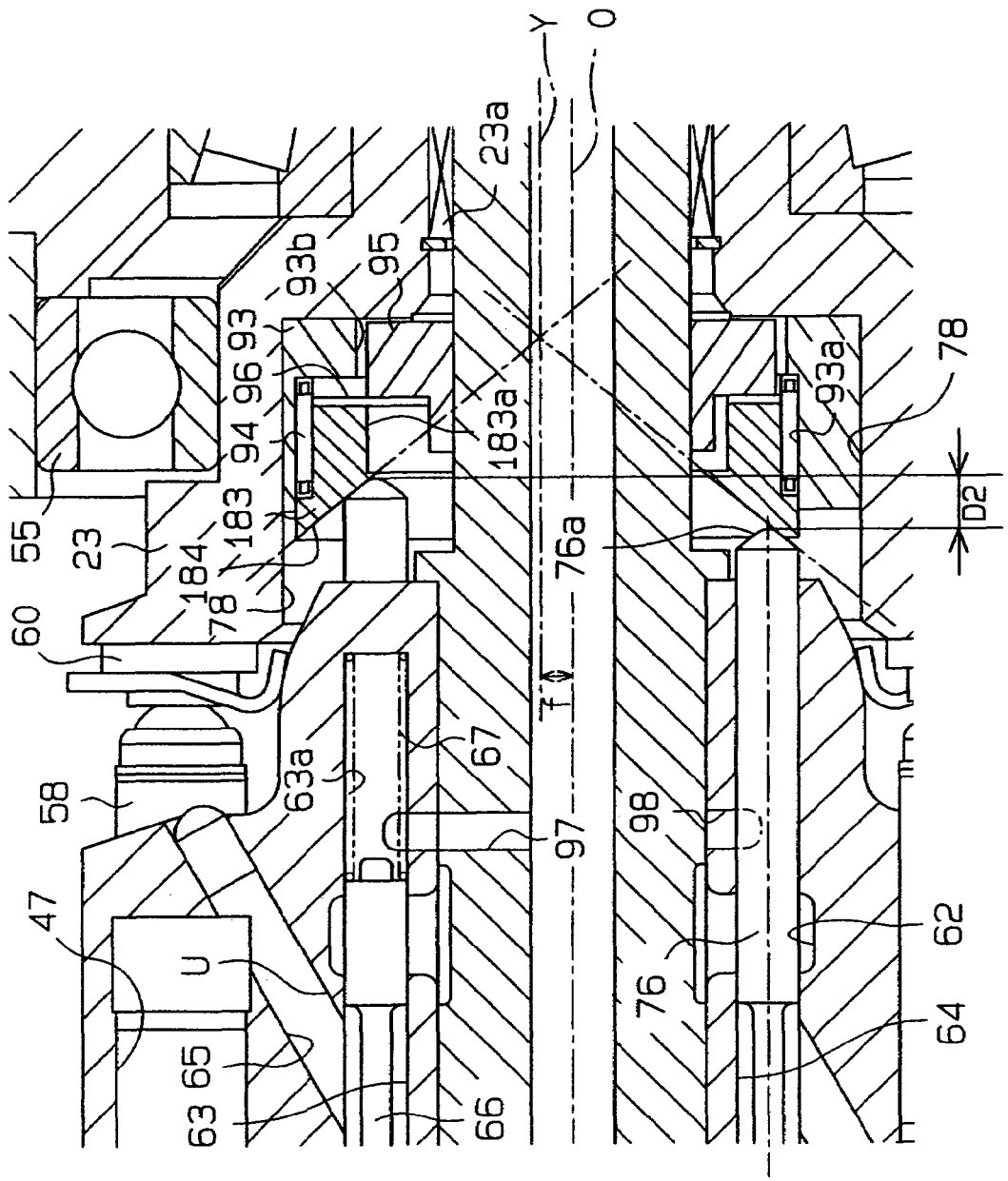

Speed Up: $N_{out} \geq N_{in}$

Slow Down: $0 < N_{out} \leq N_{in}$

Reverse Movement: $N_{out} \leq 0$
Satisfied When $V_{pmax} > V_{mmax}$

Speed Up: $N_{out} \geq N_{in}$

Slow Down: $0 < N_{out} \leq N_{in}$

HYDRAULIC CONTINUOUSLY VARIABLE TRANSMISSION AND POWER TRANSMISSION APPARATUS

FIELD OF THE INVENTION

The present invention relates to a hydraulic continuously variable transmission and a power transmission apparatus which can be used widely in various industrial fields, such as industrial machines and vehicles.

BACKGROUND OF THE INVENTION

There is known a conventional hydraulic continuously variable transmission equipped with a first hydraulic system which discharges and intakes a working oil by reciprocation of a plurality of plungers and a second hydraulic system having an output rotary section which acquires output rotation with abutment on a plurality of plungers. The first and second hydraulic systems of such a hydraulic continuously variable transmission share a cylinder block and the same cylinder block rotates about its longitudinal axis.

The cylinder block is provided with a plurality of first plunger chambers in which a plurality of first plungers in the first hydraulic system are retained, a plurality of second plunger chambers in which a plurality of second plungers in the second hydraulic system are retained, and a hydraulic closing circuit for circulating a working oil between the first and second plunger chambers. The reciprocation of a plurality of distributing valves provided on the cylinder block circulates the working oil between the first and second plunger chambers.

In such a hydraulic continuously variable transmission, conventionally, each distributing valve is arranged in parallel to the axis of the cylinder block and the distal end of the distributing valve is made to abut on a swash plate in order to impart axial reciprocation to each distributing valve.

According to the prior art, as the distal end of the distributing valve is made to abut on the swash plate, the distributing valve reciprocates in the axial direction while each distributing valve makes one turn around the axis of the cylinder block. In such a structure, each distributing valve is pressed against the swash plate, and pressing means, such as a spring, is needed.

Further, as shown in FIG. 21, a cylinder block 311 in the conventional continuously variable transmission is provided with a plurality of plunger holes 312 and valve holes 313 which constitute a hydraulic closing circuit. Plungers 314 and selector valves 315 for causing the working oil to produce a predetermined flow operation in the hydraulic closing circuit are respectively disposed in the plunger holes 312 and the valve holes 313. The plunger holes 312 and the valve holes 313 are laid out around the longitudinal axis of the cylinder block 311 and communicate with one another via a fluid passage 317. First and second hydraulic chambers 318 and 319, formed in a ring shape around the longitudinal axis of the cylinder block 311, are provided side-by-side in the axial direction of the cylinder block 311 and communicate with all the valve holes 313 provided in the cylinder block 311.

The selector valve 315 has first to third land portions 316a to 316c formed with approximately the same diameter as the diameter of the valve hole 313, and is formed into the shape of a spool. As the selector valve 315 reciprocates in the valve hole 313, the fluid passage is changed over in such a way that the working oil flows to the fluid passage 317 (plunger hole 312) and either the first or second hydraulic chamber 318, 319.

Since the fluid passage for the working oil is changed over by reciprocation of the selector valve 315 in the conventional apparatus, there is a position where the working oil is not exchanged between the fluid passage 317 and the valve hole 313 (i.e., the first and second hydraulic chambers 318 and 319) during reciprocation of the selector valve 315. The position of the selector valve 315 at this time is called a seal position. When the selector valve 315 is positioned at the seal position, as shown in FIG. 21, a port 320 which is the merging section of the fluid passage 317 and the valve hole 313 is closed by the second land portion 316b of the selector valve 315. As a result, the exchange of the working oil between the fluid passage 317 and the valve hole 313 (first and second hydraulic chambers 318 and 319) does not take place.

In the case structure where the port 320 is closed merely by the second land portion 316b at the time the selector valve 315 is positioned at the seal position, however, pressure is applied intensively to a part of the outer surface of the second land portion 316b by the working oil staying in the fluid passage 317. As a result, the reciprocation of the selector valve 315 may not be carried out smoothly in the valve hole 313.

As shown in FIG. 22, therefore, one may think of a structure in which a diameter-widened portion 321 is formed by widening the portion of the valve hole 313 that corresponds to the port 320, and the diameter-widened portion 321 is caused to face the second land portion 316b at the time the selector valve 315 is positioned at the seal position. This permits the working oil to stay over the peripheral surface of the second land portion 316b even when the working oil is exchanged between the fluid passage 317 and the valve hole 313 (first and second hydraulic chambers 318 and 319). As a result, the reciprocation of the selector valve 315 is performed smoothly without intensive application of pressure to a part of the outer surface of the second land portion 316b by the working oil remaining in the fluid passage 317.

However, the diameter-widened portion 321 is formed at that portion of the valve hole 313 that corresponds to the port 320 located in the lengthwise middle portion thereof. In the fabrication process for the cylinder block 311, therefore, the following problem arises at the time of forming the diameter-widened portion 321 of the valve hole 313. That is, normally, the valve hole 313 is formed by boring a hole with a predetermined diameter by a drill or the like first, then cutting work is performed on the diameter-widened portion 321. At this time, to form the diameter-widened portion 321, a thin tool with an L shape, for example, should be used and should be inserted through the opening of the valve hole 313 for the cutting work. This requires very difficult work in forming the diameter-widened portion 321 and leads to the problem of an increased number of working steps.

The present invention has been devised in consideration of the above-described situations, and aims at providing a hydraulic continuously variable transmission and a power transmission apparatus which can simplify the structure for reciprocating each distributing valve and forming a valve hole simply and easily.

SUMMARY OF THE INVENTION

To solve the problems described above, a hydraulic continuously variable transmission according to an embodiment of the present invention has a variable displacement type first hydraulic system having a first plunger and a plunger abutting section which actuates the first plunger, and a second hydraulic system having a second plunger and provided with an output rotary section which rotates with abutment on the second plunger. A cylinder block rotates about an axis and has a first plunger hole and a second plunger hole which respectively retain the first and second plungers. A hydraulic closing circuit of the continuously variable transmission connects the first and second plunger holes and circulates a working oil between the first and second plunger holes. Further, the continuously variable transmission has a distributing valve for controlling circulation of the working oil in the hydraulic closing circuit, a valve hole, formed in the cylinder block, for retaining the distributing valve, and a shaft which penetrates the cylinder block. The shaft and the cylinder block rotate synchronously and the output rotary section is rotatably supported around the shaft. The valve hole is formed in parallel to the shaft, and restriction means is arranged inclined with respect to the shaft and rotates in synchronism with the cylinder block to reciprocate the distributing valve with the distributing valve being restricted.

As the distributing valve is reciprocated by the restriction means according to this continuously variable transmission, the structure becomes simpler as compared with the type which causes a swash plate to reciprocate the distributing valve while the distal end of the distributing valve is pressed against the swash plate by a pressing device, such as a spring or hydraulic system.

It is desirable that the continuously variable transmission according to this embodiment should further have means for releasing pressure of the working oil in the second plunger of the second hydraulic system. In this case, power transmission to the output rotary section can be stopped without blocking the input of power to the continuously variable transmission.

It is desirable that in the continuously variable transmission according to this embodiment, the hydraulic closing circuit should have a first hydraulic chamber and a second hydraulic chamber, a zone where the first plunger hole communicates with the first hydraulic chamber and a zone where the first plunger hole communicates with the second hydraulic chamber should be set while the cylinder block makes one turn about the axis, and a zone where the second plunger hole communicates with the first hydraulic chamber. Further a zone where the second plunger hole communicates with the second hydraulic chamber should be set while the output rotary section makes one turn about the axis with respect to the cylinder block, and there should be a range over which stroke volume of the first hydraulic system exceeds stroke volume of the second hydraulic system, and oil removing means should be provided in one of the first and second hydraulic chambers the pressure of which is lower than that of the other when the output rotary section rotates in the forward direction and seal means for sealing the oil removing means when the output rotary section rotates in the reverse direction.

In this case, if the stroke volume of the first hydraulic system has a range greater than the stroke volume of the second hydraulic system, output in a wide range from the forward rotation of the output rotary section to the reverse rotation can be provided by this transmission alone. Providing the oil removing means in one of the hydraulic chambers the pressure of, which is lower when the output rotary section rotates in the forward direction can easily realize the neutral state in which the output rotary section stops, so that leakage of the working oil can be prevented at the time the output rotary section rotates in the forward direction. Further, if the seal means for sealing the oil removing means when the output rotary section rotates in the reverse direction is provided, leakage of the working oil can be prevented also at the time the output rotary section rotates in the reverse direction.

It is desirable that the hydraulic continuously variable transmission according to this embodiment should have displacement means for displacing the restriction means along the axis of the cylinder block and a maximum stroke volume of the first hydraulic system should be set larger than a maximum stroke volume of the second hydraulic system. In this case, it is possible to set the maximum stroke volume of the second hydraulic system small. Consequently, based on the volume difference between the first and second hydraulic systems, an output in a wide range from the forward rotation of the output rotary section to the reverse rotation can be provided by this transmission alone. Further, the volume difference between the first and second hydraulic systems is slight, thus plungers with the same structures can be used in the first and second hydraulic systems.

It is desirable that the restriction means should be held at any of different two positions along an axial direction of the cylinder block in the hydraulic continuously variable transmission according to this embodiment. In this case, when the restriction means is held at either position, a volume difference can be produced between the first and second hydraulic systems, so that an output in a wide range from the forward rotation of the output rotary section to the reverse rotation can be provided by this transmission alone.

A power transmission apparatus can be constructed with the continuously variable transmission according to this embodiment of the invention, by using first control means which controls input of power to the shaft, and second control means which controls output of torque by the output rotary section.

It is desirable that the first control means should have a motor for generating power and a clutch mechanism for selectively transmitting the power of the motor to the shaft, and the second control means should have a shift device having an output shaft and the shift device should selectively transmit the torque of the output rotary section to the output shaft and change rotational direction of the output rotary section to a forward direction or a reverse direction.

BRIEF DESCRIPTION OF DRAWINGS

FIG. 6(c) is an enlarged view of essential portions showing a modification of the retainer and the selector valve.

FIG. 15 is an enlarged cross-sectional view of another part of the continuously variable transmission in FIG. 13.

DETAILED DESCRIPTION OF THE PREFERRED EMBODIMENTS

First Embodiment

The first embodiment which is the present invention embodied into a hydraulic continuously variable transmission (hereinafter referred to as a continuously variable transmission) 20 which is used to operate a working vehicle and a power transmission apparatus including the continuously variable transmission 20 will be described below according to FIGS. 1 to 12.

Figure 1:
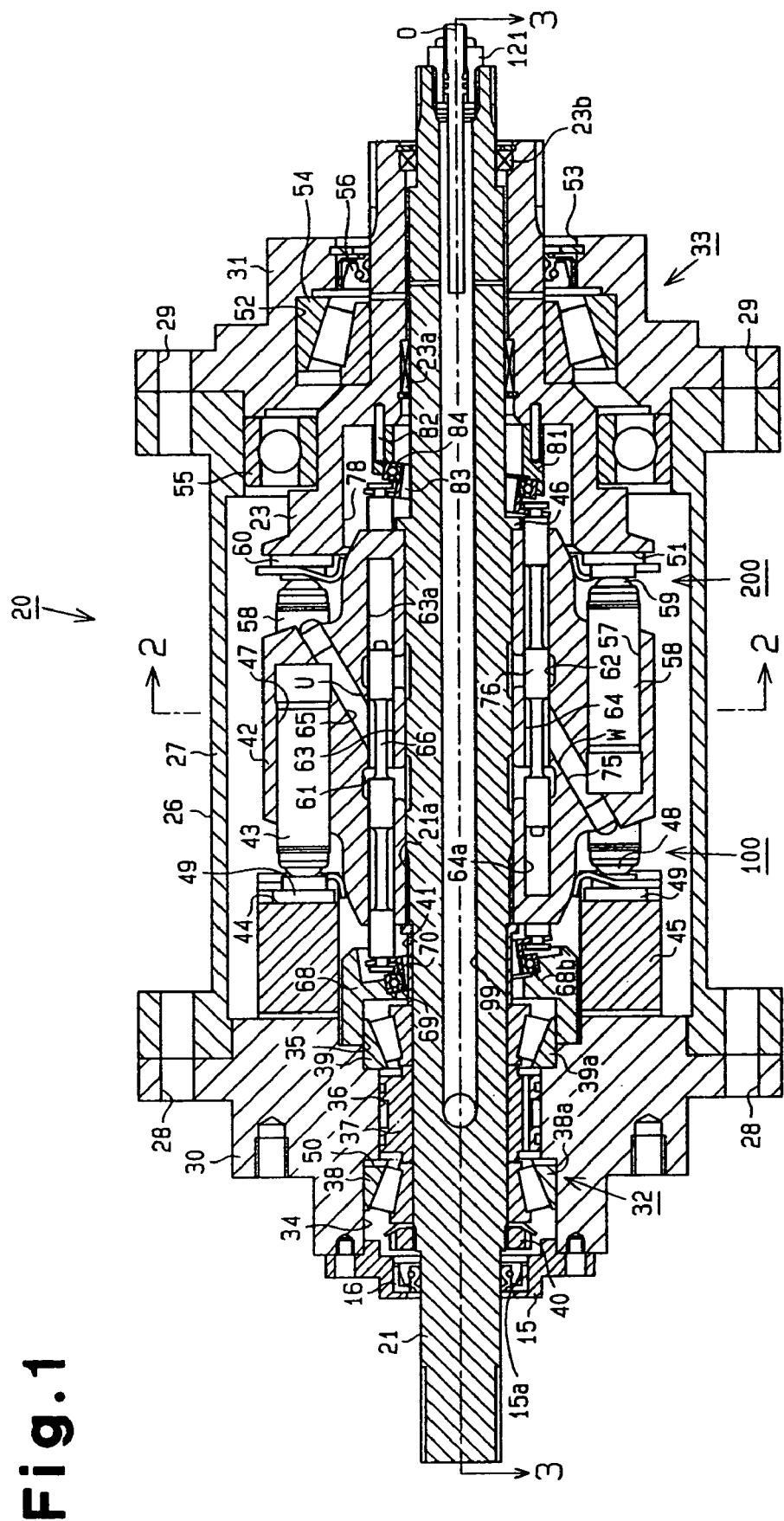
FIG. 1 is a cross-sectional view of a continuously variable transmission according to a first embodiment embodying the present invention.
Figure 3:
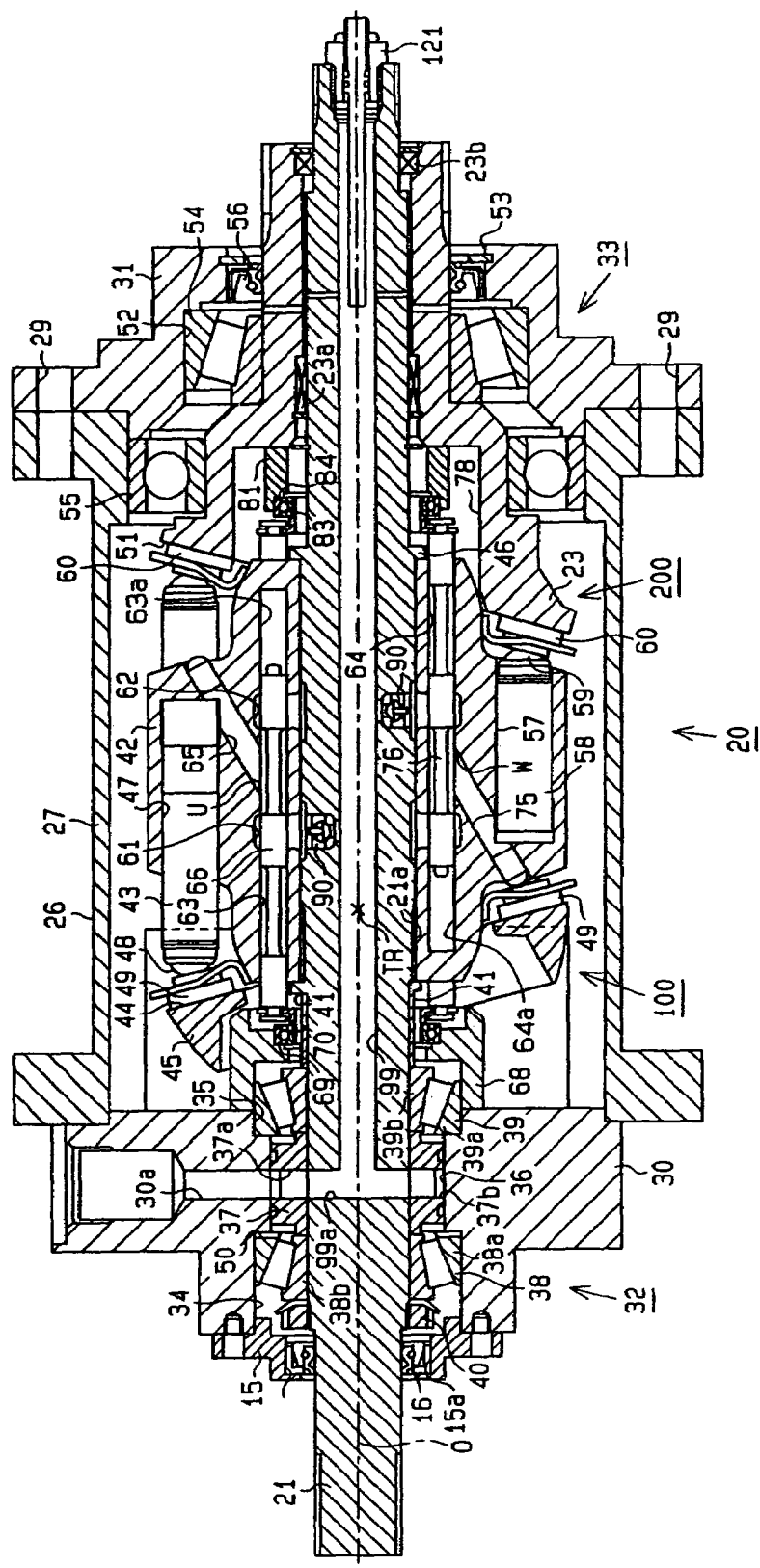
FIG. 3 is a cross-sectional view along the line 3—3 in FIG. 1.

As shown in FIGS. 1 and 3, the continuously variable transmission 20 is accommodated in a case 26 of a power unit of a working vehicle. The continuously variable transmission 20 has a first hydraulic system 100 and a second hydraulic system 200 between which a hydraulic closing circuit C (see FIGS. 9 and 10) is formed.

Figure 8:
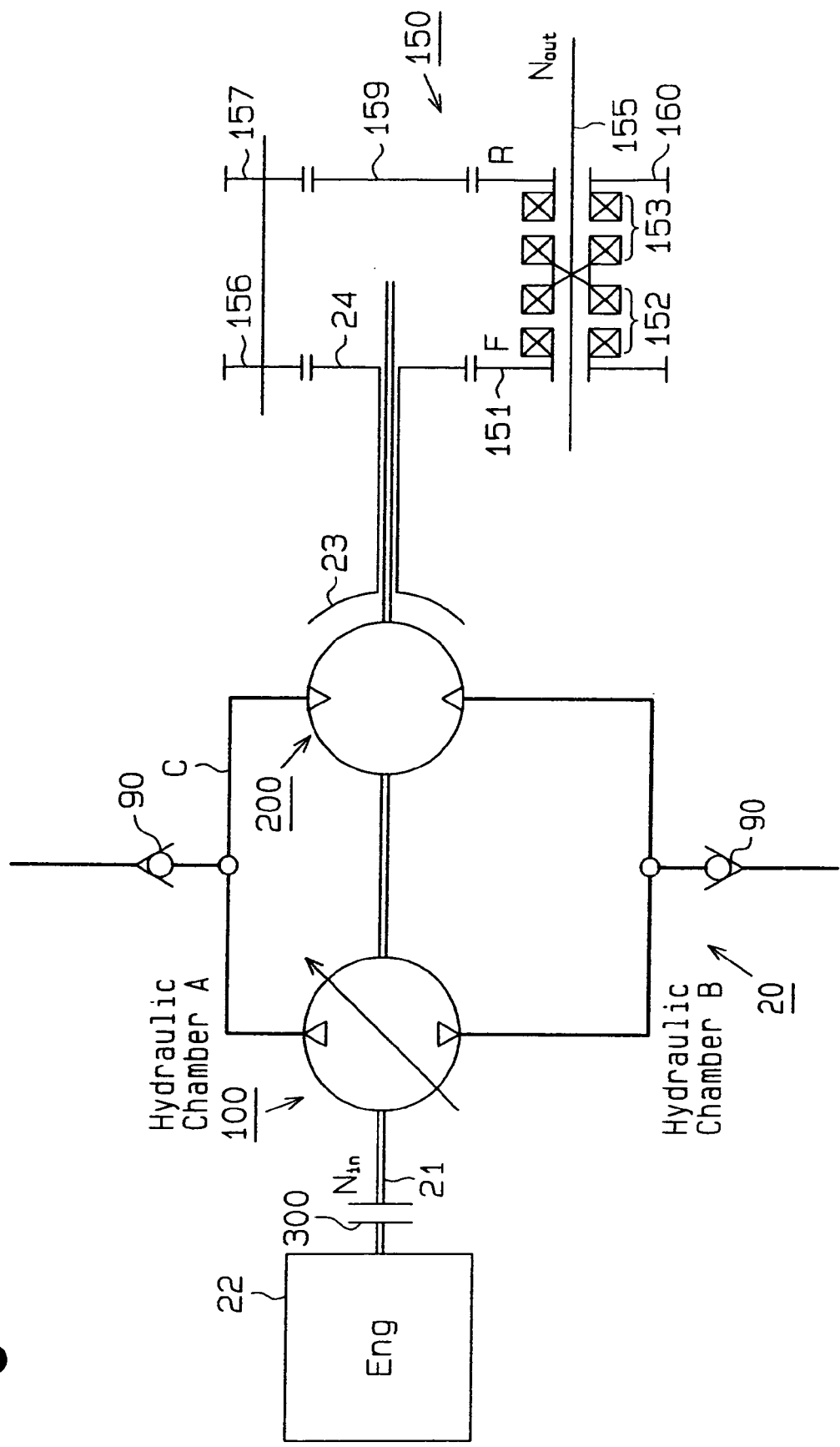
FIG. 8 is a conceptual diagram of a power transmission apparatus including the continuously variable transmission.

FIG. 8 is a conceptual diagram of the power transmission apparatus including the continuously variable transmission 20. An input shaft 21 of the continuously variable transmission 20 is coupled to the crankshaft of an engine 22 via a clutch mechanism 300. Coupled to a yoke 23 on the output side of the continuously variable transmission 20 is a gear transmission 150 (CST).

As shown in the diagram, the gear transmission 150 has an output gear 24 at the protruding end of the yoke 23 and has a forward clutch 152 and a backward clutch 153 which are coupled to an output shaft 155 to transmit the drive torque to an unillustrated final reduction gear unit.

The drive-side clutch plate of the forward clutch 152 has a gear 151 engaged with the output gear 24. And, as the forward clutch 152 is switched to a coupled state by the operation of a shift lever 146 shown in FIG. 11, the drive torque is transmitted to the unillustrated final reduction gear unit via the yoke 23, the output gear 24, the gear 151, the forward clutch 152 and the output shaft 155.

A set of gears is coupled to the output gear 24. The gear set comprises an idler gear 156, an idler gear 157 having a common shaft to the idler gear 156, and a gear 160 coupled to the drive-side clutch plate of the backward clutch 153 via an intermediate gear 159. And, as the backward clutch 153 is switched to a coupled state by the operation of the shift lever 146 after the clutch mechanism is cut off, the drive torque is transmitted to the unillustrated final reduction gear unit via the gear set and the output shaft 155. In this embodiment, the gear transmission 150 is equivalent to a forward/reverse rotation switching device. In this embodiment, the engine 22 is equivalent to a motor, the clutch mechanism 300 and a gear transmission 138 are respectively equivalent to a motor, disconnection means and the forward/reverse rotation switching device.

The case 26 of the continuously variable transmission 20 shown in FIG. 1 has a columnar cylinder member 27. To close both end openings of the cylinder member 27, a pair of side-wall members 30 and 31 are integrally coupled to the cylinder member 27 by unillustrated bolts.

The input end of the input shaft 21 of the continuously variable transmission 20 is rotatably supported on the first side-wall member 30 via a bearing section 32. The yoke 23 as an output rotating portion is rotatably supported on the second side-wall member 31 via a bearing section 33. And, the output end of the input shaft 21 penetrates the yoke 23 in such a way as to be positioned on the same axis as the yoke 23 and is rotatably supported on the yoke 23 via a bearing 23a paired with a seal 23b. The end portion of the input shaft 21 that protrudes from the yoke 23 is a PTO shaft (Power Take Off shaft).

Figure 4:
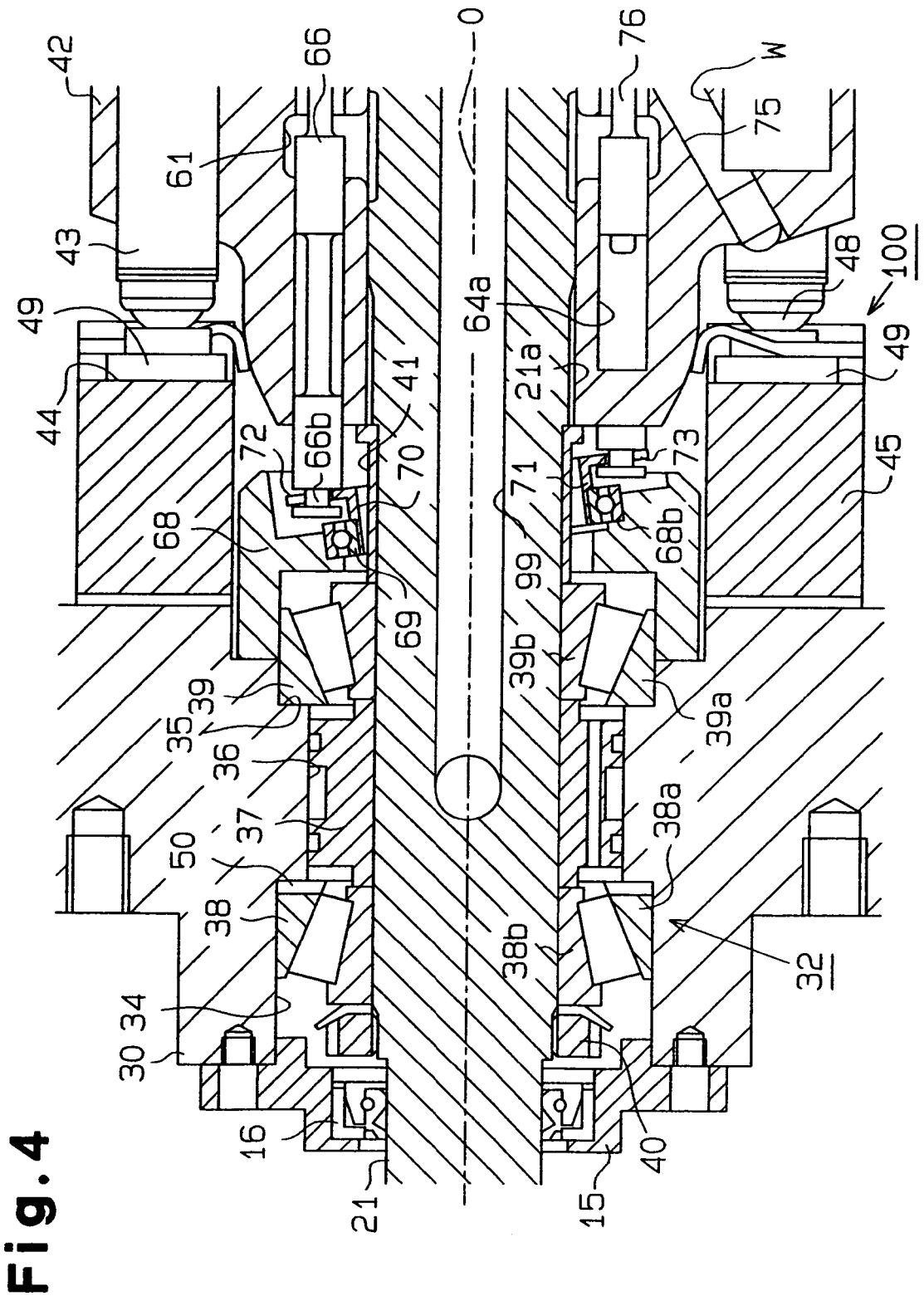
FIG. 4 is an enlarged cross-sectional view of a part of the transmission in FIG. 1.

As shown in FIG. 4, a pair of bearing retaining holes 34 and 35 are provided side-by-side on both inner and outer sides in the center of the first side-wall member 30 in such a way as to be arranged on the same axis. Formed between the outer and inner bearing retaining holes 34 and 35 is a through hole 36 which has a narrower diameter than both bearing retaining holes 34 and 35. A sleeve 37 is rotatably disposed in the through hole 36 and conical roller bearings 38 and 39 are respectively fitted and secured in both bearing retaining holes 34 and 35 symmetrically with the through hole 36 in between. The input shaft 21 is supported via both conical roller bearings 38 and 39. The opening of the outer bearing retaining hole 34 is covered with a cover 15 bolted to the first side-wall member 30. As shown in FIG. 4, the input shaft 21 is inserted into a through hole 15a of the cover 15 via a seal member 16.

An outer ring 38a of the conical roller bearing 38 abuts on the outer bearing retaining hole 34 via a shim 50. An outer ring 39a of the inner conical roller bearing 39 securely abuts on the back step portion of the inner bearing retaining hole 35. A nut 40 is fastened on the outer periphery of the input end of the input shaft 21 in the inner bearing retaining hole 34. The fastening of the nut 40 causes an inner ring 38b of the outer conical roller bearing 38 to press an inner ring 39b of the inner conical roller bearing 39 via the sleeve 37 and further press a sleeve 41 fitted on the input shaft 21. The sleeve 41 presses a cylinder block 42. The cylinder block 42 is made to abut on a stop portion 46b protrusively provided on the outer surface of the input shaft 21. Therefore, the cylinder block 42 can be fixed in the axial direction merely by fastening the nut 40 only from the input end side. The degree of adhesion between the inner ring and outer ring of the bearings 38 and 39 can be adjusted by changing the quantity and the thickness of the shim 50 intervening between the outer ring 38a and the first side-wall member 30. The conical roller bearings 38 and 39 and the sleeve 37 constitute the bearing section 32.

The first hydraulic system 100 includes the input shaft 21, the cylinder block 42, a plunger 43 and a cradle 45 including a swash plate surface 44 which abuts on the plunger 43. The input shaft 21 is passed through the cradle 45.

As shown in FIG. 3, the cradle 45 is supported on the case 26 in a tiltable manner with a trunnion axis TR as a center orthogonal to an axis O of the cylinder block 42. That is, since the swash plate surface 44 stands upright when an imaginary plane including the swash plate surface 44 of the cradle 45 is placed at the position orthogonal to the axis O, the position is an upright position. As shown in FIG. 3, the cradle 45 can be tilted between an angular position tilted most in the counterclockwise direction (first position) with this upright position as the reference, and an angular position tilted most in the clockwise direction (second position) with this upright position as the reference.

Figure 12:
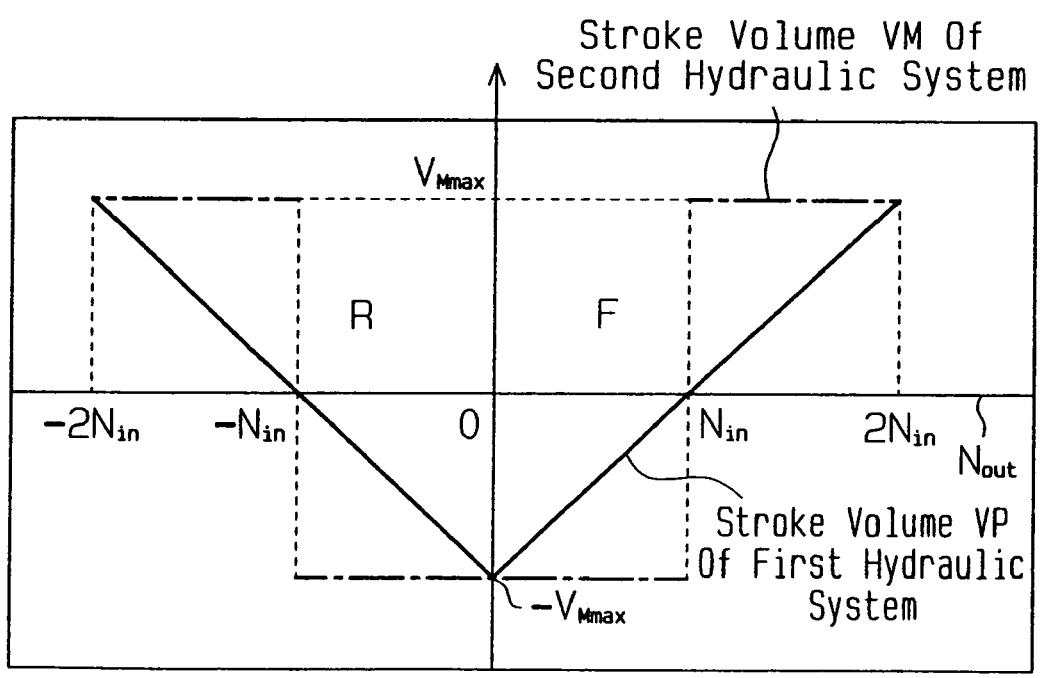
FIG. 12 is a characteristic diagram showing the relationship between stroke volume and the number of output rotations.

In this embodiment, with the swash plate surface 44 placed at the upright position taken as the reference, the clockwise direction is the positive direction and the counterclockwise direction is the negative direction in FIG. 3. In this embodiment, with the boundary being the time when the number of output rotations Nout of the yoke 23 shown in FIG. 12 is equal to Nin, the cradle 45 tilts to the negative side when Nout>Nin and tilts to the positive side when Nout<Nin.

The cylinder block 42 is integrally coupled to the input shaft 21 by coupling of a spline 21a. The cylinder block 42 has approximately a cylindrical shape with both its end portions narrower than the center portion.

Figure 2:
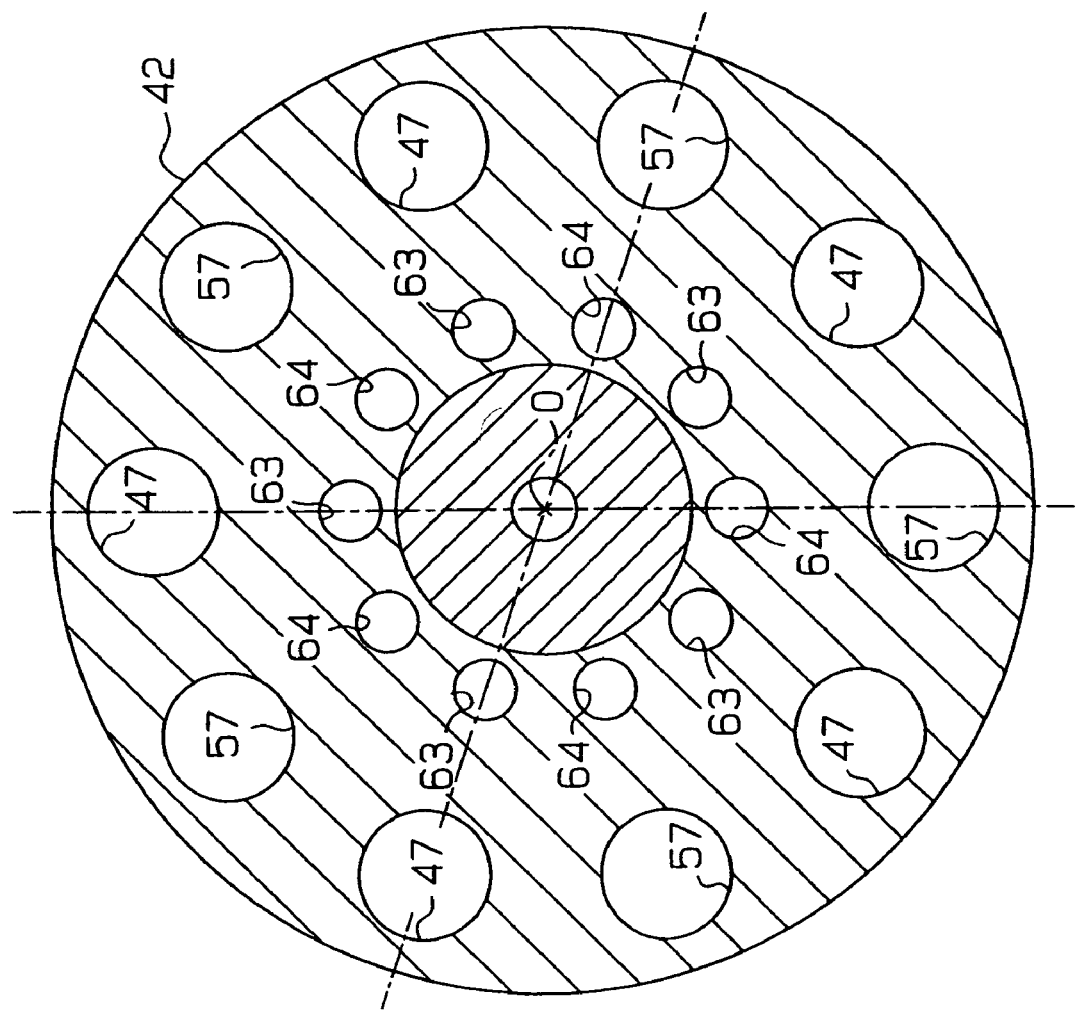
FIG. 2 is a cross-sectional view along the line 2—2 in FIG. 1.

A plurality of first plunger holes 47 are laid out in the aforementioned center portion of the cylinder block 42 in a ring shape around the rotational center (axis O) and extend in parallel to the axis O as shown in FIG. 2. As shown in FIG. 3, each first plunger hole 47 is open toward the cradle 45 at the center step portion of the cylinder block 42. A first plunger 43 is slidably disposed in each first plunger hole 47. The first plunger hole 47 is equivalent to the first plunger chamber. A steel ball 48 is fitted on the distal end of the first plunger 43 in a rollable manner and the first plunger 43 abuts on the swash plate surface 44 via the steel ball 48 and a shoe 49 to which the steel ball 48 is attached. The tilted swash plate surface 44 causes the first plunger 43 to reciprocate with the rotation of the cylinder block 42 and repeat the suction and discharge strokes of the working oil.

Meanwhile, the second hydraulic system 200 has a plurality of second plungers 58 slidably arranged on the cylinder block 42 and a cylindrical yoke 23 having a rotary inclined surface 51 which abuts on the second plungers 58.

As shown in FIGS. 1 and 3, a bearing retaining hole 52 and a through hole 53 having a smaller diameter than the bearing retaining hole 52 are formed on the second side-wall member 31 in such a way as to be coaxial to each other. A conical roller bearing 54 is fitted in the bearing retaining hole 52. A ball bearing 55 is fixed to the inner surface of the output end portion of the cylinder member 27. The yoke 23 has a large-diameter portion and a small-diameter portion and is rotatably supported on the second side-wall member 31 as the large-diameter portion is fitted on the ball bearing 55 and the small-diameter portion is fitted on the conical roller bearing 54. The small-diameter portion of the yoke 23 protrudes outward from the second side-wall member 31 via a seal member 56 adhered inside the through hole 53.

The rotary inclined surface 51 is formed on the end face of the yoke 23 on the cylinder block 42 side and an imaginary plane including the rotary inclined surface 51 is inclined at a given angle with respect to the axis O.

As shown in FIG. 2, second plunger holes 57, being the same in quantity to the first plunger holes 47, are laid out at the center portion of the cylinder block 42 in a ring shape around the rotational center thereof and extend in parallel to the axis O. The second plunger hole 57 is equivalent to the second plunger chamber. The pitch circle of the second plunger holes 57 is concentric to, and is equal to, the pitch circle of the first plunger holes 47. The individual second plunger holes 57 are laid out with a half pitch shifted from the first plunger holes 47 in the peripheral direction of the cylinder block 42 in such a way that each second plunger hole 57 comes between the adjoining first plunger holes 47.

The second plunger hole 57 is open toward the yoke 23 at the center step portion of the cylinder block 42. The second plunger 58 is slidably disposed in each second plunger hole 57 and a steel ball 59 is fitted on its distal end in a rollable manner. The second plunger 58 abuts on the rotary inclined surface 51 via the steel ball 59 and a shoe 60 to which the steel ball 59 is attached. The relative rotation of the rotary inclined surface 51 and the cylinder block 42 causes the second plunger 58 to reciprocate and repeat the suction and discharge strokes of the working oil. In this embodiment, the maximum stroke volume VPmax of the first hydraulic system 100 is set so as to be equal to the maximum stroke volume VMmax of the second hydraulic system 200.

Next, the hydraulic closing circuit C formed between the first hydraulic system 100 and the second hydraulic system 200 will be described.

A first hydraulic chamber 61 and a second hydraulic chamber 62 both having a ring shape are provided side-by-side on the inner surface of the cylinder block 42 along the axial direction of the cylinder block 42. For the sake of descriptive convenience, the first hydraulic chamber 61 may be called a hydraulic chamber A, and the second hydraulic chamber 62 a hydraulic chamber B.

First valve holes 63 which are equal in quantity to the first plunger holes 47 and connect the first hydraulic chamber 61 and the second hydraulic chamber 62 are provided in the cylinder block 42 in parallel to the axis O of the cylinder block 42. Second valve holes 64 which are equal in quantity to the second plunger holes 57 and connect the first hydraulic chamber 61 and the second hydraulic chamber 62 are provided in the cylinder block 42 in parallel to the axis O of the cylinder block 42. The first valve holes 63 and the second valve holes 64 are laid out in a ring shape about the axis O of the cylinder block 42.

The pitch circle of the first valve holes 63 is concentric to, and is equal to, the pitch circle of the second valve holes 64. The diameter of the pitch circles of both valve holes 63 and 64 is set smaller than the diameter of the pitch circles of the plunger holes 47 and 57 in such a way that the valve holes 63 and 64 are positioned more inward than the plunger holes 47 and 57. As shown in FIG. 2, the individual first valve holes 63 are laid out with a half pitch shifted from the second valve holes 64 in the peripheral direction of the cylinder block 42 in such a way that each first valve hole 63 comes between the adjoining pair of second valve holes 64. As shown in FIG. 1, the first valve holes 63 and the second valve holes 64 are positioned so as to face each other with the axis O in between. The axis of each first valve hole 63 and each first plunger hole 47 and the axis of each second valve hole 64 and each second plunger hole 57 are arranged in such a way as to be positioned on a straight line extending in the diametrical direction from the axis O as shown in FIG. 2.

Figure 5:
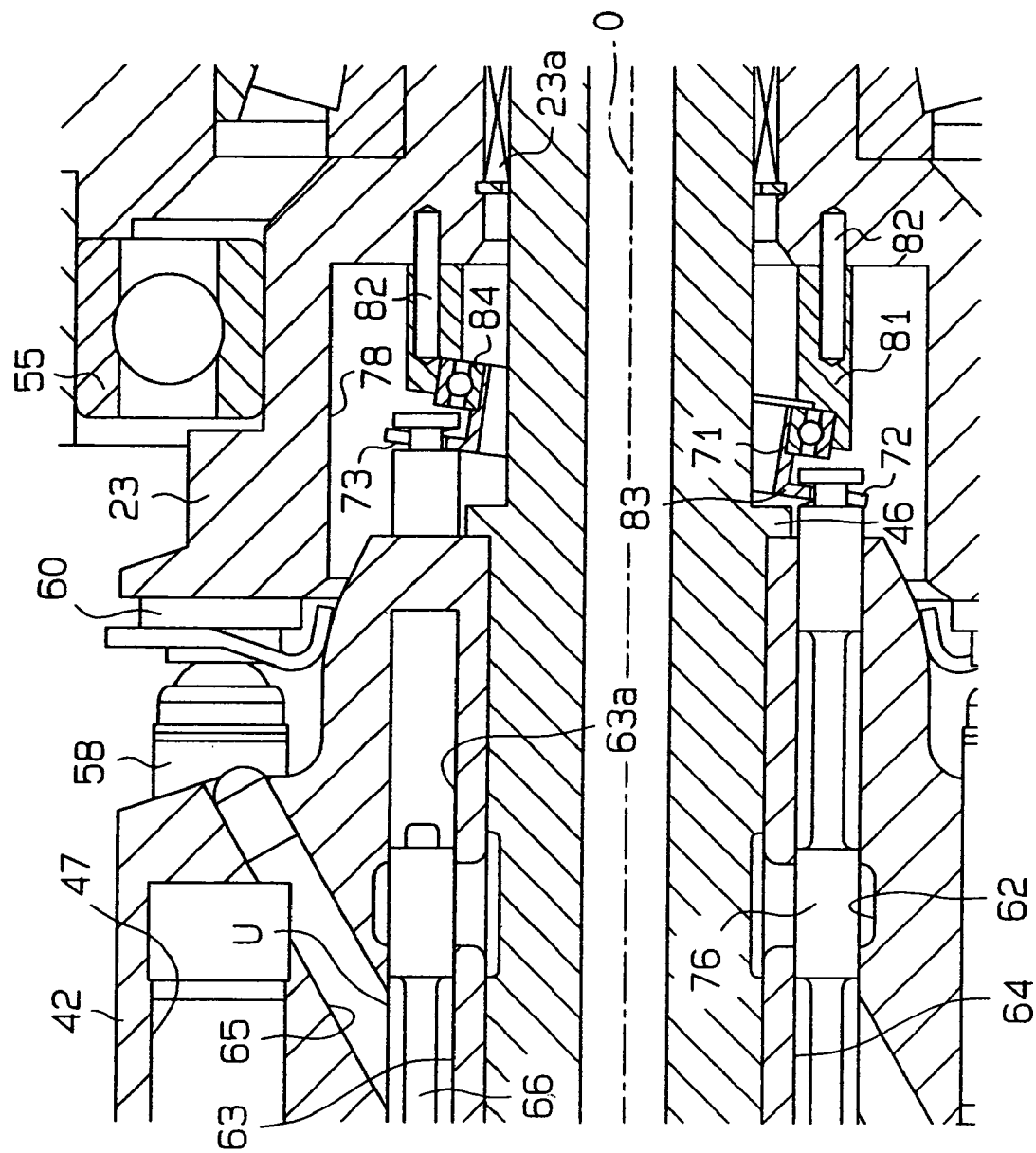
FIG. 5 is an enlarged cross-sectional view of another part of the transmission in FIG. 1.

As shown in FIG. 1, a fluid passage 65 is formed in such a way so as to connect between the bottom portion of the first plunger hole 47 and a portion between first hydraulic chamber 61 and the second hydraulic chamber 62 of the first valve hole 63. The fluid passage 65 is askew inward from the outer surface side of the cylinder block 42 as shown in FIGS. 1 and 5. Each first valve hole 63 has a port U for connecting each first valve hole 63 to the corresponding plunger hole 47 via the fluid passage 65 between the first hydraulic chamber 61 and the second hydraulic chamber 62.

A spool type first selector valve 66 is slidably disposed in each first valve hole 63. The first selector valve 66 is equivalent to a distributing valve. As the first selector valve 66 is disposed in the first valve hole 63, the first selector valve 66 is arranged in parallel to the axis O of the cylinder block 42.

Figure 6A:
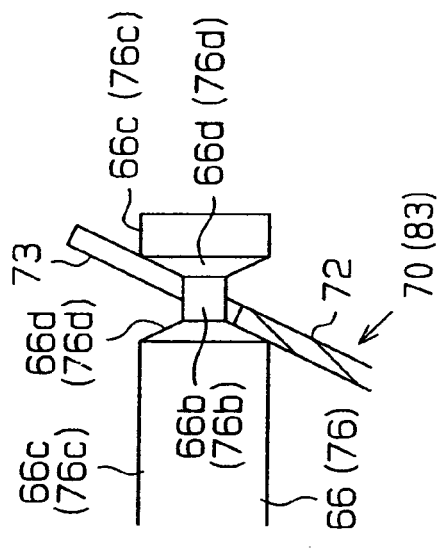
FIG. 6(a) is a front view of a retainer (reciprocation imparting member)

As shown in FIGS. 1 and 4, a cylindrical holder 68 is fixed to the outer surface of the outer ring 39a of the inner conical roller bearing 39. The center portion of the inner surface of the holder 68 in the direction of the axis O is a diameter-reduced portion 68b with a reduced diameter. A retainer 70 as a reciprocation imparting member is rotatably supported on the diameter-reduced portion 68b via a ball bearing 69. The retainer 70 comprises a cylindrical cylinder portion 71 and a flange 72 formed at the end portion of the cylinder portion 71 on the cylinder block 42 side, as shown in FIG. 6(a). The ball bearing 69 permits the retainer 70 to be synchronously rotatable with respect to the cylinder block 42.

As shown in FIG. 4, the retainer 70 is laid out in such a way that its axis is made askew to the axis O by the ball bearing 69, and in that state, the input shaft 21 is inserted into the retainer 70 in a rotatable manner. Therefore, the face of the flange 72 that faces the cylinder block 42 (hereinafter referred to as the flange top surface) is askew to the axis O.

Figure 6B:
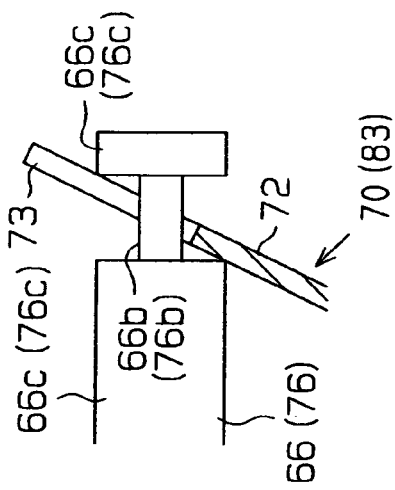
FIG. 6(b) is an enlarged view of essential portions of the retainer and a selector valve.
Figure 6B:
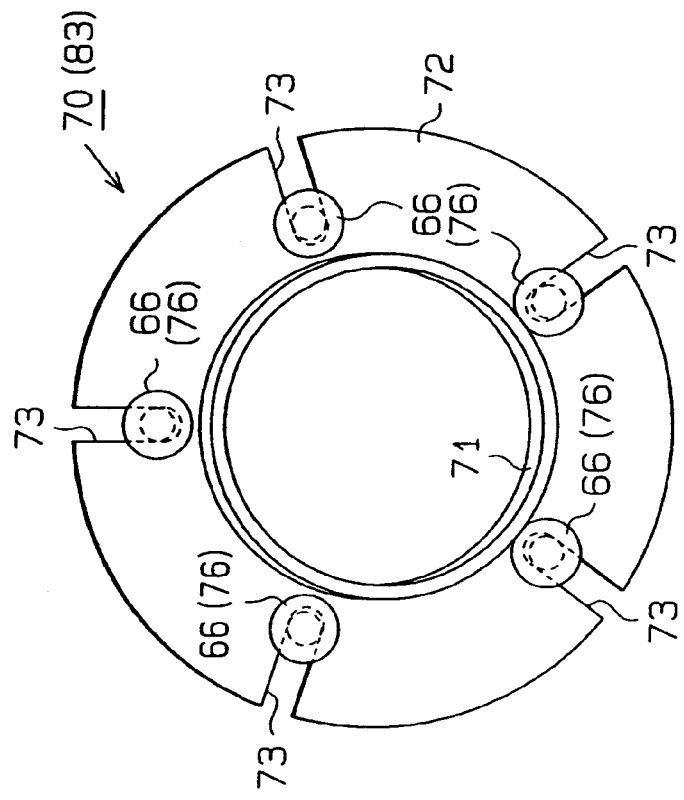

As shown in FIG. 6(b), a plurality of stop grooves 73 are notched in the flange 72 of the retainer 70 at equal angles around the axis thereof toward the axis from the outer surface. A constricting portion 66b provided on the first selector valve 66 is engaged with each stop groove 73 as shown in FIG. 6(b). The constricting portion 66b has a smaller diameter than large-diameter portions 66c adjoining via tapered surfaces 66d on both lengthwise sides. The tapered surface 66d is formed in such a way that nearer the axis of the first selector valve 66, the shorter the distance becomes to the other tapered surface 66d. Both side surfaces of the flange 72 are arranged so as to be in line contact with the tapered surfaces 66d.

Figure 7:
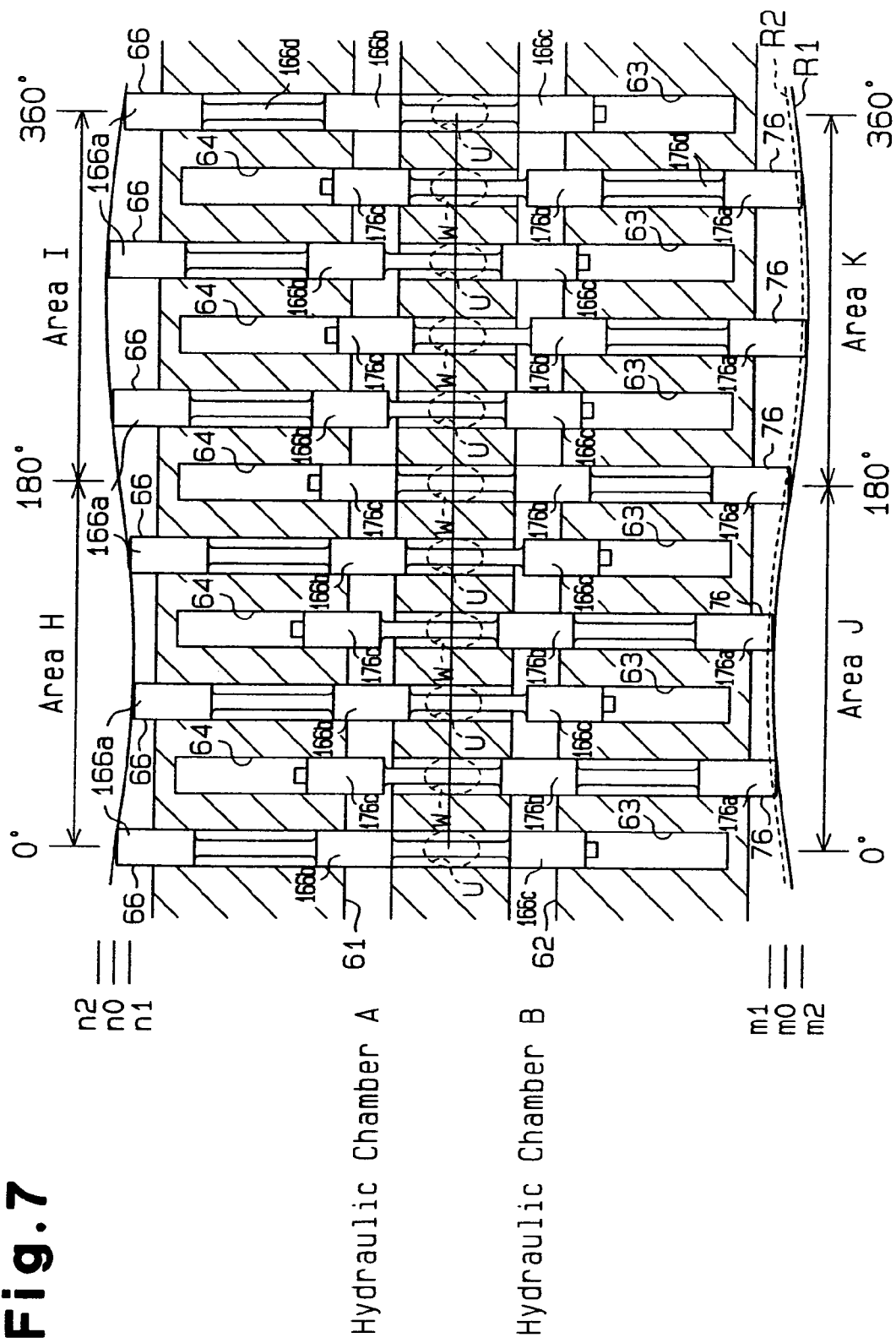
FIG. 7 is an explanatory diagram showing timings at which ports are opened by a first selector valve and a second selector valve.

As the first selector valve 66 is engaged with the retainer 70 having the flange top surface askew to the axis O, therefore, the first selector valve 66 reciprocates along the axial direction of the cylinder block 42, achieving the displacement as shown in FIG. 7.

As shown in FIG. 7, the first selector valve 66 has an elongated shaft portion 166d and first to third land portions 166a to 166c formed on the shaft portion 166d apart from one another by a predetermined distance. The first to third land portions 166a to 166c are formed to have approximately the same diameter as the diameter of the first valve hole 63 and the shaft portion 166d is formed to have a smaller diameter than the diameter of the first valve hole 63. Therefore, the cross-sectional areas of the land portions 166a to 166c are approximately the same as the cross-sectional areas of the first valve hole 63 and the cross-sectional area of the shaft portion 166d is smaller than the cross-sectional area of the first valve hole 63. The constricting portion 66b is formed at the distal end of the first land portion 166a, though not illustrated in FIG. 7.

As shown in FIG. 7, the flange 72 of the retainer 70 causes the first selector valve 66 to reciprocate between a first opening position n1 at which the port U is connected to the second hydraulic chamber 62 and a second opening position n2 at which the port U is connected to the first hydraulic chamber 61 with a port closing position n0 as the center. Here, for the sake of descriptive convenience, with regard to the rotation about the axis O of the cylinder block 42, let a range of 0 degree to 180 degrees be an area H and let a range of 180 degrees to 360 (0) degrees be an area I.

The area H is the area that includes all the zones where the port U is connected to the second hydraulic chamber 62 and the area I is the area that includes all the zones where the port U is connected to the first hydraulic chamber 61.

In the case where the swash plate surface 44 is displaced to the maximum tilt angle position from the upright position, as shown in FIG. 12, the stroke volume VP of the first hydraulic system 100 changes from 0 to VMmax. Accordingly, the discharge amount of this working oil on the first hydraulic system 100 side is set in this embodiment in such a way that when the number of input rotations of the input shaft 21 is Nin, the number of output rotations Nout becomes a speed in a range from Nin to 2Nin.

In FIG. 12, the vertical axis indicates the stroke volume per one rotation of the first hydraulic system 100 or the second hydraulic system 200 and the horizontal axis indicates the number of output rotations Nout of the yoke 23 (output rotary section). In the diagram, the solid line indicates a change in stroke volume VP of the first hydraulic system 100 and the one-dot chain line indicates a change in stroke volume VM of the second hydraulic system 200.

The stroke volume of the first hydraulic system 100 is the amount of the working oil which the plunger space formed by each first plunger 43 and each first plunger hole 47 exchanges with the first hydraulic chamber 61 and the second hydraulic chamber 62 while the cylinder block 42 rotates once. The stroke volume of the second hydraulic system 200 is the amount of the working oil which the plunger space formed by each second plunger 58 and each second plunger hole 57 exchanges with the first hydraulic chamber 61 and the second hydraulic chamber 62 while the yoke 23 (output rotary section) makes one turn with respect to the cylinder block 42.

In this embodiment, with the swash plate surface 44 tilted on the negative side, as shown in FIG. 3, the working oil is sucked into the first plunger hole 47 via the port U in the range of the rotational angle of 0 degree to 180 degrees about the axis O of the cylinder block 42 and the working oil is discharged from the first plunger hole 47 via the port U in the range of 180 degrees to 360 (0) degrees. Meanwhile, with the swash plate surface 44 tilted on the positive side, the working oil is discharged from the first plunger hole 47 via the port U in the range of the rotational angle of 0 degree to 180 degrees about the axis O of the cylinder block 42 and the working oil is sucked into the first plunger hole 47 via the port U in the range of 180 degrees to 360 (0) degrees. The hydraulic chamber in which the working oil is discharged and the hydraulic chamber from which the working oil is drawn are determined by the areas H and I corresponding to the rotational angle about the axis O of the cylinder block 42 in this manner.

As shown in FIGS. 1 and 3, a fluid passage 75 is formed in such a way as to connect between the bottom portion of the second plunger hole 57 and a portion between first hydraulic chamber 61 and the second hydraulic chamber 62 of the second valve hole 64. The fluid passage 75 is askew inward from the outer surface side of the cylinder block 42 as shown in FIGS. 1 and 3.

Formed in each second valve hole 64 is a port W which communicates with the corresponding second plunger hole 57 between the first hydraulic chamber 61 and the second hydraulic chamber 62. A spool type second selector valve 76 is slidably disposed in each second valve hole 64 in such a way as to be in parallel to the second plunger 58. The second selector valve 76 is equivalent to a distributing valve.

As shown in FIGS. 1 and 5, a retaining hole 78 is formed in the center portion of the end face of the yoke 23 on the cylinder block 42 side. A cylindrical support member 81 in which the input shaft 21 is inserted is provided in the retaining hole 78. The support member 81 is coupled integrally to the bottom portion of the retaining hole 78 of the yoke 23 via a plurality of pins 82. A second retainer 83 as a reciprocation imparting member is rotatably coupled to the inner surface of the support member 81 via a ball bearing 84. The ball bearing 84 permits the second retainer 83 to be synchronously rotatable with respect to the cylinder block 42.

Since the second retainer 83 has a cylindrical portion, a flange and stop grooves which are the same in structure as those of the first retainer 70, the same reference symbols are given to those structures and their description will be omitted (see FIG. 6(a)).

As shown in FIG. 5, the second retainer 83 is laid out in such a way that its axis is made askew to the axis O by the ball bearing 84, and the input shaft 21 penetrates through the second retainer 83 in a rotatable manner. That face of the flange 72 of the second retainer 83 that faces the cylinder block 42 (hereinafter referred to as the flange top surface) is askew to the axis O.

As shown in FIG. 6(b), a constricting portion 76b provided on the second selector valve 76 is engaged with the stop groove 73 of the second retainer 83. The constricting portion 76b has a smaller diameter than a pair of large-diameter portions 76c adjoining via tapered surfaces 76d on both lengthwise sides. The tapered surface 76d is formed in such a way that nearer the axis of the second selector valve 76, the shorter the distance becomes to the other tapered surface 76d. Both side surfaces of the flange 72 are arranged so as to be in line contact with the tapered surfaces 76d.

As the second selector valve 76 is engaged with the second retainer 83 having the flange top surface askew to the axis O, the displacement as shown in FIG. 7 is achieved. In FIG. 7, although the relative positions of the flange 72 of the first retainer 70 and the flange 72 of the second retainer 83 change since both retainers 70 and 83 are made rotatable, they are illustrated as one for the sake of descriptive convenience.

For the sake of descriptive convenience, a range where the relative rotational angle of yoke 23 (output rotary section) is from 0 degree to 180 degrees about the axis O with respect the cylinder block 42 will be referred to as an area J, and a range of angle 180 degrees to 360 (0) degrees will be referred to as an area K.

The area J is the area that includes all the zones where the port W is connected to the first hydraulic chamber 61 and the area K is the area that includes all the zones where the port W is connected to the second hydraulic chamber 62.

In this embodiment, as shown in FIG. 3, in the case where the swash plate surface 44 is tilted to the negative side, the working oil is drawn into the second plunger hole 57 via the port W in the range of the relative rotational angle of 0 degree to 180 degrees of the yoke 23 (output rotary section) about the axis O with respect to the cylinder block 42 and the working oil is discharged from the second plunger hole 57 via the port W in the range of 180 degrees to 360 (0) degrees. In the case where the swash plate surface 44 is tilted to the positive side, the working oil is discharged from the second plunger hole 57 via the port W in the range of the relative rotational angle of 0 degrees to 180 degrees of the yoke 23 (output rotary section) about the axis O with respect to the cylinder block 42 and the working oil is drawn into the second plunger hole 57 via the port W in the range of 180 degrees to 360 (0) degrees. The hydraulic chamber from which the working oil is discharged and the hydraulic chamber in which the working oil is drawn are determined by the areas J and K corresponding to the relative rotational angle of the yoke 23 (output rotary section) about the axis O with respect to the cylinder block 42.

The hydraulic closing circuit C is comprised of the first plunger holes 47, the second plunger holes 57, the first hydraulic chamber 61, the second hydraulic chamber 62, the first valve holes 63, the second valve holes 64, the fluid passage 65, the fluid passage 75, the ports U and the ports W.

As shown in FIGS. 1 and 3, to charge the working oil into the hydraulic closing circuit C, a shaft hole 99 is bored in the input shaft 21 along the axis O. At the portion corresponding to the sleeve 37, the shaft hole 99 has an inlet fluid passage 99a extending in the radial direction. The inlet fluid passage 99a is connected to a fluid passage 37a bored in the sleeve 37 in the radial direction and a peripheral groove 37b formed in the outer surface. A fluid passage 30a which communicates with the peripheral groove 37b is provided in the first side-wall member 30 and the working oil is fed under pressure into the fluid passage 30a from an unillustrated charge pump. In the shaft hole 99, a stopper body 121 is fastened into the opening portion of the input shaft 21 on the output end side in such a manner that the fastening amount is adjustable.

Charge valves 90 (check valves) for connecting the first hydraulic chamber 61 and the second hydraulic chamber 62 to the shaft hole 99 are respectively disposed in the input shaft 21. The charge valves 90 are opened until the fluid pressure in the hydraulic closing circuit C reaches the charge pressure in the shaft hole 99 and supplies the working oil in the shaft hole 99 to the hydraulic closing circuit C. The charge valves 90 prevent the counter flow of the working oil to the shaft hole 99.

Here, a description will be given of the reciprocation operation of the first and second selector valves 66 and 76 in the continuously variable transmission 20 (first and second hydraulic systems 100 and 200) constructed as described above.

As the cylinder block 42 rotates, each selector valve 66, 76 reciprocates along the direction of the axis O by the engagement with the corresponding retainer 70, 83. At this time, each retainer 70, 83 rotates together with the cylinder block 42 and rotates relatively with respect to the swash plate surface 44 or the rotary inclined surface 51 of the yoke 23. As the flange top surface of the retainer 70, 83 advances toward the cylinder block 42, the proximal end of each selector valve 66, 76 approaches a bottom portion 63a, 64a of the corresponding valve hole 63, 64. At this time, the flange top surface of the retainer 70, 83 presses the cylinder-block-42 side tapered surface 66d, 76d of the selector valve 66, 76. Since the flange top surface is in line contact with the tapered surface 66d, 76d, the durability is improved as compared with the case of the point contact.

As the flange top surface of the retainer 70, 83 moves away from the cylinder block 42 due to the rotation of the cylinder block 42, on the other hand, the proximal end of each selector valve 66, 76 moves away from the bottom portion 63a, 64a of the corresponding valve hole 63, 64. At this time, the flange back surface of the retainer 70, 83 presses the tapered surface 66d, 76d of the selector valve 66, 76 on the opposite side to the cylinder block 42. Since the flange back surface is in line contact with the tapered surface 66d, 76d at this time too, is reduced as compared with the case of the point contact.

According to this embodiment, unlike the prior art, the reciprocation of the selector valve is accomplished by the engagement of the constricting portion 66b, 76b of each of the selector valves 66, 76 with the stop groove 73 of the retainer 70, 83, not by abutment of the distal end of the each selector valve 66, 76 on the swash plate. This therefore makes it unnecessary to press each selector of the valve 66, 76 against the swash plate by a spring or the like.

A description will be given of the action originated from the tilting of the cradle 45 of the continuously variable transmission 20 constructed in the above-described manner. It is to be noted that for the sake of descriptive convenience, the description will be given with the number of input rotations Nin taken as a constant.

(In the Case where the Number of Output Rotations Nout is Nin)

Figure 11:
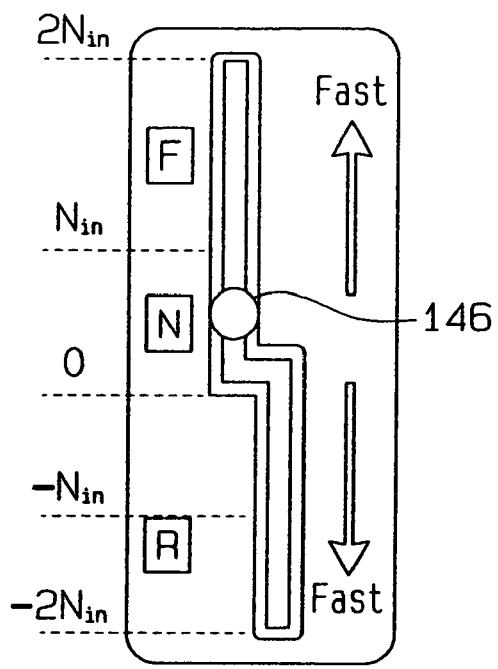
FIG. 11 is a plan view of a shifter.

By operating the shift lever 146 shown in FIG. 11, the swash plate surface 44 is positioned at the upright position via the cradle 45.

In this state, the driving force of the engine 22 causes the cylinder block 42 to rotate in the forward direction by the number of rotations Nin via the input shaft 21. Hereinafter, when a gear 142 or the output shaft 155 rotates in the direction opposite to the direction of the input shaft 21, it will be referred to as the forward rotation of the output shaft. The swash plate surface 44 is in a neutral state or the upright position with respect to the axis O of the input shaft 21. The first plunger 43 of the first hydraulic system 100 is not reciprocated by the swash plate surface 44, so that in this state the working oil does not circulate in the hydraulic closing circuit C. In the second hydraulic system 200, therefore, the protruding end of each second plunger 58 engages in abutment with the rotary inclined surface 51 via the shoe 60 in such a state where it cannot take a stroke action. Therefore, the cylinder block 42 and the rotary inclined surface 51 realize a directly coupled state and rotate together. Thus, the input shaft 21 and the output shaft 155 in this state become directly coupled. The forward-directional rotation imparted to the rotary inclined surface 51 is transmitted to the final reduction gear unit via the yoke 23 and the clutch 152, the gear 24 and the gear 151 which are in a coupled state.

In the case where the swash plate surface 44 is positioned at the upright position, the stroke volume VP of the first hydraulic system 100 becomes 0 and the number of output rotations Nout (the number of rotations of the yoke 23) becomes equal to the number of input rotations Nin, as shown in FIG. 12.

(In the Case where the Number of Output Rotations Nout is between Nin and 2Nin)

By operating the shift lever 146, the swash plate surface 44 of the cradle 45 is tilted to the negative side to be positioned between the negative maximum tilt angle position and the upright position. The negative maximum tilt angle position is the position at which the absolute value of the stroke volume VP of the first hydraulic system 100 equals the absolute value (=VMmax) of the stroke volume VM of the second hydraulic system 200.

In this state, the driving force of the engine 22 causes the cylinder block 42 to rotate by Nin via the input shaft 21. Then, the first hydraulic system 100 draws the working oil into the plunger hole 47 via the port U in the range of the rotational angle of 0 degree to 180 degrees about the axis O of the cylinder block 42 and discharges the working oil from the plunger hole 47 via the port U in the range of 180 degrees to 360 (0) degrees. The hydraulic chamber in which the working oil is discharged and the hydraulic chamber from which the working oil is drawn are determined by the areas H and I corresponding to the rotational angle about the axis O of the cylinder block 42.

The amounts of the working oil to be discharged and drawn by the first hydraulic system increase as the tilt angle of the swash plate surface 44 to the negative side increases. At this time, the second hydraulic system 200 draws the working oil into the second plunger hole 57 via the port W in the range of the relative rotational angle of 0 degree to 180 degrees about the axis O of the yoke 23 (output rotary section) with respect to the cylinder block 42 and discharges the working oil from the second plunger hole 57 via the port W in the range of 180 degrees to 360 (0) degrees. The hydraulic chamber in which the working oil is discharged and the hydraulic chamber from which the working oil is drawn are determined by the areas J and K corresponding to the relative rotational angle of the yoke 23 (output rotary section) about the axis O with respect to the cylinder block 42.

As a result, the rotary inclined surface 51 is rotated by the total (sum) of the number of rotations Nin of the cylinder block 42 driven via the input shaft 21 and the number of rotations in the forward direction by the projecting pressurization of the plunger 58 on the rotary inclined surface 51. The forward-directional rotation to be imparted on the rotary inclined surface 51 is transmitted to the final reduction gear unit as the forward-directional rotation via the yoke 23 and the coupled clutch 152, gear 24 and gear 151 to carry out the speed increasing action.

Figure 10:
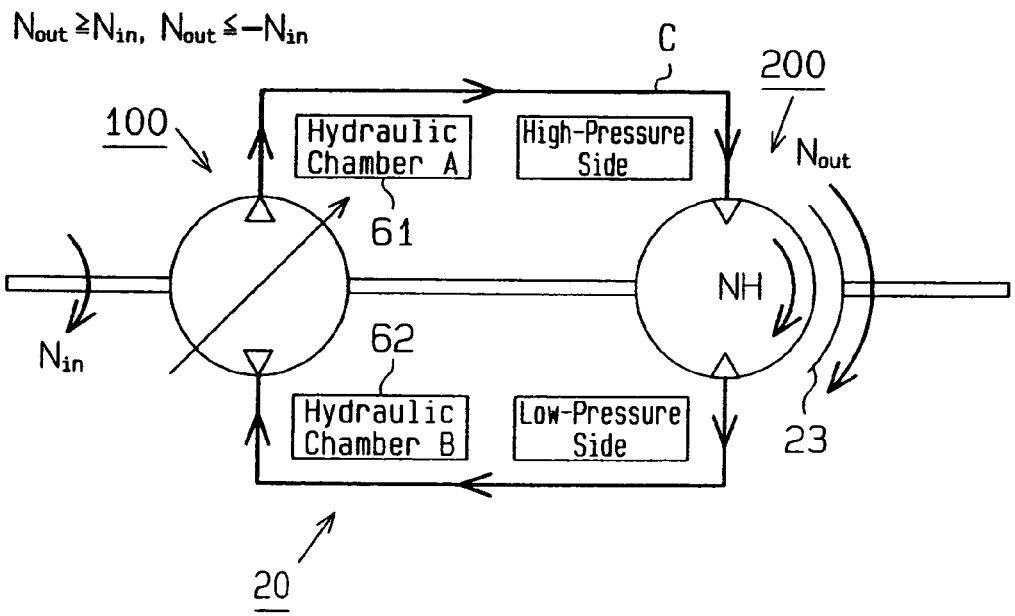
FIG. 10 is a conceptual diagram illustrating the action of this continuously variable transmission.

As the swash plate surface 44 is shifted toward the negative maximum tilt angle position from the upright position, the stroke volume VP of the first hydraulic system 100 increases to VMmax from 0 and the number of output rotations Nout increases to 2Nin from Nin accordingly in FIG. 12. It is to be noted that the stroke volume VM of the second hydraulic system 200 when the number of output rotations Nout changes to 2Nin from Nin remains at VMmax. FIG. 10 shows the flow of the working oil and how each section rotates in this state. The arrows in the hydraulic closing circuit C indicate the flow of the working oil while the arrows given to the number of rotations Nin and Nout indicate the directions of rotation of the associated members.

(In the Case where the Number of Output Rotations Nout is between Zero and Nin)

By operating the shift lever 146, the swash plate surface 44 of the cradle 45 is tilted to the positive side to be positioned at the positive tilt angle position from the upright position. Of the positive tilt angle position, a predetermined positive tilt angle position is the position at which the absolute value of the stroke volume VP of the first hydraulic system 100 becomes equal to the absolute value of the stroke volume VM of the second hydraulic system 200.

In this state, since the swash plate surface 44 is tilted in the forward direction, as the driving force of the engine 22 causes the cylinder block 42 to rotate via the input shaft 21, the first hydraulic system 100 discharges the working oil from the plunger hole 47 via the port U in the range of the rotational angle of 0 degrees to 180 degrees about the axis O of the cylinder block 42 and draws the working oil into the plunger hole 47 via the port U in the range of 180 degrees to 360 (0) degrees. The hydraulic chamber in which the working oil is discharged and the hydraulic chamber from which the working oil is drawn are determined by the areas H and I corresponding to the rotational angle about the axis O of the cylinder block 42.

The amounts of the working oil to be discharged and drawn by the first hydraulic system 100 increase as the tilt angle of the swash plate surface 44 to the positive side increases. At this time, the second hydraulic system 200 discharges the working oil from the second plunger hole 57 via the port W in the range of the relative rotational angle of 0 degrees to 180 degrees about the axis O of the yoke 23 (output rotary section) with respect to the cylinder block 42 and draws the working oil into the second plunger hole 57 via the port W in the range of 180 degrees to 360 (0) degrees. The hydraulic chamber in which the working oil is discharged and the hydraulic chamber from which the working oil is drawn are determined by the areas J and K corresponding to the relative rotational angle of the yoke 23 (output rotary section) about the axis O with respect to the cylinder block 42.

As a result, the projecting pressurization of the plunger 58 on the rotary inclined surface 51 causes reverse rotation to that of the "in the case where the number of output rotations Nout is between Nin and 2Nin" to the rotary inclined surface 51. Therefore, the total (sum) of the number of rotations in the reverse direction and the number of rotations of the cylinder block 42 in the forward direction is transmitted to the final reduction gear unit via the yoke 23 and the coupled clutch 152, gear 24 and gear 151. As the sum of the number of rotations at this time becomes the number of rotations in the forward direction reduced by the number of rotations in the reverse direction, the number of output rotations Nout becomes smaller than that "in the case where the number of output rotations Nout is Nin".

In this embodiment, as the swash plate surface 44 is shifted toward the positive maximum tilt angle position from the upright position, the stroke volume VP of the first hydraulic system 100 increases to −VMmax from 0 (the "−" means a case of discharge into the second hydraulic chamber 62 from the port U) and the number of output rotations Nout increases to 0 from Nin accordingly in FIG. 12.

Figure 9:
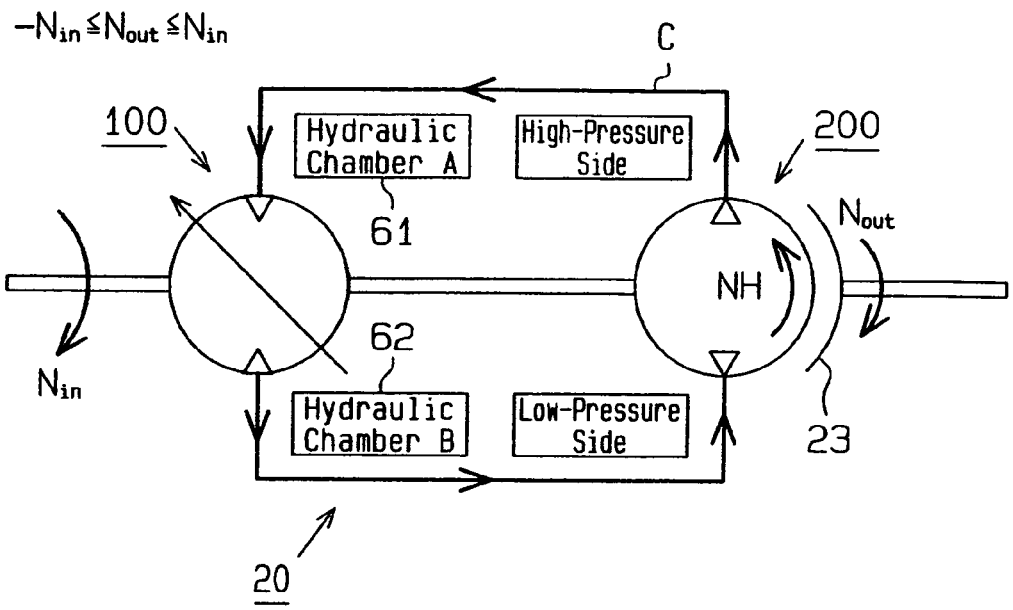
FIG. 9 is a conceptual diagram illustrating the action of the continuously variable transmission of the first embodiment.

It is to be noted that the stroke volume VM of the second hydraulic system 200 per rotation when the number of output rotations Nout changes to 0 from Nin is −VMmax. (The "−" means a case of suction into the port W from the second hydraulic chamber 62.) FIG. 9 is an exemplary diagram in that state. The pressure of the first hydraulic chamber 61 (hydraulic chamber A) becomes higher than that of the second hydraulic chamber 62 (hydraulic chamber B). The arrows in the hydraulic closing circuit C indicate the flow of the working oil while the arrows corresponding to the number of rotations Nin and Nout indicate the directions of rotation of the associated members.

(In the Case where the Number of Output Rotations Nout is Zero)

When the power transmission between the engine 22 and the first hydraulic system 100 is cut off by the clutch mechanism 300, the number of input rotations Nin becomes zero, so that the yoke 23 stops too, making the number of output rotations Nout zero.

(In the Case where the Number of Output Rotations Nout is Less than Zero)

As the shift lever 146 is shifted to the reverse side with power transmission cut off by the clutch mechanism 300, the first clutch 152 of the gear transmission 150 is switched to the disconnected state and the second clutch 153 is switched to the connected state in response to the operation of the shift lever 146. At this time, the rotation of the engine 22 is not transmitted to the continuously variable transmission 20, so that the pressurizing action of the plunger 58 on the rotary inclined surface 51 is gone and the yoke 23 becomes free from the second hydraulic system 200. This can facilitate the connection of the second clutch 153 or the switching at the time of reverse movement. After the shifting of the shift lever 146 to the reverse side is finished, the clutch mechanism 300 is set to the connected state again. At the time of returning to the forward side, the foot-depression type clutch pedal is depressed to disconnect the clutch mechanism 300. At this time, the switching at the time of forward movement can be done easily for the same reason.

(In the Case where the Number of Output Rotations Nout is between Zero and −Nin)

After the reverse connection is done by the second clutch 153, as shown in FIG. 9, the states of changes in the maximum stroke volumes of the first hydraulic system 100 and the second hydraulic system 200 with respect to the number of output rotations Nout are the same as those in the forward moving (forward rotation) case or "in the case where the number of output rotations Nout is between zero and Nin". Therefore, the detailed description will be omitted. In this case, however, the rotation that is imparted to the rotary inclined surface 51 is transmitted to the final reduction gear unit via the yoke 23, the second clutch 153, the gear 24, the idler gear 156, the idler gear 157, the gear 159 and the gear 160.

(In the Case where the Number of Output Rotations Nout is between −Nin and −2Nin)

In this case, as the actions of the first hydraulic system 100 and the second hydraulic system 200 are likewise the same as those "in the case where the number of output rotations Nout is between Nin and 2Nin" (see FIG. 10), the detailed description will be omitted. At this time, the rotation that is imparted to the rotary inclined surface 51 is transmitted to the final reduction gear unit via the yoke 23, the second clutch 153, the gear 24, the idler gear 156, the idler gear 157, the gear 159 and the gear 160.

The above-described embodiment provides the following advantages.

(1) In this embodiment, as the cylinder block 42 rotates, the retainer 70, 83 holds the selector valve 66, 76 and the flange top surface or flange back surface presses the tapered surface 66d, 76d, thus ensuring reciprocation of the selector valve 66, 76.

There is known an apparatus which has a ball bearing provided at the distal end side of the selector valve 66, 76 with its axis tilted by a given angle with respect to the axis O of the cylinder block 42, and the side surface of the inner ring of the ball bearing (equivalent to the swash plate) was used as the cam surface for reciprocating the selector valve 66, 76. A spring is provided on the bottom portion 63a, 64a of the valve hole 63, 64 positioned on the proximal end side of the selector valve 66, 76 and the working oil from the charge pump is filled there. The selector valve 66, 76 is always urged toward the ball bearing by the urging force of the spring and the hydraulic pressure of the working oil. With the selector valve 66, 76 abutting on the side surface of the inner ring of the ball bearing, as the ball bearing rotates about the axis O together with the cylinder block 42, reciprocal motion is imparted to the selector valve 66, 76.

To reciprocate the selector valve 66, 76, however, the spring and fluid passage or the like should be provided, complicating the structure and leading to a cost increase.

By way of contrast, the structure of this embodiment does not require the provision of a spring for pressing the selector valve 66, 76 against the swash plate. Further, as the bottom portion 63a, 64a of the valve hole 63, 64 need not be filled with the working oil from the charge pump, it is unnecessary to provide a fluid passage or the like for that purpose. The reciprocation structure of the selector valve 66, 76 can therefore be made simple. The reduction in the number of parts can contribute to reducing the manufacture cost.

(2) In this embodiment, the tapered surface 66d is formed on both lengthwise sides of the constricting portion 66b, 76b which engages with the stop groove 73 of the flange 72 and both sides of the flange 72 are arranged so as to be in line contact with the tapered surface 66d. As compared with the case where the flange 72 and the selector valve 66, 76 are made in point contact with each other, for example, the load on the abutting portion can be reduced at the time of reciprocating the selector valve 66, 76, thus improving the durability.

(3) In the embodiment, the input shaft 21 and the cylinder block 42 of the continuously variable transmission 20 are rotated by the engine 22, the input shaft 21 extends opposite to the engine 22, the yoke 23 (output rotary section) is provided on the outer surface of the extended input shaft 21, the gear transmission 150 (forward/reverse rotation switching device) which transmits the rotation of the yoke 23 to the output shaft 155 is provided, and further, the clutch mechanism 300 (disconnection means) is provided between the engine 22 and the input shaft 21, thereby constructing the power transmission apparatus. Accordingly, the same effects as those of the continuously variable transmission 20 can be acquired in the power transmission apparatus.

(4) In this embodiment, the output rotation can be acquired from both the input shaft 21 extending on the output side and the yoke 23. Further, the rotation of the yoke 23 or the drive torque in the forward and reverse directions and in a wide range can be transmitted to the final reduction gear unit by the cradle 45 and the gear transmission 150.

(5) In this embodiment, switching the clutch mechanism 300 to the disconnected state can release the torque on the yoke 23, making it possible to easily carry out the operation of switching the rotation of the yoke 23 from the forward direction to the reverse direction or from the reverse direction to the forward direction.

Second Embodiment

Next, the second embodiment of the present invention will be described based on FIGS. 13 to 15.

In the second embodiment, the same reference numerals are given to those components which are the same as or equivalent to the components of the first embodiment and their descriptions will be omitted.

This embodiment differs from the first embodiment in the structure including valve actuation members 170 and 183, which imparts a reciprocal motion to the selector valve 66, 76.

Figure 13:
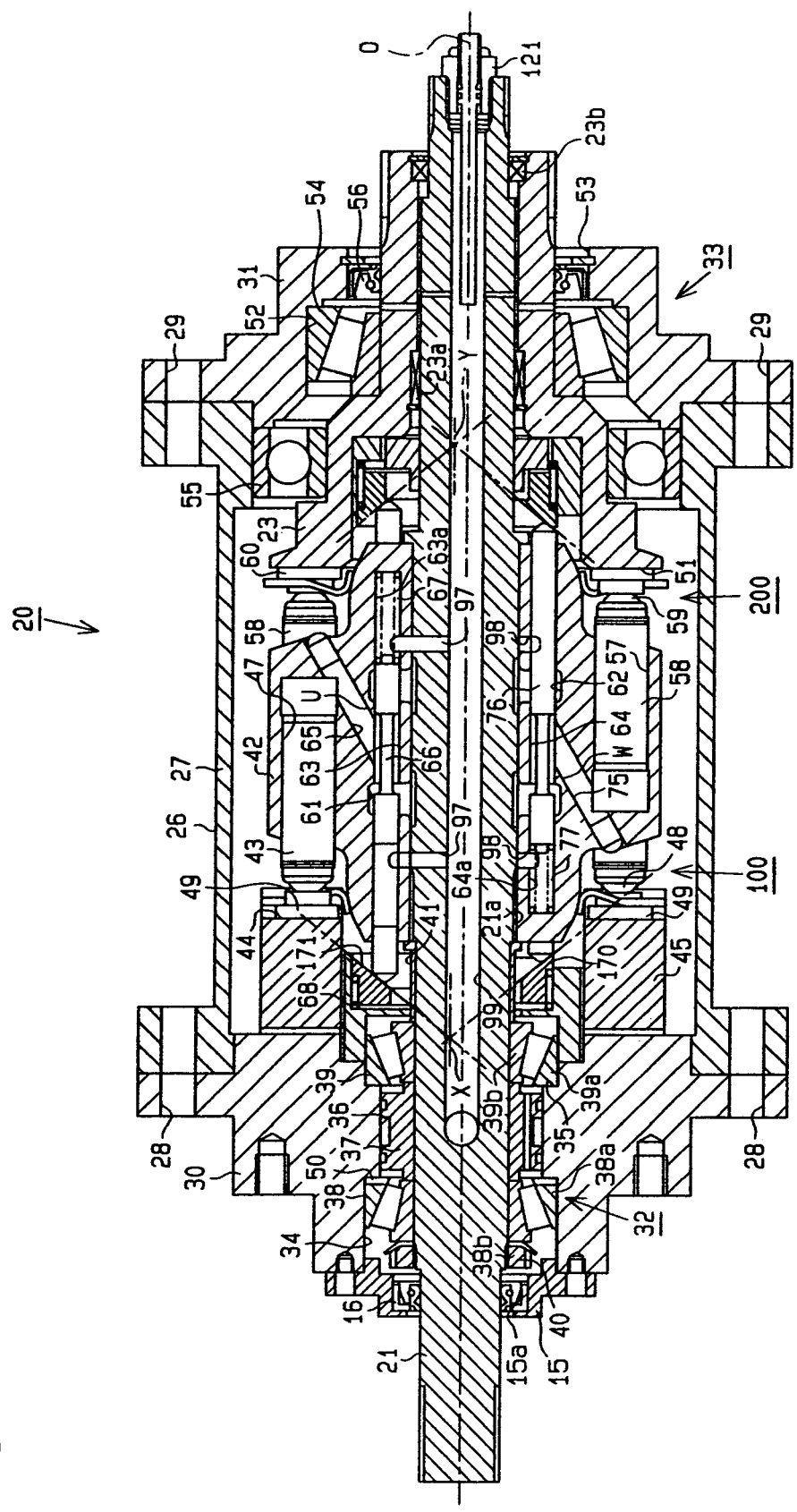
FIG. 13 is a cross-sectional view of a continuously variable transmission according to a second embodiment.

As shown in FIGS. 13 and 15, a coil spring 67 is disposed on the bottom portion 63a of the first valve hole 63 and the first selector valve 66 is urged by the coil spring 67 in the same direction as the direction in which the first plunger 43 projects from the cylinder block 42. As shown in FIG. 14, the distal end portion of the first selector valve 66, which is projecting from the cylinder block 42 (hereinafter referred to as the abutment end 66a), is formed approximately conical.

Figure 14:
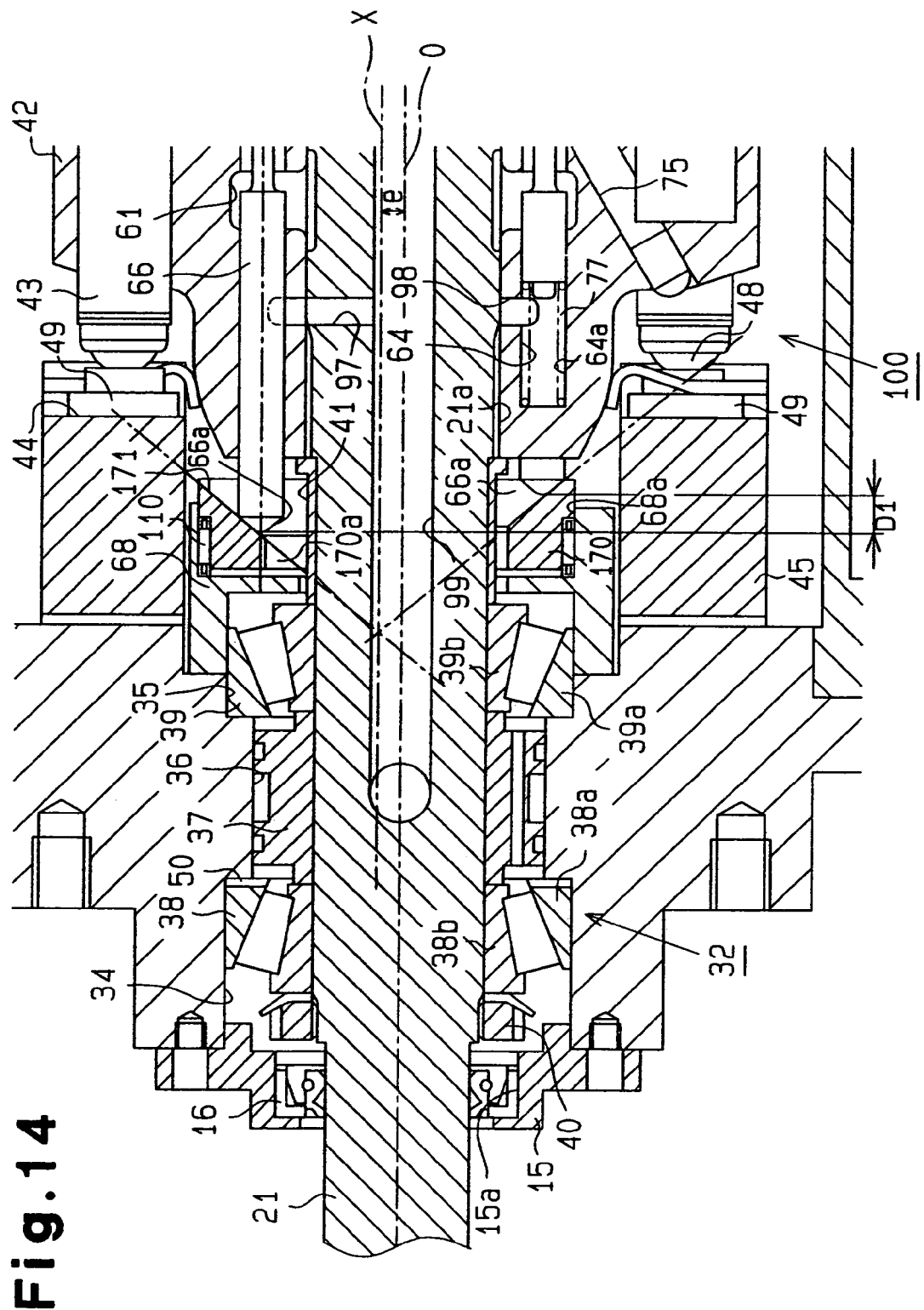
FIG. 14 is an enlarged cross-sectional view of a part of the continuously variable transmission in FIG. 13.

As shown in FIG. 14, the holder 68 fixed to the outer surface of the outer ring 39a of the conical roller bearing 39 is formed cylindrically, and the valve actuation member 170 is rotatably supported on a cylinder-block-42 side retaining portion 68a on its inner surface via a needle bearing 110. This needle bearing 110 allows the valve actuation member 170 to rotate in synchronism with the cylinder block 42.

The valve actuation member 170 will be discussed in detail. The valve actuation member 170 is formed cylindrically and has a through hole 170a formed approximately in the center portion. The valve actuation member 170 is laid out with its axis X offset by a predetermined distance e in parallel to the axis O of the cylinder block 42. The input shaft 21 is inserted in the through hole 170a. The axis O corresponds to the axis of the cylinder block.

A cam portion 171 is formed on the cylinder-block 42 side of the valve actuation member 170 in connection with the through hole 170a. The inner surface of the cam portion 171 is a conical surface formed in such a way as to enlarge toward the cylinder block 42. The valve actuation member 170 including the cam portion 171 is formed axisymmetrical to the axis X of the valve actuation member 170 as seen in the cross section along the axis X. The inner surface (conical surface) of the cam portion 171 corresponds to the inclined surface.

The conical abutment end 66a of the first selector valve 66 is so formed as to be in line contact with the inner surface of the cam portion 171 and abuts on the conical surface of the cam portion 171. Therefore, as the urging force of the coil spring 67 and the hydraulic pressure of the working oil by the charge pump (not shown), to be discussed later, are applied to the first selector valve 66, the first selector valve 66 rotates in synchronism with the cylinder block 42 in such a state as to abut and be held on the valve actuation member 170. As the axis X of the valve actuation member 170 is offset with respect to the axis O of the cylinder block 42, the first selector valve 66 reciprocates by a distance D1 in the direction of the axis O along the cam portion 171 and accomplishes displacement as shown in FIG. 7, while the cylinder block 42 makes one turn about the axis O.

As the cylinder block 42 rotates, therefore, the first selector valve 66 reciprocates along the direction of the axis O between the first opening position n1 at which the port U (fluid passage 65) is connected to the second hydraulic chamber 62 and the second opening position n2 at which the port U (fluid passage 65) is connected to the first hydraulic chamber 61 with the port closing position n0 as the reference (see FIG. 7). The distance D1 corresponds to the distance between the second opening position n2 and the first opening position n1 in FIG. 7.

Meanwhile, as shown in FIGS. 13 and 14, the second selector valve 76 is urged by a coil spring 77, disposed on the bottom portion 64a of the second valve hole 64, in the same direction as the direction in which the second plunger 58 projects from the cylinder block 42. As shown in FIG. 15, the distal end portion of the second selector valve 76 which is projecting from the cylinder block 42 (hereinafter referred to as the abutment end 76a) is formed approximately conical.

As shown in FIG. 15, a cylindrical holder 93 is fixed in the retaining hole 78 formed in the center portion of the cylinder-block-42 side end face of the yoke 23. A diameter-increased portion 93a which enlarged toward the cylinder block 42 is formed on the inner surface of the holder 93, and the valve actuation member 183 is rotatably supported on the diameter-increased portion 93a via a needle bearing 94. This needle bearing 94 allows the valve actuation member 183 to rotate in synchronism with the cylinder block 42.

A diameter-reduced portion 93b is formed on that side of the holder 93 which is opposite to the cylinder block 42 and a support member 95 is rotatably inserted into the diameter-reduced portion 93b. The input shaft 21 is inserted in the support member 95 which is fixed with respect to the input shaft 21. The valve actuation member 183 is held on the support member 95 via a shim 96.

The valve actuation member 183 is formed cylindrically and has a through hole 183a formed approximately in the center portion. The valve actuation member 183 is laid out with its axis Y offset by a predetermined distance f in parallel to the axis O of the cylinder block 42 (input shaft 21). The input shaft 21 is inserted in the through hole 183a. The amount of offset (predetermined distance) e in the first hydraulic system 100 and the amount of offset (predetermined distance) f in the second hydraulic system 200 are set equal to each other.

A cam portion 184, which communicates with the through hole 183a, is formed on the cylinder-block 42 side of the valve actuation member 183. The inner surface of the cam portion 184 is a conical surface formed in such a way as to enlarge toward the cylinder block 42. The valve actuation member 183 including the cam portion 184 is formed axisymmetrical to the axis Y of the valve actuation member 183 as seen in the cross section along the axis Y. The inner surface (conical surface) of the cam portion 184 corresponds to the inclined surface.

The conical abutment end 76a of the second selector valve 76 is formed so as to be in line contact with the cam portion 184 and abuts on the cam portion 184. As a result, as the urging force of the coil spring 77 and the hydraulic pressure of the working oil by the charge pump (not shown), to be discussed later, are applied to the second selector valve 76, the second selector valve 76 rotates in synchronism with the cylinder block 42 in such a state as to abut on the valve actuation member 183. As the axis Y of the valve actuation member 183 is offset with respect to the axis O of the cylinder block 42, the second selector valve 76 reciprocates by a distance D2 in the direction of the axis O by the cam portion 184 and accomplishes displacement as shown in FIG. 7, while the cylinder block 42 makes one turn about the axis O. The reciprocal distance D1 of the first selector valve 66 and the reciprocal distance D2 of the second selector valve 76 are set equal to each other.

In FIG. 13, as the valve actuation members 170 and 183 are made rotatable, the relative positions of the conical surface of the cam portion 171 of the valve actuation member 170 and the conical surface of the cam portion 184 of the valve actuation member 183 vary but they are shown as one for the sake of descriptive convenience.

As shown in FIGS. 13 to 15, a fluid passage 97 which extends in the radial direction and communicates with the shaft hole 99 is formed in the input shaft 21 at the position corresponding to the first valve hole 63. A peripheral groove 98 which is inserted into the bottom portions 63a and 64a of the first and second valve holes 63 and 64 is formed in the inner surface of the cylinder block 42, and the peripheral groove 98 is connected to the fluid passage 97. As a result, the working oil from the charge pump is filled in the bottom portions 63a and 64a of the first and second valve holes 63 and 64 where the coil springs 67 and 77 are disposed via the shaft hole 99, the fluid passage 97 and the peripheral groove 98. In this embodiment, the valve actuation members 170 and 183 correspond to the reciprocation imparting members.

A description will be given of the actions of the first and second selector valves 66 and 76 in the continuously variable transmission 20 (the first and second hydraulic systems 100 and 200) constructed in the above-described manner.

First, by the cooperation of the hydraulic pressure in the bottom portion 63a, 64a of the valve hole 63, 64 and the urging force of the coil spring 67, 77 at the bottom portion 63a, 64a, each selector valve 66, 76 is always pressed toward the cam portion 171, 184 of the valve actuation member 170, 183 and is held abutting on the corresponding cam portion.

As the cylinder block 42 rotates, the selector valve 66, 76 reciprocates along the axis O. At this time, the valve actuation member 170, 183 rotates in synchronism with the cylinder block 42 and rotates relative to the swash plate surface 44 or the yoke 23 (rotary inclined surface 51). In the case where the proximal end of the selector valve 66, 76 approaches the bottom portion 63a, 64a of the valve hole 63, 64, that portion of the conical surface of the cam portion 171 which abuts on the abutment end 66a, 76a moves toward the side of the cylinder block 42 and presses the abutment end 66a, 76a of the selector valve 66, 76 toward the cylinder block 42. Then, the selector valve 66, 76 compresses the coil spring 67, 77 against its own urging force and discharges the working oil in the bottom portion 63a, 64a of the valve hole 63, 64 toward the peripheral groove 98.

Meanwhile, in the case where the proximal end of the selector valve 66, 76 moves away from the bottom portion 63a, 64a of the valve hole 63, 64, that portion of the conical surface of the cam portion 171, 184 which abuts on the abutment end 66a, 76a moves opposite to the cylinder block 42. At this time, the resilient force of the coil spring 67, 77 and the hydraulic pressure of the working oil in the bottom portion 63a, 64a of the valve hole 63, 64 acts on the selector valve 66, 76. Then, the first and second selector valves 66 and 76 move in such a way that the abutment ends 66a, 76a protrude from the cylinder block 42 while maintaining abutment on the cam portions 171, 184.

The abutment end 66a, 76a abuts on the cam portion 171, 184 formed in a tapered shape, not the swash plate, in this manner, thereby accomplishing the reciprocal motion of the selector valve 66, 76. As the valve actuation member 170, 183 (cam portion 171, 184) has a cross-sectional shape axisymmetrical to the axis X, Y, it is possible to keep the weight balance well with respect to the axis O of the cylinder block 42.

Therefore, this embodiment provides the following advantages in addition to those described in (3) to (5) of the first embodiment.

(1) In this embodiment, the cam portion 171, 184 is provided on the cylinder-block 42 side of the valve actuation member 170, 183 which rotates in synchronism with the cylinder block 42 and its inner surface is formed conical. And, the axis X, Y of the valve actuation member 170, 183 is offset by predetermined distances e, f with respect to the axis O of the cylinder block 42. As a result, as the cylinder block 42 rotates, reciprocation is imparted to the selector valve 66, 76.

Unlike the above-described conventional apparatus, therefore, the selector valve 66, 76 is made to abut on the conical cam portion 171, 184 formed axisymmetrical with the axis X, Y, not the ball bearing, so that balance correction along the axis O is easy at the time the selector valve 66, 76 reciprocates.

Each embodiment described above may be modified and embodied as follows.

Although the tapered surface 66d, 76d is formed on the constricting portion 66b, 76b, which engages with the stop groove 73 of the flange 72, in each lengthwise side in the first embodiment, the tapered surface may be omitted as shown in FIG. 6(c). In this case, each flange 72 is in point contact with the large-diameter portion 66c, 76c of the selector valve 66, 76.

Figure 16B:
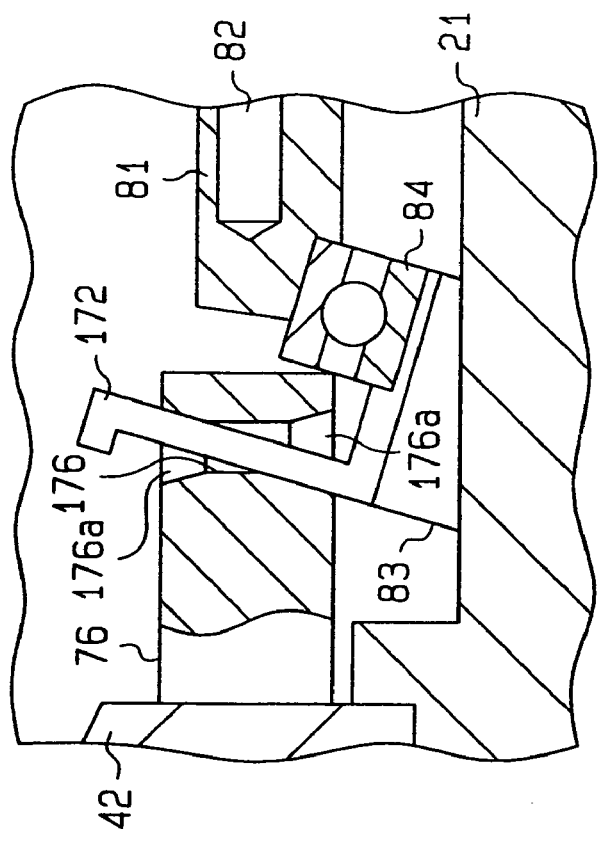
FIG. 16(a) is a front view showing reciprocation of an imparting member (retainer) according to a modification of the second embodiment and FIG. 16(b) is an enlarged view of essential portions of the same.
Figure 16A:
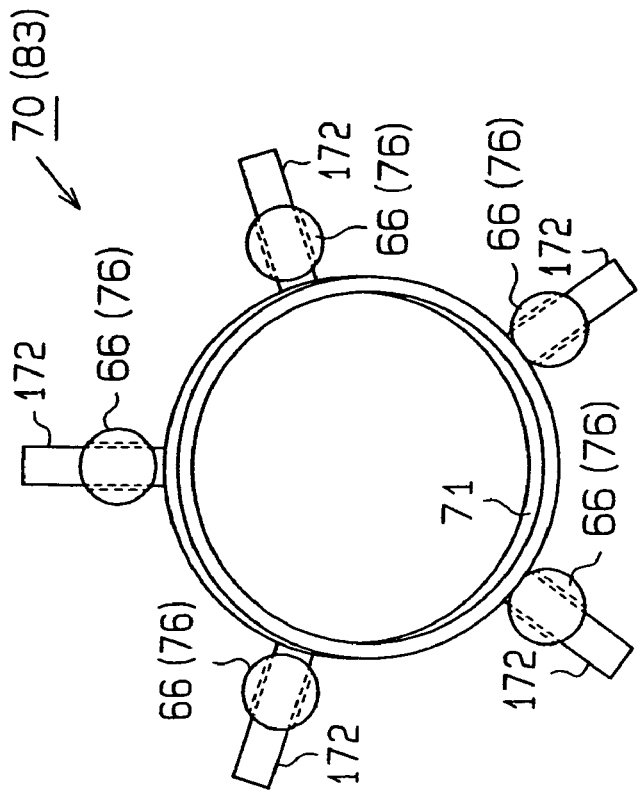

Instead of the retainer 70 and the selector valve 66, 76 in the first embodiment, the retainer and the selector valve may be constructed as shown in FIGS. 16(a) and (b). That is, as shown in FIG. 16(a), the retainer 70, 83 comprises a cylindrical cylinder portion 71 and a plurality of engagement projections 172 formed projecting out at equal angles over the periphery of the cylinder-block 42 side end portions of the cylinder portion 71. As shown in FIG. 16(b), each engagement projection 172 is formed in an L shape.

The retainer 70, 83 is laid out in such a way that its axis is askew to the axis O via the ball bearing 69, 84. Therefore, an imaginary plane including that face of each engagement projection 172 which faces the cylinder block 42 is askew to the axis O.

Meanwhile, an engagement hole 176 is formed in each selector valve 66, 76 and the individual engagement projection 172 is inserted there. Both opening portions of the engagement hole 176 are tapered surfaces 176a and both side surfaces of the engagement projection 172 come in line contact with the tapered surfaces 176a. Even this provides the same action and effects as those of the second embodiment. While FIG. 16(b) shows the retainer 83 on the second-hydraulic-system 200 side, the retainer 70 on the first-hydraulic-system 100 side has the same structure.

Figure 17:
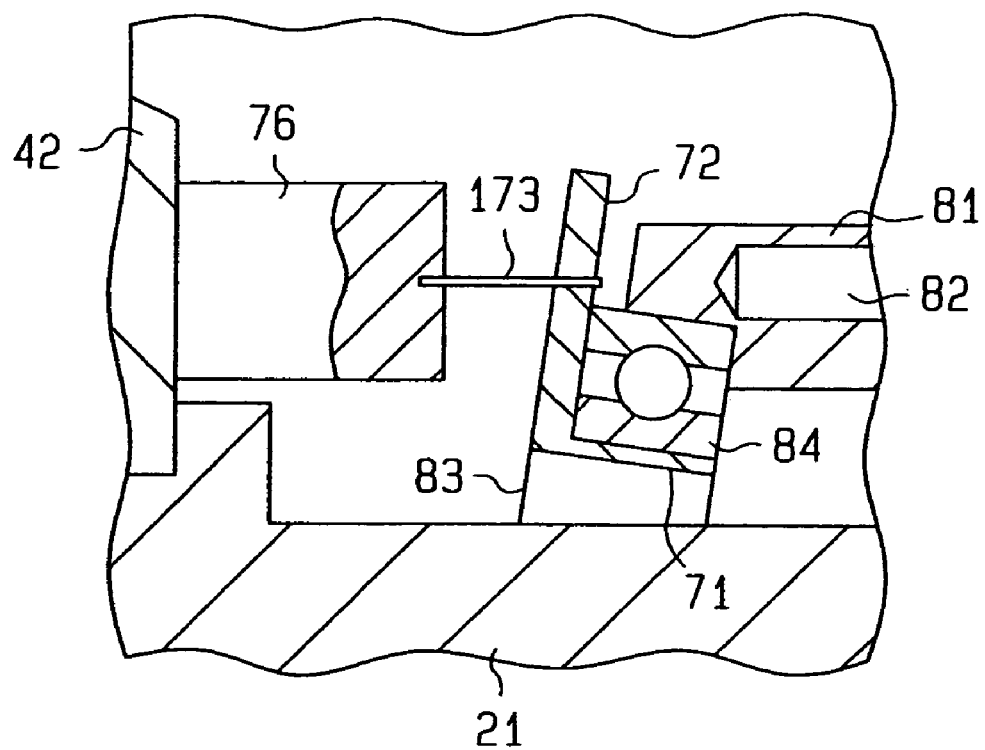
FIG. 17 is an enlarged view of essential portions of the continuously variable transmission according to a modification of the second embodiment.

The retainer 70, 83 of the first embodiment may be constructed as shown in FIG. 17. That is, the flange 72 of the retainer 70, 83 may be coupled to the distal end of the selector valve 66, 76 by a member having a resiliency in the bending direction, such as a piano line 173. Even this structure can impart reciprocation to the selector valve 66, 76 via the piano line 173 at the time the flange top surface of the flange 72 moves toward or away from the cylinder block 42. While FIG. 17 shows the retainer 83 on the second-hydraulic-system 200 side, the retainer 70 on the first-hydraulic-system 100 side has the same structure.

Figure 18:
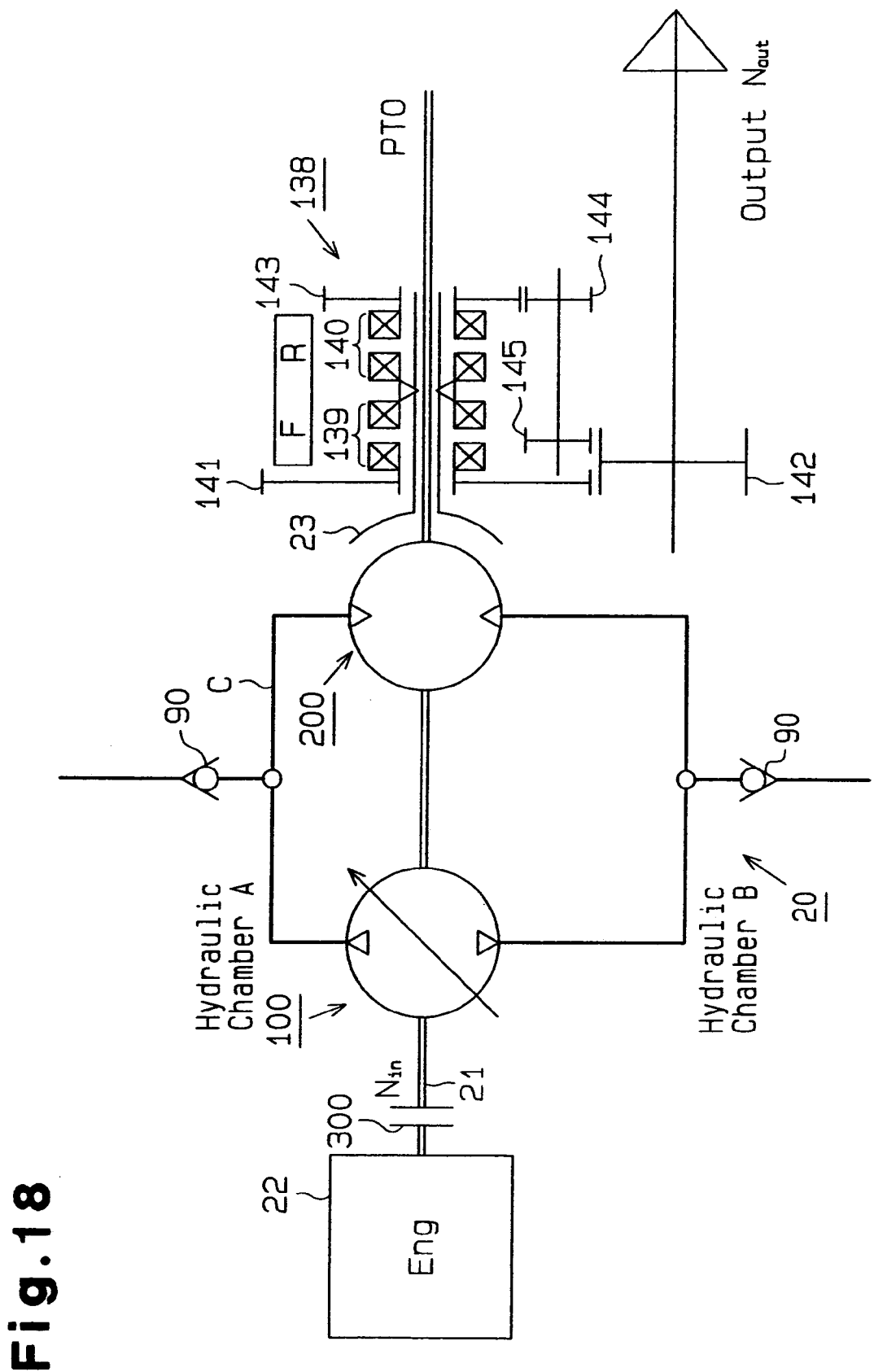
FIG. 18 is likewise a conceptual diagram of essential portions of a power transmission apparatus.

The structures of the gear transmission according to the first and second embodiments may be changed to the structure of a gear transmission (CST) 138 shown in FIG. 18.

The gear transmission 138 has a first clutch 139 and a second clutch 140. In the first clutch 139, when the driven clutch plate is coupled to the drive side clutch plate coupled to the yoke 23, a gear 141 coupled to the driven clutch plate transmits the drive torque to the unillustrated final reduction gear unit via a gear 142. In the second clutch 140, when the driven clutch plate is coupled to the drive side clutch plate coupled to the yoke 23, a gear 143 transmits the drive torque to the unillustrated final reduction gear unit via idler gears 144 and 145 and the gear 142 which is engaged with the idler gear 145.

The gear transmission 138 is linked to the shift lever 146 (see FIG. 11) and based on the operation of the shift lever 146, the first clutch 139 is switched to the connected state at the time of forward movement and the second clutch 140 is switched to the connected state at the time of backward movement.

In the first and second embodiments, the first hydraulic system 100 or the second hydraulic system 200 may be made as a radial type in which the plunger reciprocates in the radial direction of the axis instead of the axial type in which the plunger 43, 58 reciprocates in the axial direction.

In the second embodiment, the inner surface of the cam portion 171, 184 of the valve actuation member 170, 183 may be formed hemispherical. The shape of the cam portion may not be a conical surface or a hemispherical surface but may be a surface with a radial cross section or may take other shapes.

Although the inner surface of the cam portion 171, 184 is formed conical in the second embodiment, the outer surface of the valve actuation member 170, 183 may be made to protrude conically and the selector valve 66, 76 may abut on that outer surface. In such a case, the outer surface of the valve actuation member 170, 183 corresponds to the inclined surface.

Third Embodiment

Next, the third embodiment of the continuously variable transmission which embodies the present invention will be described in detail according to FIGS. 19 to 22, centering on what differs from the first embodiment. The same reference symbols are given to those members which are the same as the members of the first embodiment and their detailed descriptions will be omitted.

Figure 19:
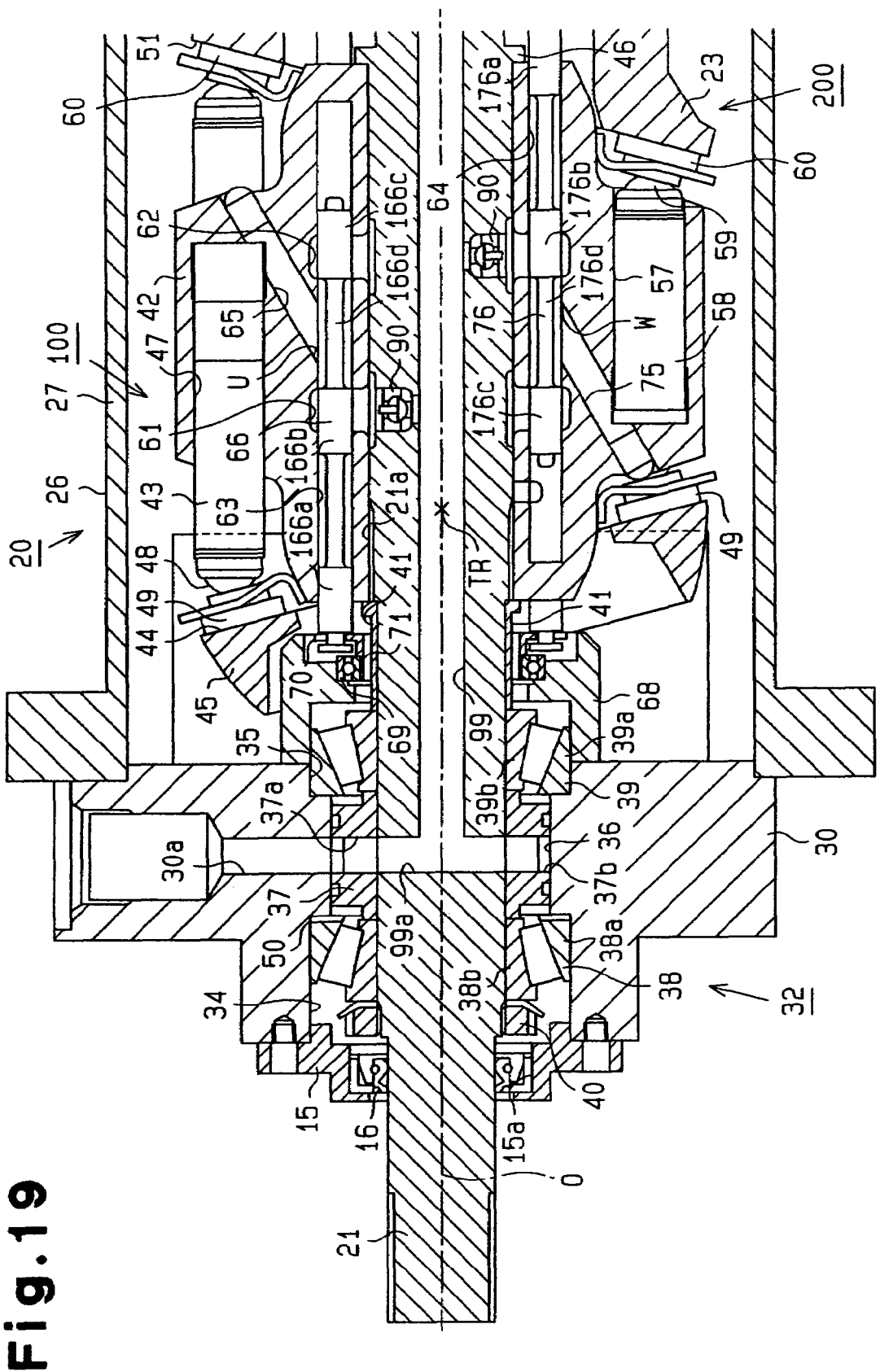
FIG. 19 is a cross-sectional view of a continuously variable transmission according to a third embodiment embodying the invention.

As shown in FIG. 19, a port U for the fluid passage 65 which communicates with the corresponding plunger hole 47 is formed in each first valve hole 63 between the first hydraulic chamber 61 and the second hydraulic chamber 62 as per the first embodiment. The first valve hole 63 has a constant inside diameter up to the back portion, except for the portions which correspond to the first hydraulic chamber 61 and the second hydraulic chamber 61, 62 and, unlike in the prior art (see FIG. 22), does not have a diameter-increased portion at the portion which corresponds to the port U. The port U is equivalent to the merging portion.

The first selector valve 66 switches the fluid passage for the working oil by the reciprocal movement between the first opening position n1 and the second opening position n2. At the time the first selector valve 66 is placed at the port closing position n0 during this reciprocal movement, the working oil is not exchanged between the fluid passage 65 and the first valve hole 63 (i.e., the first hydraulic chamber 61 or the second hydraulic chamber 62). At the time the first selector valve 66 is placed at the port closing position n0, as shown in FIG. 19 and FIG. 7, the shaft portion 166*d* faces the port U, the second land portion 166*b* directly closes the first hydraulic chamber 61 and further the third land portion 166*c* directly closes the second hydraulic chamber 62.

Unlike the prior art (see FIGS. 21 and 22), therefore, the above-described structure can close the port U without placing the land portions 166*a* to 166*c* at relative positions of the port U. Since the cross-sectional area of the shaft portion 166*d* is smaller than the cross-sectional area of the first valve hole 63, the working oil which stays between the second land portion 166*b* and the third land portion 166*c* is positioned over the entire peripheral surface of the shaft portion 166*d*. As a result, unlike in the prior art (see FIG. 21), the reciprocation of the first selector valve 66 is carried out smoothly without pressure being concentrated on a part of the outer surface of the first selector valve 66 by the working oil staying in the fluid passage 65. Since the cross-sectional areas of the second land portion 166*b* and the third land portion 166*c* located on both sides of the shaft portion 166*d* which faces the port U are made approximately the same as the cross-sectional area of the first valve hole 63, the working oil does not of course flow into the first and second hydraulic chambers 61 and 62. The port closing position n0 corresponds to the seal position.

In the area H shown in FIG. 7, the first selector valve 66 moves between the port closing position n0 and the first opening position n1 in such a way as to connect the port U to the second hydraulic chamber 62 as per the above-described embodiment. In this area H, the first selector valve 66 acts as follows with respect to each hydraulic chamber 61, 62. That is, the second land portion 166*b* at the intermediate portion of the first selector valve 66 closes the first hydraulic chamber 61 to disconnect the port U (fluid passage 65) from the first hydraulic chamber 61. Meanwhile, the third land portion 166*c* on the distal end side of the first selector valve 66 moves deep in the first valve hole 63 to connect the port U (fluid passage 65) to the second hydraulic chamber 62.

In the area I shown in FIG. 7, the first selector valve 66 moves between the port closing position n0 and the second opening position n2 in such a way as to connect the port U to the first hydraulic chamber 61. In this area I, the first selector valve 66 acts as follows with respect to each hydraulic chamber 61, 62. That is, the third land portion 166*c* on the distal end side of the first selector valve 66 closes the second hydraulic chamber 62 to disconnect the port U (fluid passage 65) from the second hydraulic chamber 62. Meanwhile, the second land portion 166*b* at the intermediate portion of the first selector valve 66 moves toward the opening of the first valve hole 63 to connect the port U (fluid passage 65) to the first hydraulic chamber 61.

Figure 20:
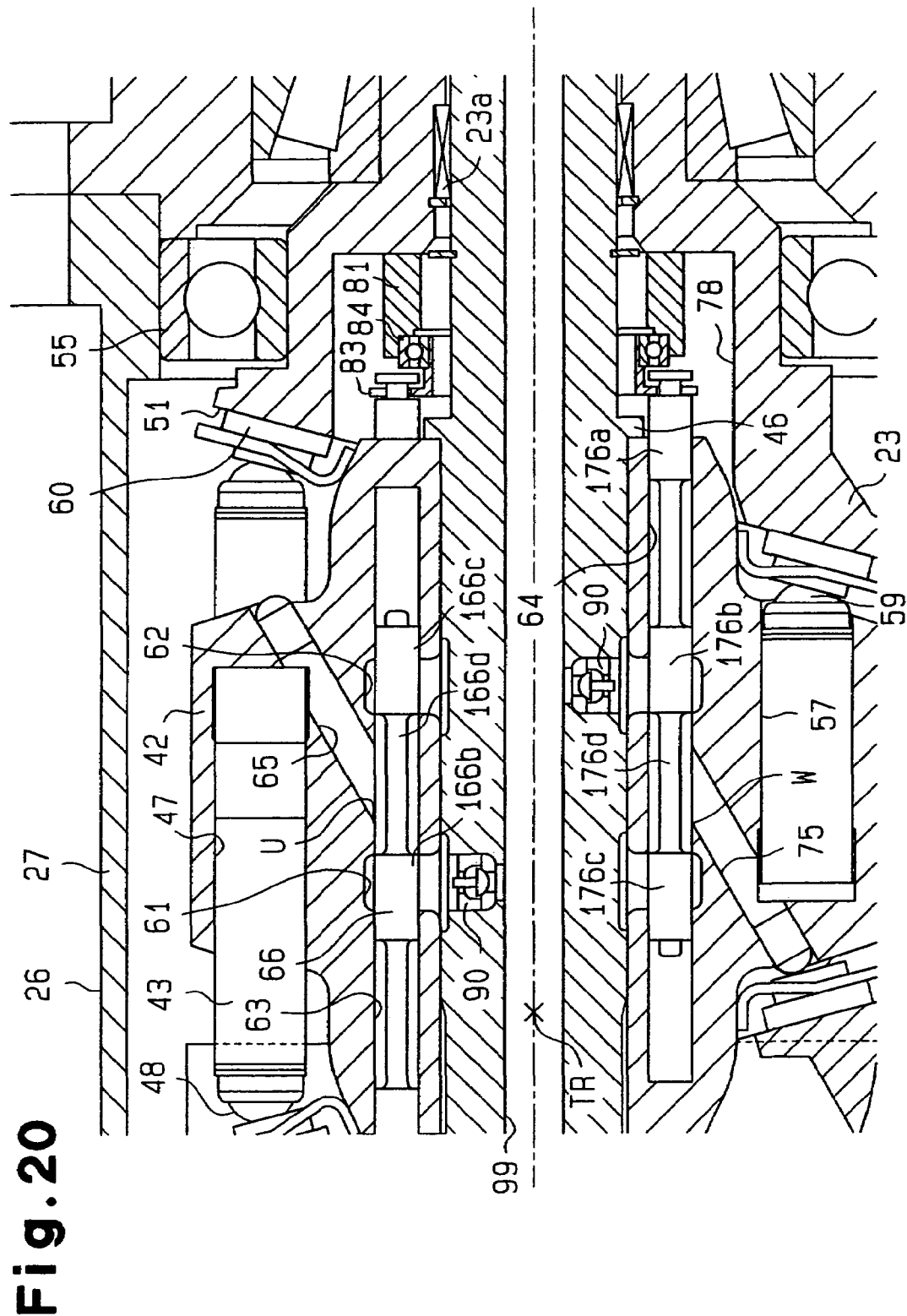
FIG. 20 is a cross-sectional view of essential portions.

As shown in FIG. 20, a port W for the fluid passage 75 which communicates with the corresponding plunger hole 57 is formed in each second valve hole 64 between the first hydraulic chamber 61 and the second hydraulic chamber 62. The second valve hole 64 has a constant inside diameter up to the back portion, except for the portions which correspond to the first hydraulic chamber 61 and the second hydraulic chamber 61, 62 and, unlike in the prior art (see FIG. 22), does not have a diameter-increased portion at the portion which corresponds to the port W. The port W is equivalent to the merging portion.

The spool type second selector valve 76 is disposed slidably in each second valve hole 64 in such a way as to be in parallel to the plunger 58. The second selector valve 76 is equivalent to the distributing valve. The second selector valve 76 comprises a shaft port 176*d* and fourth to sixth land portions 176a to 176c. The structure of the second selector valve 76 is the same as that of the first selector valve 66 and the fourth to sixth land portions 176a to 176c and the shaft portion 176d of the second selector valve 76 are equivalent to the first to third land portions 166a to 166c and the shaft portion 166d of the first selector valve 66.

As shown in FIG. 7, the second selector valve 76 is moved reciprocally between a third opening position m1 at which the port W (fluid passage 75) is connected to the first hydraulic chamber 61 via the second valve hole 64 and a fourth opening position m2 at which the port W (fluid passage 75) is connected to the second hydraulic chamber 62, with a port closing position m0 as the center.

The second selector valve 76 switches the fluid passage for the working oil by the reciprocal movement between the third opening position m1 and the fourth opening position m2. And, at the time the second selector valve 76 is placed at the port closing position m0 during this reciprocal movement, as shown in FIG. 20 and FIG. 7, the shaft portion 176d faces the port W, the fifth land portion 176b directly closes the second hydraulic chamber 62 and further the sixth land portion 176c directly closes the first hydraulic chamber 61.

Unlike the prior art (see FIGS. 21 and 22), therefore, the above-described structure can close the port W without placing the land portion at relative positions of the port W. At this time, since the action and effect based on the difference between the cross-sectional areas of the second valve hole 64 and the second selector valve 76 are the same as those in the case of the first selector valve 66 that has already been described, their descriptions will be omitted. The port closing position m0 corresponds to the seal position.

In the area J shown in FIG. 7, the second selector valve 76 moves between the port closing position m0 and the third opening position m1 in such a way as to connect the port W to the first hydraulic chamber 61. In this area J, the second selector valve 76 acts as follows with respect to each hydraulic chamber 61, 62. That is, the fifth lan b at the intermediate portion of the second selector valve 76 closes the second hydraulic chamber 62 to disconnect the port W (fluid passage 75) from the second hydraulic chamber 62. Meanwhile, the sixth land portion 176c on the distal end side of the second selector valve 76 moves to the back side portion of the second selector valve 76 to connect the port W to the first hydraulic chamber 61.

In the area K, the second selector valve 76 moves between the port closing position m0 and the fourth opening position m2 in such a way as to connect the port W to the second hydraulic chamber 62. In this area K, the second selector valve 76 acts as follows with respect to each hydraulic chamber 61, 62. That is, the sixth land portion 176c on the distal end side of the second selector valve 76 closes the first hydraulic chamber 61 to disconnect the port W (fluid passage 75) from the first hydraulic chamber 61. Meanwhile, the fifth land portion 176b at the intermediate portion of the second selector valve 76 moves toward the opening of the second selector valve 76 to connect the port W (fluid passage 75) to the second hydraulic chamber 62.

Therefore, the above-described embodiment provides the following advantages.

(1) In this embodiment, when the selector valves 66, 76 are placed at the port closing positions n0, m0, the shaft portions 166d, 176d smaller in diameter than the valve holes 63, 64 are made to face the ports U, W to close the first and second hydraulic chambers 61, 62 with the second and third land portions 166b, 166c (fifth and sixth land portions 176b, 176c) which are approximately the same in diameter as the valve holes 63, 64. And, exchange of the working oil between the fluid passage 65 and each hydraulic chamber 61, 62 (valve hole 63, 64) can be stopped. Therefore, the working oil stays over the entire surface of the shaft portion 166d, 176d at the port closing position n0, m0, so that the reciprocal movement of the selector valve 66, 76 can be done smoothly.

(2) Further, unlike in the prior art (see FIG. 22), to accomplish the smooth reciprocal movement of the selector valve 66, 76, it is unnecessary to form a diameter-increased portion at that portion of the valve hole 63, 64 which faces the port U, W, thus making it possible to decrease the processing steps for the valve hole 63, 64.

Fourth Embodiment

Next, the fourth embodiment embodying the present invention will be described referring to FIGS. 23 to 46, centering on what differs from the first embodiment.

In this embodiment, the maximum stroke volume VPmax of the first hydraulic system 100 is set to 1.7 times the maximum stroke volume VMmax of the second hydraulic system 200. Specifically, in this embodiment, the difference between the maximum stroke volumes is acquired by setting the maximum tilt angle of the swash plate surface 44 of the first hydraulic system 100 greater than the tilt angle of the rotary inclined surface 51 of the second hydraulic system 200. Providing the difference between the maximum stroke volumes of the first hydraulic system 100 and the second hydraulic system 200 yields the structure that has a range in which the stroke volume VP of the first hydraulic system 100 exceeds the stroke volume VM of the second hydraulic system 200.

Figure 32:
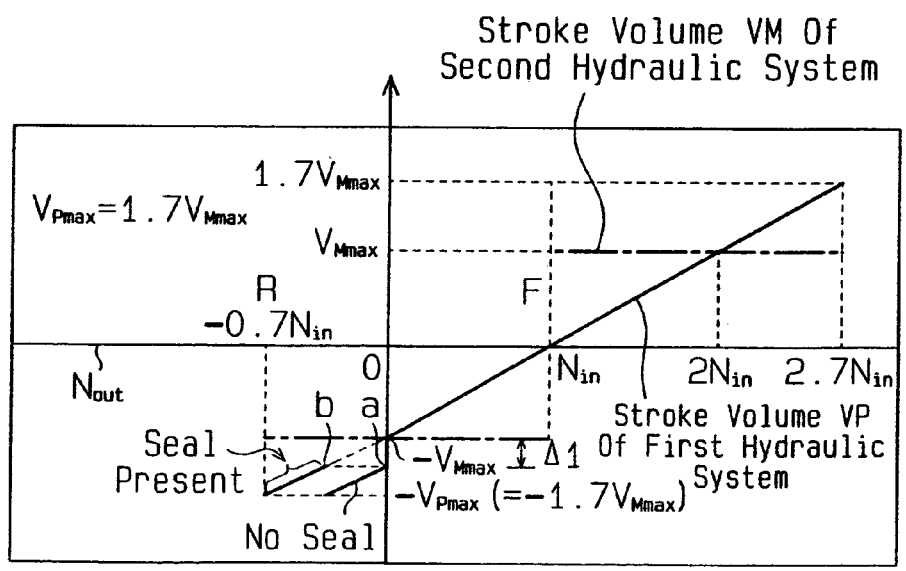
FIG. 32 is a characteristic diagram showing the relationship between stroke volume and the number of output rotations.

The discharge amount of the working oil in the first hydraulic system 100 in this embodiment is set in such a way that in the case where the swash plate surface 44 is displaced from the upright position to a negative tilt angle position, that in FIG. 32, the stroke volume VP of the first hydraulic system 100 at this time changes from 0 to VPmax and accordingly the number of output rotations Nout (the number of rotations of the output gear 24) can take the speed in the range from Nin to 2.7Nin when the number of input rotations of the input shaft 21 is Nin.

Figure 28:
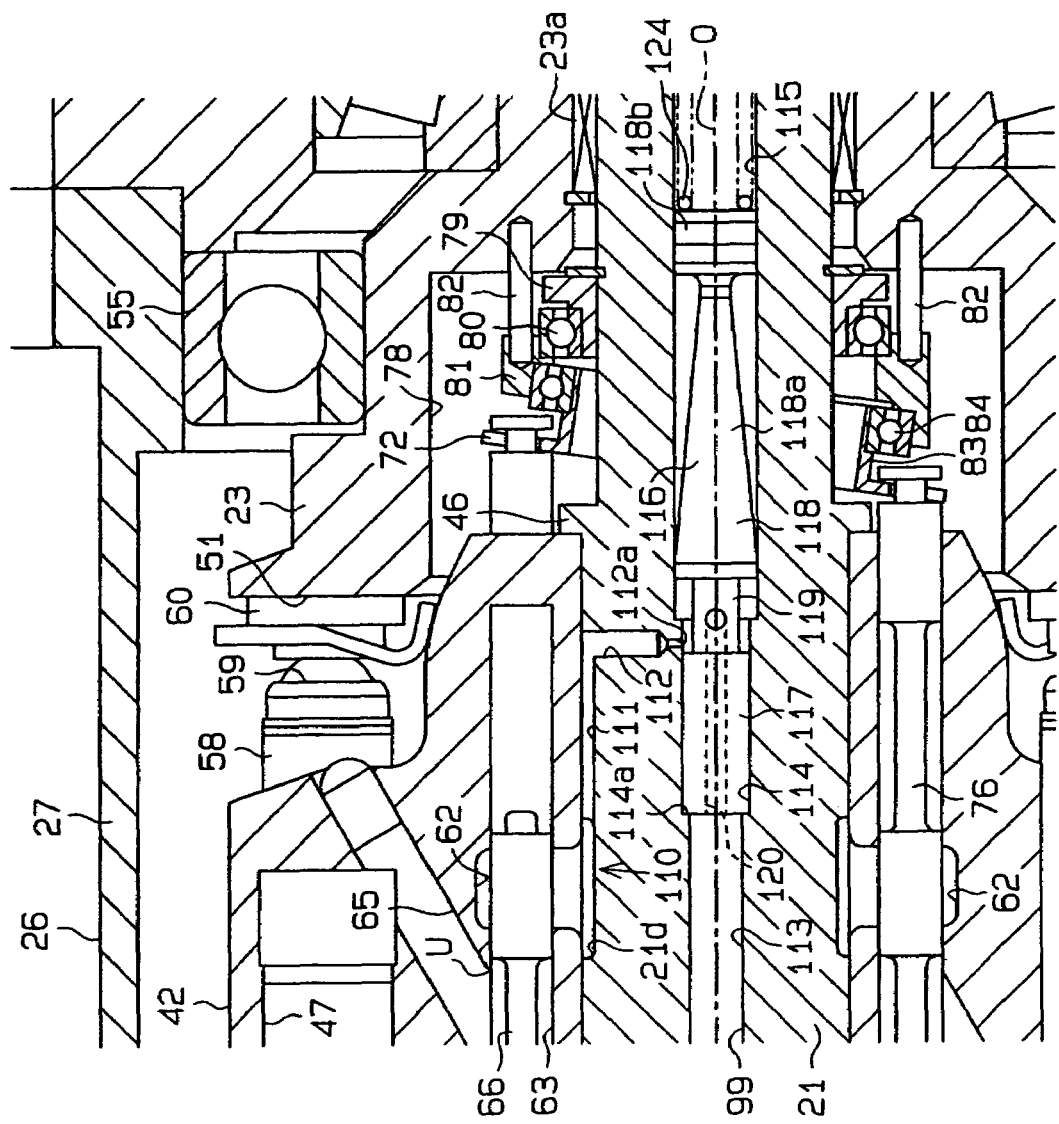
FIG. 28 is a cross-sectional view of essential portions.

As shown in FIG. 28, the retaining hole 78 is formed in the center portion of the cylinder-block 42 side end face of the yoke 23. In the retaining hole 78, a cylindrical holder 79 is fixed integrally to the outer surface of the input shaft 21. The cylindrical support member 81 is integrally coupled to the holder 79 via a ball bearing 80 and via a plurality of pins 82 with respect to the bottom of the retaining hole 78 of the yoke 23 and is attached to the cylinder block 42 in a relatively rotatable manner. The retainer 83 is rotatably coupled to the inner surface of the support member 81 via the ball bearing 84.

Figure 26:
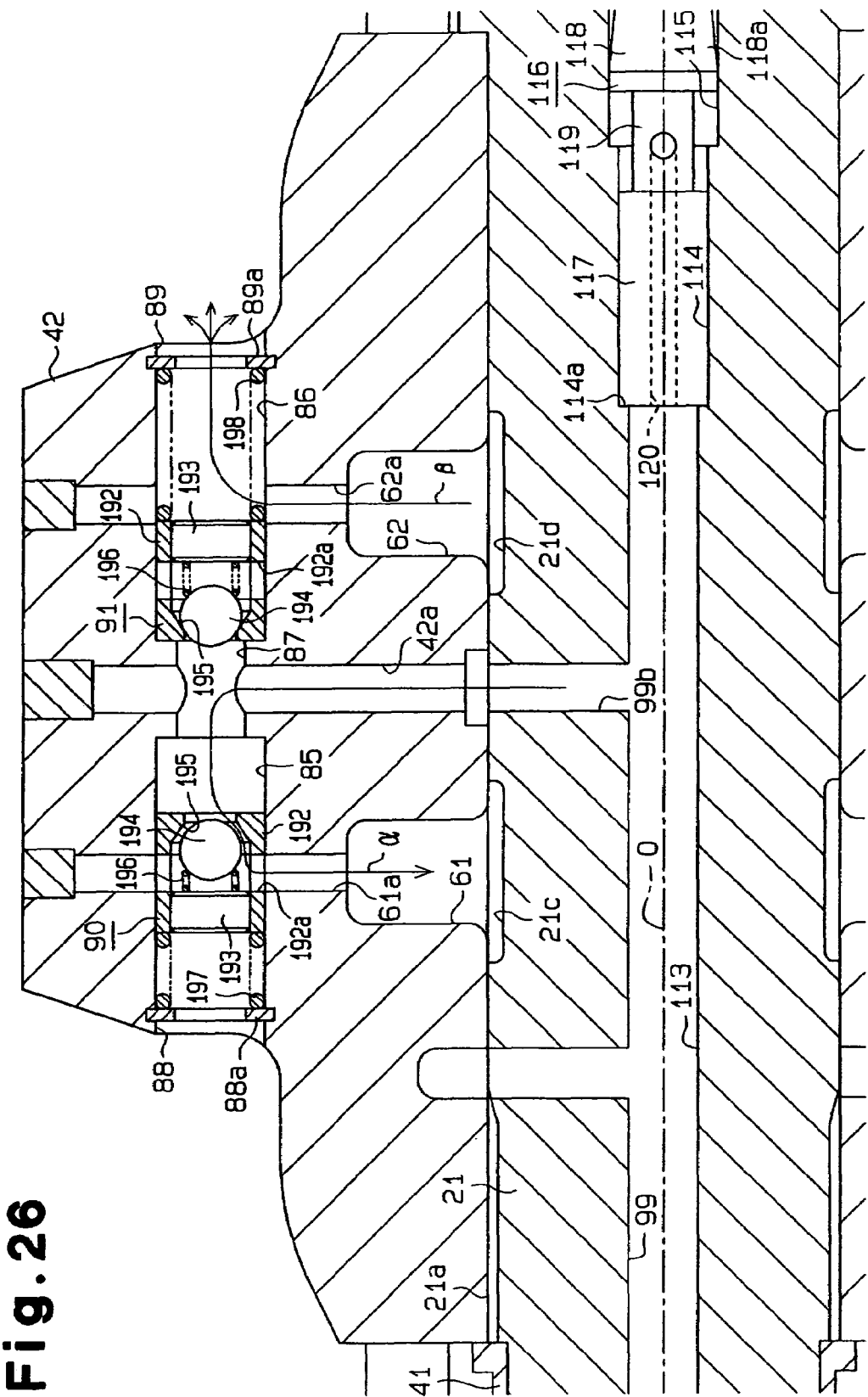
FIG. 26 is a cross-sectional view of essential portions.
Figure 27:
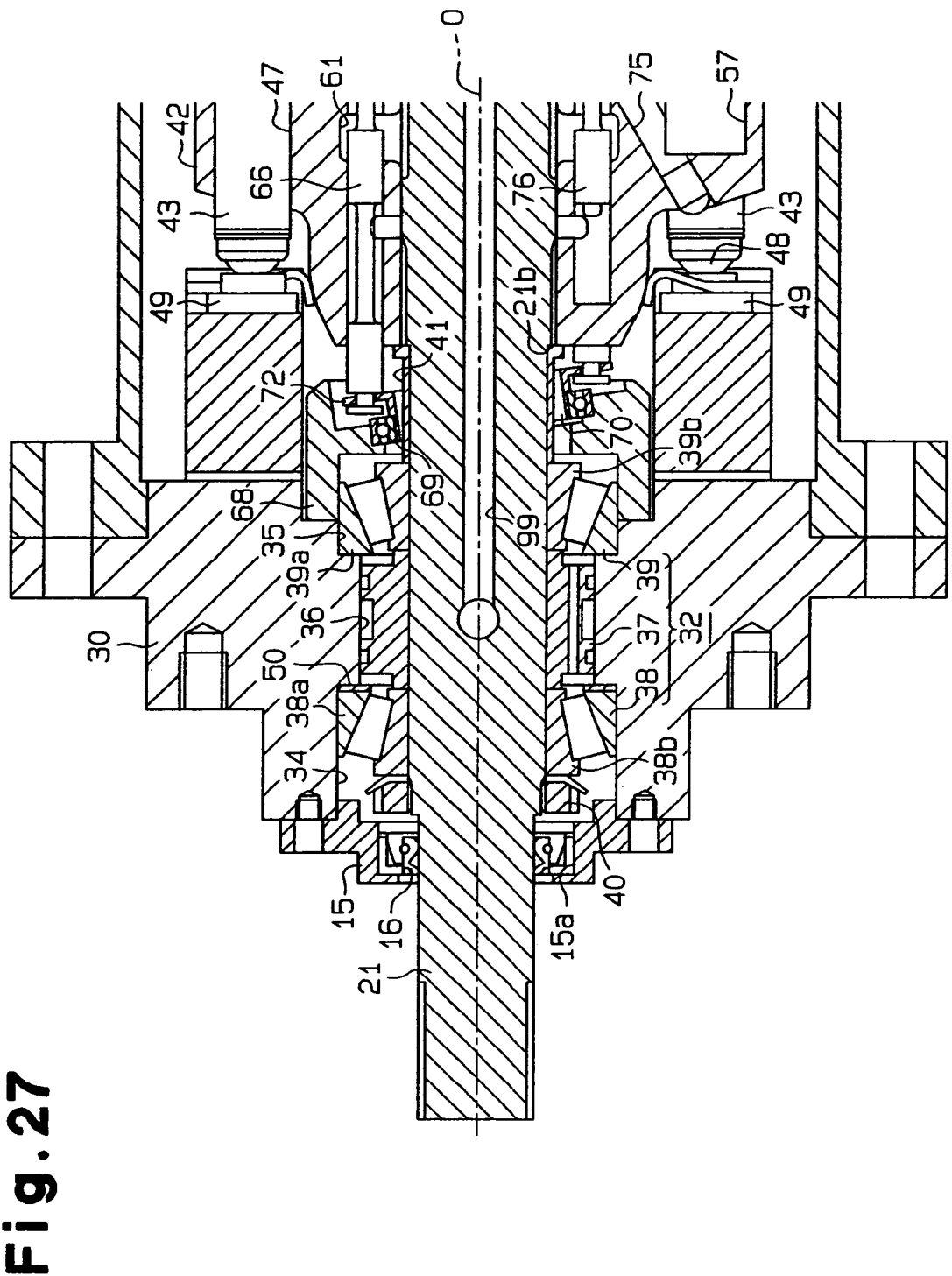
FIG. 27 is a cross-sectional view of essential portions.

As shown in FIG. 26, a pair of valve retaining holes 85 and 86 are located in parallel to the axis O at positions closer to the outer surface of the cylinder block 42 in association with the first hydraulic chamber 61 and the second hydraulic chamber 62. The bottoms of both valve retaining holes 85 and 86 communicate with each other via a through hole 87 made smaller in diameter than the valve retaining hole 85. Openings 88 and 89 open to the outside are formed in both valve retaining holes 85 and 86 at stepped surfaces of the center portion of the cylinder block 42. A pair of charge valves (check valves) 90 and 91 are disposed in both valve retaining holes 85 and 86.

Since the charge valves 90 and 91 have the same structure, the structure of the charge valve 90 will be discussed and same reference symbols are given to the same components of the charge valve 91 to omit their descriptions.

A case body 192 of the charge valve 90 is formed cylindrically. A communication hole 192a which connects the inside and outside is formed in the peripheral wall of the case body 192. An opening portion at one end of the case body 192 is closed by a stopper body 193 and a valve seat 195 for a valve body 194 comprised of a steel ball is formed at an opening portion at the other end. A coil spring 196 is retained between the valve body 194 and the stopper body 193 and causes the valve body 194 to stop at the valve seat 195.

The case body 192 of each charge valve 90, 91 is arranged slidable in the lengthwise direction (the direction parallel to the axis O) with respect to the valve retaining hole 85, 86. Spring stop rings 88a and 89a having C shapes are fixed to the inner surfaces of the openings 88 and 89 of the valve retaining holes 85 and 86. Coil springs 197 and 198 are intervened between the spring stop rings 88a and the individual charge valves 90 and 91 to urge the charge valves 90 and 91 toward the bottoms of the valve retaining holes 85 and 86. The urging forces of the coil springs 197 and 198 will be discussed later.

Communication fluid passages 61a and 62a are formed between the first hydraulic chamber 61 and the valve retaining hole 85 and between the second hydraulic chamber 62 and the valve retaining hole 86. To charge the working oil into the hydraulic closing circuit C, the shaft hole 99 is bored in the input shaft 21 along the axis O. The shaft hole 99 has the inlet fluid passage 99a in the radial direction at the portion which corresponds to the sleeve 37 (see FIG. 25). The inlet fluid passage 99a is connected to the fluid passage 37a bored in the sleeve 37 in the radial direction and the peripheral groove 37b formed in the outer surface. The fluid passage 30a which communicates with the peripheral groove 37b is provided in the side-wall member 30 and the working oil is supplied under pressure into the fluid passage 30a from the unillustrated charge pump.

In the input shaft 21 and the cylinder block 42, as shown in FIG. 26, branch passages 99b and 42a which communicate with the shaft hole 99 are formed at the portions which face the through hole 87. The working oil that is fed into the shaft hole 99 under pressure fills up the hydraulic closing circuit C via the branch passages 99b and 42a, the through hole 87 and the charge valves 90 and 91. That is, the valve body 194 of the charge valve 90, 91 is opened until the pressure in the hydraulic closing circuit C reaches the charge pressure in the shaft hole 99 to feed the working oil in the shaft hole 99 to the hydraulic closing circuit C. The charge valve 90, 91 prevents the counter flow of the working oil to the shaft hole 99.

The urging force of the coil spring 197, 198 is set in such a way that the case body 192 can move to the position at which the communication hole 92a communicates with the communication fluid passage 61a, 62a against the urging force of the coil spring 197, 198.

FIG. 26 shows, on the charge-valve 90 side, that the charge valve 90 is positioned, by predetermined charge pressure of the working oil, at the position at which the communication hole 92a communicates with the communication fluid passage 61a, 62a against the urging force of the coil spring 196. In the diagram, an arrow a indicates the flow of the working oil which passes the branch passages 99b and 42a, the through hole 87, the valve retaining hole 85, the communication hole 92a and the communication fluid passage 61a from the shaft hole 99.

In the case where the charge pressure drops, the urging force of the coil spring 197, 198 causes the case body 192 of the charge valve 90, 91 to abut on the bottom portion of the valve retaining hole 85, 86. At this time, the communication fluid passage 61a, 62a communicates with the outside of the cylinder block 42 via the opening 88, 89 of the valve retaining hole 85, 86, releasing the working oil in the hydraulic closing circuit C to the outside. That is, the hydraulic closing circuit C is directly released to the outside of the cylinder block 42.

FIG. 26 shows, on the charge-valve 91 side, that at the time the working oil falls below the predetermined charge pressure, the urging force of the coil spring 198 causes the case body 192 of the charge valve 91 to abut on the bottom portion of the valve retaining hole 86 so that the communication fluid passage 62a is connected to the outside via the opening 89 of the valve retaining hole 86. In the diagram, an arrow β indicates the moving locus of the working oil which flows from the second hydraulic chamber 62 and out of the cylinder block 42 via the communication fluid passage 62a, the valve retaining hole 86 and the opening 89.

Although FIG. 26 shows the communication hole 92a connected to the communication fluid passage 61a on the charge-valve-90 side and the charge-valve-91 side communication fluid passage 62a connected to the opening 89 of the valve retaining hole 86 for the sake of descriptive convenience, those states do not occur at the same time.

An oil removing portion 110 will be discussed next.

As shown in FIG. 26, peripheral grooves 21c and 21d are formed on the peripheral surface of the input shaft 21 which faces the first hydraulic chamber 61 and the second hydraulic chamber 62. As shown in FIG. 28, the oil removing portion 110 is formed on the input shaft 21. On the outer surface of the input shaft 21, the oil removing portion 110 has a groove portion 111, which extends in the axial direction and communicates with the peripheral groove 21d, and a fluid passage 112 which is bored in the diametrical direction of the input shaft 21 from the end of the groove portion 111 and communicates with the shaft hole 99. The shaft hole 99 has a small-diameter portion 113 which communicates with the inlet fluid passage 99a and the branch passage 99b, an intermediate-diameter portion 114 adjacent to the small-diameter portion 113 and a large-diameter portion 115 open to the output end face of the input shaft 21, as shown in FIG. 28. The individual portions 113 to 115 are formed in such a way so as to be coaxial.

The inner end of the fluid passage 112 of the oil removing portion 110 is connected to the intermediate-diameter portion 114 of the shaft hole 99 via a restriction portion 112a. A moving member 116 is slidably retained in the intermediate-diameter portion 114 and the large-diameter portion 115. The moving member 116 is formed in the shape of a spool valve. The moving member 116 has a first land 117 slidably fitted in the intermediate-diameter portion 114, a second land 118 slidably fitted in the large-diameter portion 115 and a link portion 119 which links the first land 117 to the second land 118 and is smaller in diameter than both lands.

The axial length of the first land 117 is set shorter than the axial length of the intermediate-diameter portion 114. And, at the time the first land 117 is engaged with an engage step portion 114a between the small-diameter portion 113 and the intermediate-diameter portion 114, the first land 117 releases the restriction-portion-112a side opening end portion of the fluid passage 112 (see FIG. 28). A hole 120 extending in the axial direction is formed in the link portion 119 and first land 117, and its one end is open to the peripheral surface of the link portion 119 and the other end is open to the small-diameter-portion 113 side end face of the first land 117.

As a result, at the time the first land 117 is engaged with the engage step portion 114a between the small-diameter portion 113 and the intermediate-diameter portion 114, the working oil in the second hydraulic chamber 62 flows to the intermediate-diameter portion 114 of the shaft hole 99 via the peripheral groove 21d, the oil removing portion 110 (the groove portion 111, fluid passage 112 and restriction portion 112a). The working oil that has flowed to the intermediate-diameter portion 114 flows to the small-diameter portion 113 of the shaft hole 99 via the hole 120. The existence of the restriction portion 112a restricts the amount of the working oil flowing out to the small-diameter portion 113 to a little amount.

At the time the first land 117 moves to the output end side of the input shaft 21, it closes the restriction-portion-112a side opening portion of the fluid passage 112. The second land 118 has a tapered portion 118a having the shape of an approximately conical trapezoid and a tapered surface which becomes gradually smaller in diameter toward the non-link portion (i.e., toward the output end of the input shaft 21) and a spring stop portion 118b which is provided at the distal end of the tapered portion 118a and is formed slidable relative to the large-diameter portion 115.

Figure 23:
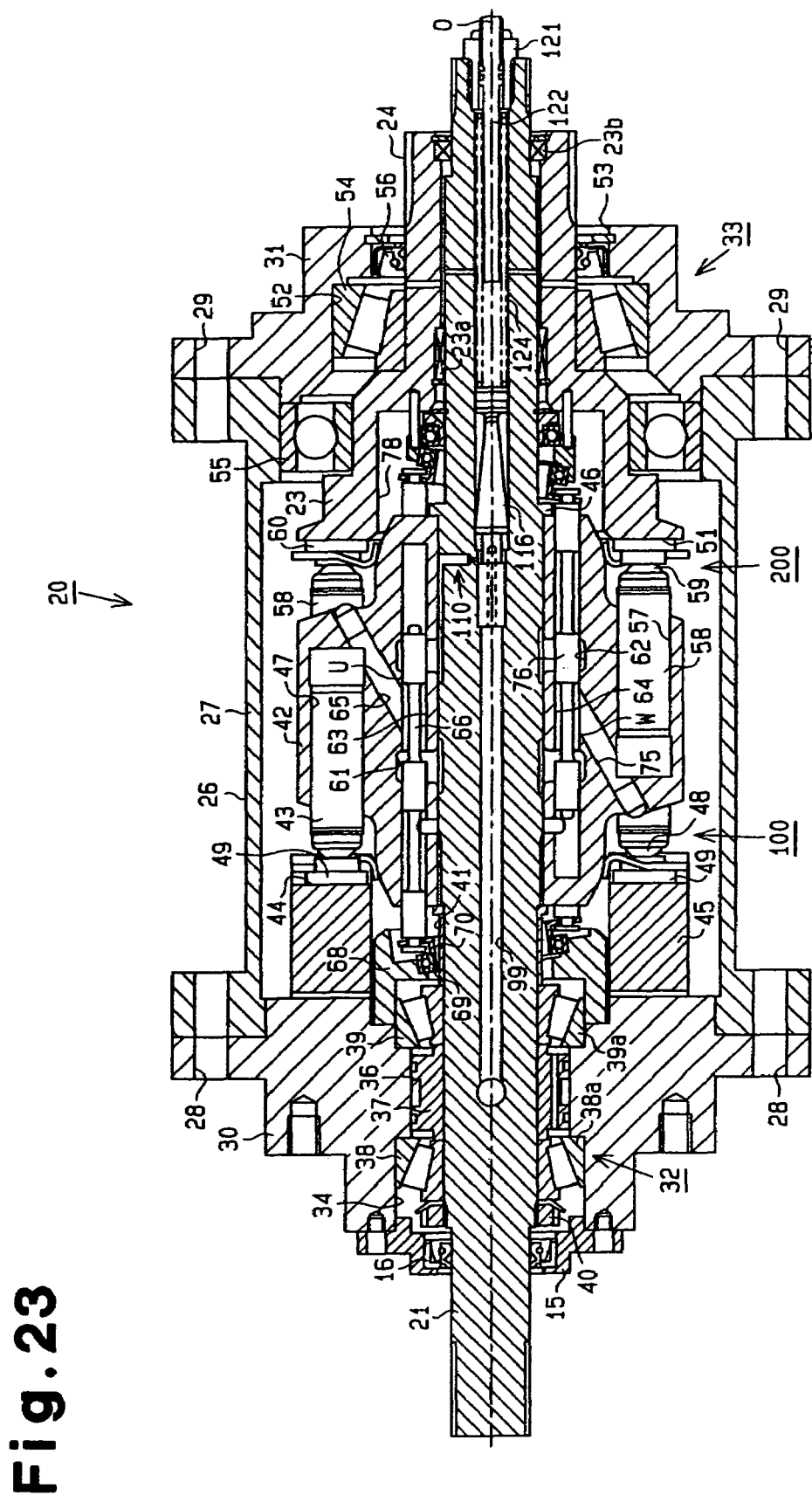
FIG. 23 is a horizontal cross-sectional view of a continuously variable transmission according to a fourth embodiment embodying the present invention.
Figure 24:
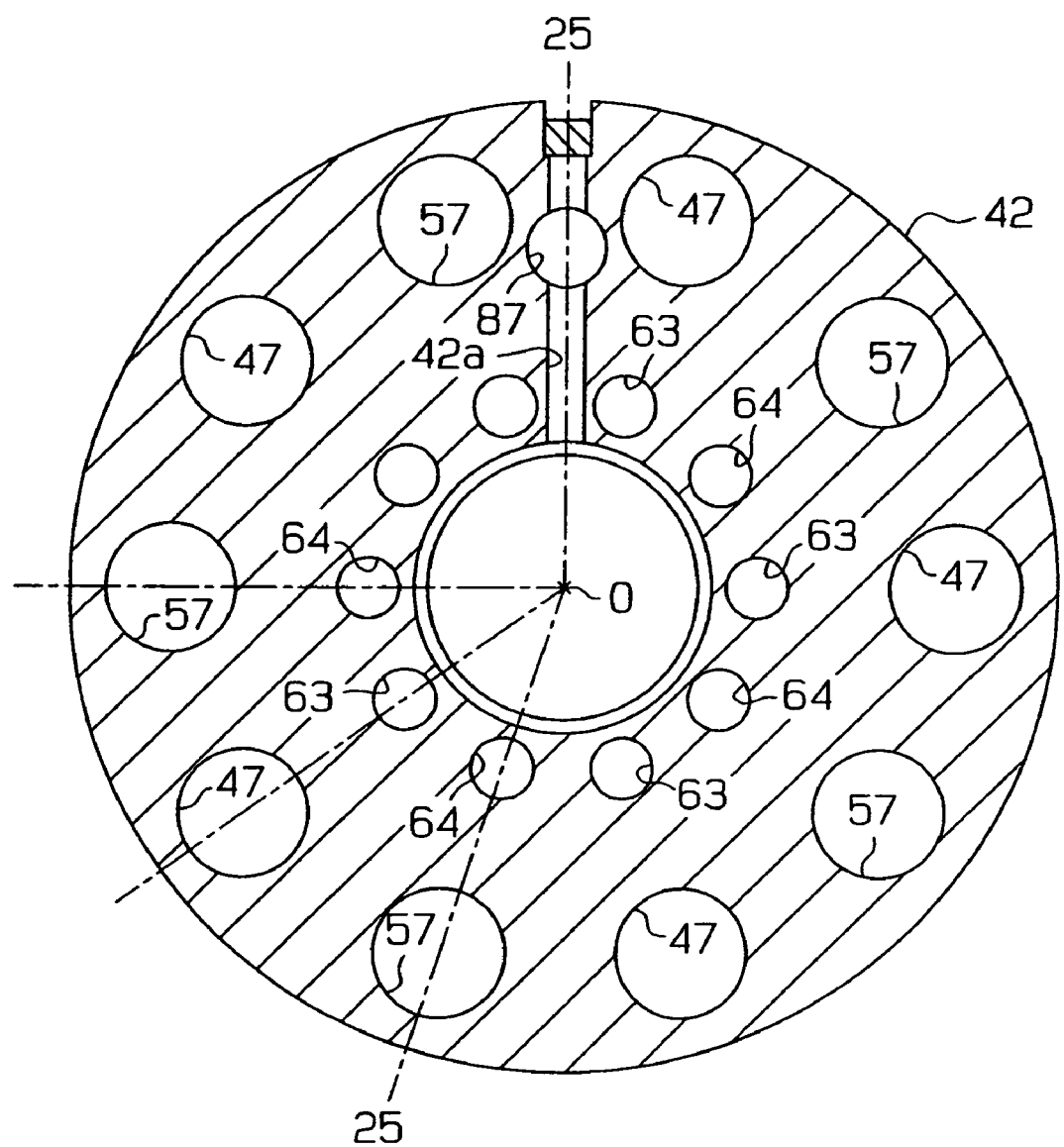
FIG. 24 is a transverse cross-sectional view of a cylinder block of the continuously variable transmission.

As shown in FIG. 23, the stopper body 121 is fastened into the output-end side opening portion of the input shaft 21 in such a manner that the fastening amount is adjustable. A stopper member 122 for the moving member 116 is fitted along the axis of the stopper body 121 in such a manner that the fastening amount is adjustable. The inner end of the stopper member 122 of the moving member 116 extends inside the large-diameter portion 115 along the direction of the axis thereof. A coil spring 124 is intervened between the stopper body 121 and the spring stop portion 118b second land 118. At the time of normal charge pressure, the urging force of the coil spring 124 stops the moving member 116 at the engage step portion 114a. The urging force of the coil spring 124 can be adjusted by adjusting the fastening amount of the stopper body 121.

As the working oil in the shaft hole 99 is compressed by driving the unillustrated charge pump in order to acquire charge pressure greater than the urging force of the coil spring 124, the moving member 116 can move toward the output end of the input shaft 21 against the urging force of the coil spring 124. This movement can allow the moving member 116 to close the restriction-portion-112a side opening end portion of the fluid passage 112. And, the stopper member 122 of the moving member 116 restricts the maximum amount of movement of the moving member 116 at the time of moving toward the output end.

Next, the action of the continuously variable transmission 20 with the above-described structure will be discussed.

Hereinafter, for the sake of descriptive convenience, descriptions on this embodiment and other embodiments will be given on the premise that the number of input rotations Nin to be imparted to the input shaft 21 from the crankshaft of the engine 22 is constant.

In this embodiment, due to the urging force of the coil spring 124, the moving member 116 is normally stopped at the engage step portion 114a, so that a little amount of the working oil is permitted to flow out of the second hydraulic chamber 62 (i.e., the hydraulic closing circuit C) to the small-diameter portion 113 of the shaft hole 99.

(In the Case where the Number of Output Rotations Nout is Nin)

By operating the unillustrated shift lever, the swash plate surface 44 is positioned at the upright position via the cradle 45.

In this state, the driving force of the engine 22 causes the cylinder block 42 to rotate by Nin via the input shaft 21. Hereinafter, the rotation in the same direction as Nin is referred to as rotation in the forward direction. The swash plate surface 44 is in the neutral state or the upright position with respect to the axis O of the input shaft 21.

The first plunger 43 of the first hydraulic system 100 is not reciprocated by the swash plate surface 44, so that in this state the working oil does not circulate in the hydraulic closing circuit C. In the second hydraulic system 200, therefore, the protruding end of each second plunger 58 engages in abutment with the rotary inclined surface 51 via the shoe 60 in such a state where it cannot take a stroke action, so that the cylinder block 42 and the rotary inclined surface 51 are directly coupled to each other and rotate together. That is, in this state, the input shaft 21 is directly coupled to the output gear 24. The forward-directional rotation imparted to the rotary inclined surface 51 is transmitted to the final reduction gear unit via the yoke 23, the output gear 24 and the input gear 151.

Figure 29:
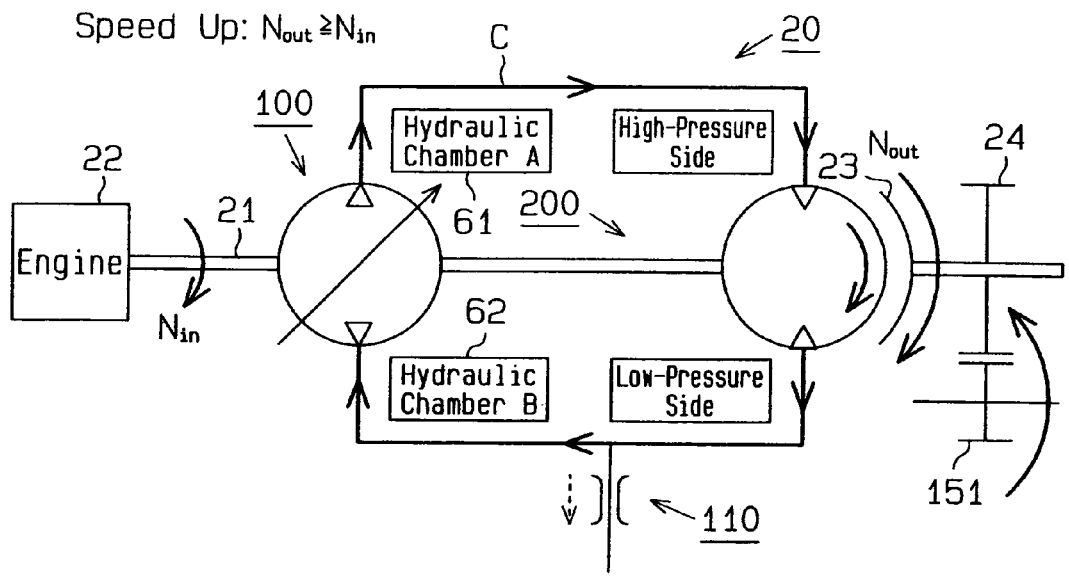
FIG. 29 is a conceptual diagram of the continuously variable transmission of the fourth embodiment.
Figure 30:
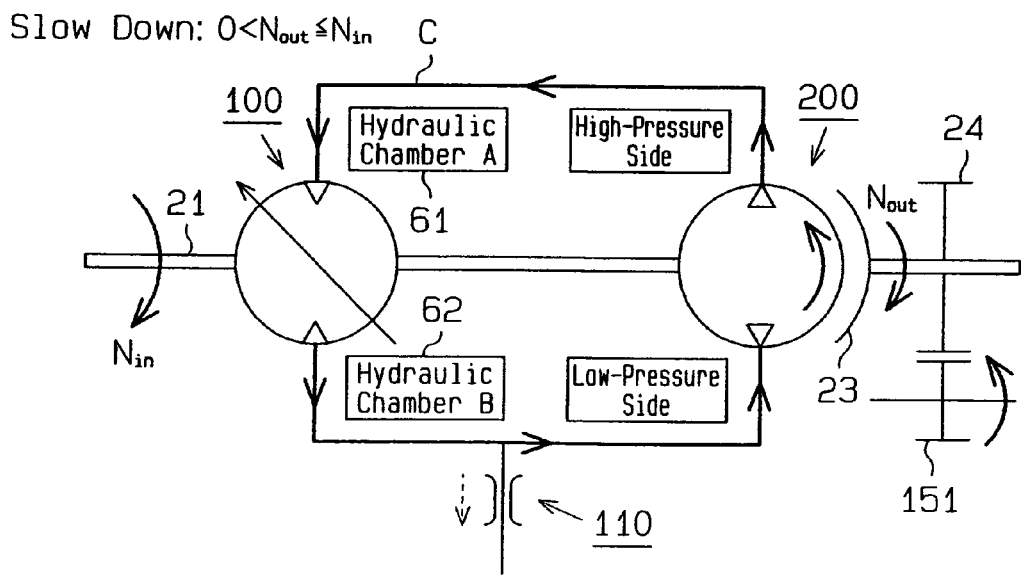
FIG. 30 is a conceptual diagram illustrating the action of the continuously variable transmission.
Figure 31:
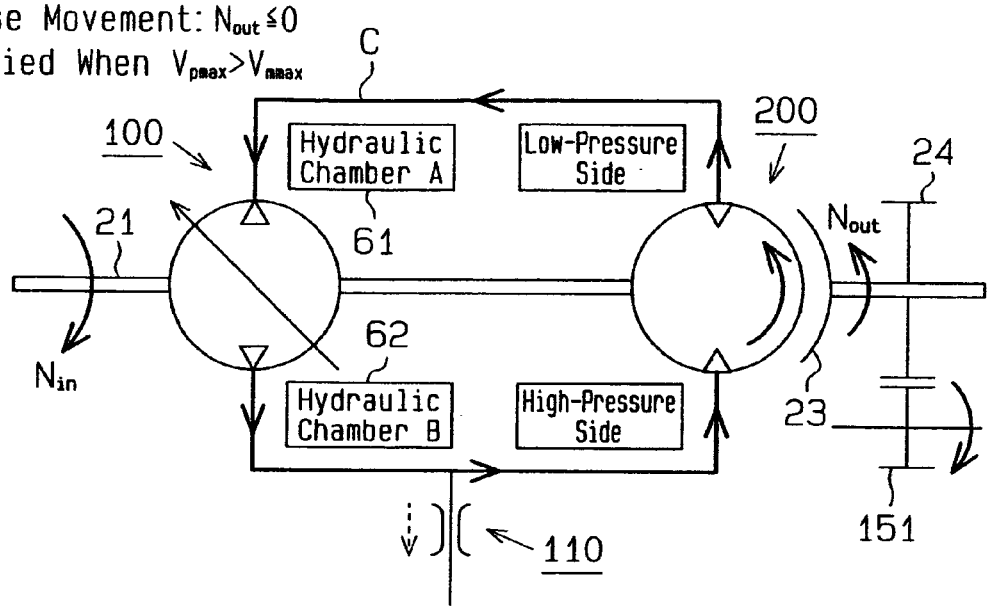
FIG. 31 is a conceptual diagram illustrating the action of the continuously variable transmission.

FIG. 29 is an exemplary diagram in this state. In FIGS. 29 to 31, arrows corresponding to Nin and Nout indicate the rotational directions of the associated members.

In the case where the swash plate surface 44 is positioned at the upright position, the stroke volume VP of the first hydraulic system 100 becomes 0 and the number of output rotations Nout (the number of rotations of the output gear 24) becomes the number of input rotations Nin, as shown in FIG. 32.

(In the Case where the Number of Output Rotations Nout is between Nin and 2Nin)

Figure 25:
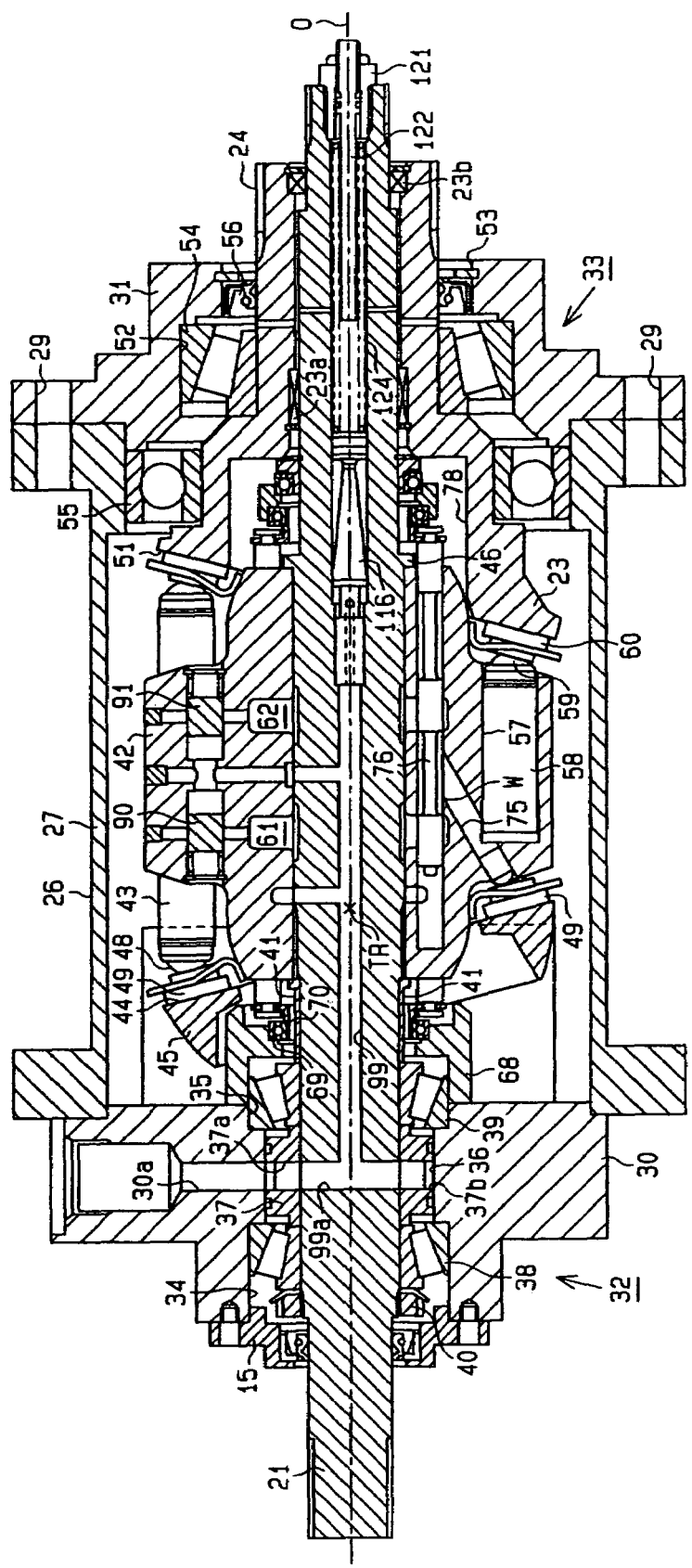
FIG. 25 is a cross-sectional view along the line 25—25 in FIG. 24.

By operating the unillustrated shift lever, as shown in FIG. 25, the swash plate surface 44 is tilted to the negative side via the cradle 45 to be positioned in an area between a predetermined negative tilt angle position and the upright position. This predetermined negative tilt angle position is the position up to which the absolute value of the stroke volume VP of the first hydraulic system 100 becomes equal to the absolute value (=VMmax) of the stroke volume VM of the second hydraulic system 200.

In this case, the driving force of the engine 22 causes the cylinder block 42 to rotate by Nin via the input shaft 21. Then, the first hydraulic system 100 draws the working oil into the first plunger hole 47 via the port U in the range of the rotational angle of 0 degree to 180 degrees about the axis O of the cylinder block 42 and discharges the working oil from the first plunger hole 47 via the port U in the range of 180 degrees to 360 (0) degrees. The hydraulic chamber for discharge and the hydraulic chamber for suction are determined by the areas H and I corresponding to the rotational angle about the axis O of the cylinder block 42.

The amounts of the working oil to be discharged and drawn by the first hydraulic system increase as the tilt angle of the swash plate surface 44 on the negative side increases. At this time, the second hydraulic system 200 draws the working oil into the plunger hole 57 via the port W in the range of the relative rotational angle of 0 degrees to 180 degrees about the axis O of the yoke 23 (output rotary section) with respect to the cylinder block 42 and discharges the working oil from the plunger hole 57 via the port W in the range of 180 degrees to 360 (0) degrees. The hydraulic chamber for discharge and the hydraulic chamber for suction are determined by the areas J and K corresponding to the relative rotational angle of the yoke 23 (output rotary section) about the axis O with respect to the cylinder block 42.

As a result, the rotary inclined surface 51 is rotated by the total (sum) of the number of input rotations Nin of the cylinder block 42 driven via the input shaft 21 and the number of rotations in the forward direction by the projecting pressurization of the plunger 58 on the rotary inclined surface 51. The forward-directional rotation to be imparted on the rotary inclined surface 51 is transmitted to the final reduction gear unit as the forward-directional rotation via the yoke 23, the output gear 24 and the input gear 151 to carry out the speed increasing action.

As the swash plate surface 44 is shifted toward the predetermined negative tilt angle position from the upright position at this time, the stroke volume VP of the first hydraulic system 100 increases to VMmax from 0 and the number of output rotations Nout increases to 2Nin from Nin accordingly in FIG. 32.

It is to be noted that the stroke volume VM of the second hydraulic system 200 when the number of output rotations Nout changes to 2Nin from Nin remains at VMmax. In this embodiment, VPmax=1.7VMmax.

FIG. 29 shows the flow of the working oil and how the rotation is made in this state.

In this state, as described above, a little working oil flows out of the second hydraulic chamber 62 (i.e., the hydraulic closing circuit C) to the small-diameter portion 113 of the shaft hole 99 via the oil removing portion 110 or the like, causing a slight loss. However, the amount of the working oil flowing out is small and the pressure in the second hydraulic chamber 62 (hydraulic chamber B) is lower than that of the first hydraulic chamber 61 (hydraulic chamber A), so that the efficiency of actuation of the plunger 58 which presses the yoke 23 to increase the speed is not reduced, thus raising no problem.

(In the Case where the Number of Output Rotations Nout Exceeds 2Nin)

In the case where one desires to set the forward movement faster than is described before, the swash plate surface 44 is positioned on the negative maximum tilt angle position side via the cradle 45.

At this time, the stroke volume VP of the first hydraulic system 100 goes to the range (VMmax<VP≦1.7VMmax) where it is greater than the stroke volume VM(=VMmax) of the second hydraulic system 200.

As a result, as the stroke volume VM of the second hydraulic system 200 becomes relatively small with respect to the stroke volume VP of the first hydraulic system 100, the reciprocation speed of the plunger 58 of the second hydraulic system 200 becomes faster to compensate for that. Accordingly, the number of forward rotations is increased by the action of the projecting pressurization of the plunger 58 on the rotary inclined surface 51, and the sum of the increased number of rotations and the number of rotations of the cylinder block 42 in the forward direction causes the yoke 23 and the output gear 24 to rotate at an increased speed greater than that of the case when the number of output rotations in the forward direction is 2Nin.

The rotational torque imparted to the rotary inclined surface 51 is transmitted to the final reduction gear unit via the yoke 23, the output gear 24 and the input gear 151. In the case where the swash plate surface 44 is positioned at the negative maximum tilt angle position, the stroke volume VP of the first hydraulic system 100 is VPmax=1.7VMmax and the stroke volume of the second hydraulic system 200 is VMmax which is constant in FIG. 32. As a result, since VPmax=1.7VMmax, the number of output rotations Nout is increased to 2.7Nin from 2Nin.

FIG. 29 shows the flow of the working oil and how the rotation is performed in this state.

In this state, as described above, a little working oil flows out of the second hydraulic chamber 62 (i.e., the hydraulic closing circuit C) to the small-diameter portion 113 of the shaft hole 99 via the oil removing portion 110 or the like, causing a slight loss. However, the amount of the working oil flowing out is small and the pressure in the second hydraulic chamber 62 (hydraulic chamber B) is lower than that of the first hydraulic chamber 61 (hydraulic chamber A), so that the efficiency of actuation of the plunger 58 which presses the yoke 23 to increase the speed is not reduced, thus raising no problem.

(In the Case where the Number of Output Rotations Nout is between Zero and Nin)

By operating the unillustrated shift lever, the swash plate surface 44 is tilted to the positive side via the cradle 45 to be positioned in an area of a positive tilt angle position from the upright position. The predetermined positive tilt angle position in the positive tilt angle position is the position up to which the absolute value of the stroke volume VP of the first hydraulic system 100 becomes equal to the absolute value of the stroke volume VM of the second hydraulic system 200.

In this case, since the swash plate surface 44 is tilted in the forward direction, as the driving force of the engine 22 causes the cylinder block 42 to rotate via the input shaft 21, the first hydraulic system 100 discharges the working oil from the plunger hole 47 via the port U in the range of the rotational angle of 0 degree to 180 degrees about the axis O of the cylinder block 42 and sucks the working oil into the first plunger hole 47 via the port U in the range of 180 degrees to 360 (0) degrees. The hydraulic chamber for discharge and the hydraulic chamber for suction are determined by the areas H and I corresponding to the rotational angle about the axis O of the cylinder block 42.

The amounts of the working oil to be discharged and sucked by the first hydraulic system 100 increase as the tilt angle of the swash plate surface 44 on the positive side increases. At this time, the second hydraulic system 200 discharges the working oil from the plunger hole 57 via the port W in the range of the relative rotational angle of 0 degree to 180 degrees about the axis O of the yoke 23 (output rotary section) with respect to the cylinder block 42 and sucks the working oil into the plunger hole 57 via the port W in the range of 180 degrees to 360 (0) degrees. The hydraulic chamber for discharge and the hydraulic chamber for suction are determined by the areas J and K corresponding to the relative rotational angle of the yoke 23 (output rotary section) about the axis O with respect to the cylinder block 42.

As a result, the projecting pressurization of the plunger 58 on the rotary inclined surface 51 gives reverse rotation to that of the "In the case where the number of output rotations Nout is between Nin and 2Nin and exceeds 2Nin". Therefore, the total (sum) of the number of rotations in the reverse direction and the number of rotations of the cylinder block 42 in the forward direction rotates the yoke 23 and the output gear 24. As the sum of the number of rotations at this time becomes the number of rotations in the forward direction reduced by the number of rotations in the reverse direction, the number of output rotations Nout becomes smaller as compared with that "in the case where the number of output rotations Nout is Nin".

In this embodiment, as the swash plate surface 44 is shifted toward the positive maximum tilt angle position from the upright position at this time, the stroke volume VP of the first hydraulic system 100 increases to −VMmax from 0 (the "31 " means a case of discharge into the second hydraulic chamber 62 from the port U; the same is applied below) and the number of output rotations Nout increases to 0 from Nin accordingly in FIG. 32.

It is to be noted that the stroke volume VM of the second hydraulic system 200 per rotation when the number of output rotations Nout changes to 0 from Nin is −VMmax. (The "−" means a case of suction into the port W from the second hydraulic chamber 62.) In this state, as described above, a little working oil flows out of the second hydraulic chamber 62 (i.e., the hydraulic closing circuit C) to the small-diameter portion 113 of the shaft hole 99 via the oil removing portion 110 or the like, causing a slight loss. However, the amount of the working oil flowing out is small and the pressure in the second hydraulic chamber 62 (hydraulic chamber B) is lower than that of the first hydraulic chamber 61 (hydraulic chamber A), so that the efficiency of actuation of the plunger 58 which presses the yoke 23 to reduce the speed is not reduced, thus raising no problem.

FIG. 30 is an exemplary diagram in that state. The pressure of the first hydraulic chamber 61 (hydraulic chamber A) becomes higher than that of the second hydraulic chamber 62 (hydraulic chamber B) and the working oil flows in the hydraulic closing circuit C as indicated by the arrows illustrated in the diagram.

(In the Case where the Number of Output Rotations Nout is 0)

Next, by operating the unillustrated shift lever, the swash plate surface 44 is positioned at that position in the positive tilt angle position at which the absolute value of the stroke volume VP of the first hydraulic system 100 becomes equal to the absolute value of the stroke volume VM of the second hydraulic system 200.

In this case, in the present embodiment, the stroke volume VP of the first hydraulic system 100 becomes −VMmax. As a result, the number of rotations in the reverse direction and the number of rotations Nin at which the cylinder block 42 is driven via the input shaft 21 are balanced out, i.e., the sum of the number of rotations becomes 0 (the number of output rotations Nout is 0) and the output gear 24 stops.

As the swash plate surface 44 is further tilted to the positive side from the predetermined positive tilt angle position via the cradle 45 in this state, the absolute value of the stroke volume VP of the first hydraulic system 100 enters the range where it is greater than the absolute value (=VMmax) of the stroke volume VM of the second hydraulic system 200.

Therefore, the absolute value of the stroke volume VM of the second hydraulic system 200 becomes relatively small with respect to the absolute value of the stroke volume VP of the first hydraulic system 100, so that to compensate for it, the reciprocation speed of the plunger 58 of the second hydraulic system 200 should properly become faster in the second hydraulic system 200.

However, the pressure of the second hydraulic chamber 62 is higher as compared with that of the first hydraulic chamber 61 at this time, so that the high-pressure working oil flows out of the second hydraulic chamber 62 (i.e., the hydraulic closing circuit C) to the small-diameter portion 113 of the shaft hole 99 via the oil removing portion 110 or the like. Given that L is the maximum amount of loss flowing out from the hydraulic closing circuit C at the time the cylinder block 42 makes one turn, while the difference between the absolute value of the stroke volume VP of the first hydraulic system 100 and the absolute value of the stroke volume VM of the second hydraulic system 200 (|VP|−|VM|) satisfies |VP|−|VM|≦L, |VP| and |VM|+loss amount are balanced out as a consequence, so that in the second hydraulic system 200, the number of rotations in the reverse direction and the number of rotations Nin at which the cylinder block 42 is driven via the input shaft 21 are kept balanced out, i.e., the sum of the number of rotations becomes zero (the number of output rotations Nout is zero) and the output gear 24 maintains the stationary state (neutral).

In FIG. 32, Δ1 indicates the difference between the stroke volumes of both systems until |VP|−|VM| becomes L from zero.

(In the Case where the Number of Output Rotations Nout is Less than Zero)

Further, the swash plate surface 44 is tilted on the positive side from the predetermined positive tilt angle position via the cradle 45 so that the difference between the absolute value of the stroke volume VP of the first hydraulic system 100 and the absolute value of the stroke volume VM of the second hydraulic system 200 (|VP|−|VM|) becomes |VP|−|VM|>L. Then, the sum of the sum of the absolute value of the stroke volume VM of the second hydraulic system 200 and the loss amount becomes relatively small with respect to the stroke volume VP of the first hydraulic system 100, so that in the second hydraulic system 200, the reciprocation speed of the plunger 58 of the second hydraulic system 200 becomes faster to compensate for that.

It is assumed that at this time, the moving member 116 does not move in the direction along the axis O and does not close the restriction-portion 112a side opening end portion of the fluid passage 112 in this embodiment.

Therefore, the projecting pressurization of the plunger 58 on the rotary inclined surface 51 increases the number of rotations in the reverse direction, and the sum of the increased number of rotations in the reverse direction and the number of rotations of the cylinder block 42 in the forward direction causes the yoke 23 and the output gear 24 to rotate in the reverse direction relative to the input rotation. The rotational torque in the reverse direction is transmitted to the final reduction gear unit via the yoke 23, the output gear 24 and the input gear 151.

In the case where the swash plate surface 44 is positioned on the positive maximum tilt angle position side, in FIG. 32, the stroke volume VP of the first hydraulic system 100 is −VPmax=−1.7VMmax and the stroke volume of the second hydraulic system 200 is −VMmax which is constant. As described above, however, it is assumed that the moving member 116 does not move in the direction along the axis O and does not close the restriction-portion-112a side opening end portion of the fluid passage 112 in this embodiment.

Therefore, the amount of rotation is reduced by the amount of loss of the working oil from the oil removing portion 110, but since −VPmax=−1.7VMmax, the number of output rotations Nout is reduced from 0 accordingly. Accordingly, the number of output rotations Nout is increased in the reverse direction from zero.

In FIG. 32, Nout varies on the solid line with "no seal" affixed thereto. FIG. 31 is an exemplary diagram showing the state at this time. The pressure of the second hydraulic chamber 62 (hydraulic chamber B) becomes higher than that of the first hydraulic chamber 61 (hydraulic chamber A) and the working oil flows in the hydraulic closing circuit C as indicated by the arrows illustrated in the diagram.

The fourth embodiment provides the following advantages.

(1) The continuously variable transmission 20 (hydraulic continuously variable transmission) of the fourth embodiment has, as the first hydraulic system 100, the plunger 43 and the protraction and retraction of the plunger 43 are performed by the swash plate surface 44 (abutting portion) of the cradle 45 which is disabled to rotate about the axis O. As the second hydraulic system 200, the yoke 23 (output rotary section) is provided which has the plunger 58 and performs the relative or synchronous rotation with respect to the input rotation by the protraction and retraction of the plunger 58. The cylinder block 42, which retains the plungers 43, 58 of both the first hydraulic system 100 and second hydraulic system 200, is shared, and the cylinder block 42 is constructed so as to produce the input rotation and synchronous rotation.

Further, the stroke volume VP of the first hydraulic system 100 has a range exceeding the stroke volume VM of the second hydraulic system 200, and the oil removing portion 110 is provided in the second hydraulic chamber 62 the pressure of which becomes lower when the yoke 23 rotates forwardly with respect to the input rotation in the fluid passage (hydraulic closing circuit C) which connects the first hydraulic system 100 to the second hydraulic system 200.

As a result, in the range from the point where the stroke volume VP of the first hydraulic system 100 becomes equal to the stroke volume VMmax of the second hydraulic system 200 to the point at which it can cope with the oil escape amount of the oil removing portion 110 (the amount of loss flowing out of the hydraulic closing circuit C), the number of output rotations Nout becomes zero so that neutral can be realized. Therefore, the range where neutral can be carried out can have a margin by the oil escape amount.

Modification of Fourth Embodiment

Next, a modification of the fourth embodiment will be described referring to FIGS. 23 to 32.

The structure of this embodiment is the same as the structure of the fourth embodiment but the action of the moving member 116 differs partially. Therefore, with the structure which is used in the structure of the fourth embodiment will be described, with the same reference symbols given. In addition, in the modification of the fourth embodiment, only the action when the number of output rotation Nout is less than zero is different from the fourth embodiment. This will be explained below.

For the sake of descriptive convenience, a description will be started from the state where the difference between the absolute value of the stroke volume VP of the first hydraulic system 100 and the absolute value of the stroke volume VM of the second hydraulic system 200 (|VP|−|VM|) satisfies |VP|−|VM|≦L, and in the second hydraulic system 200, the number of rotations in the reverse direction and the number of rotations Nin at which the cylinder block 42 is driven via the input shaft 21 are kept balanced out.

That is, the sum of the number of rotations becomes zero (the number of output rotations Nout is zero) and the output gear 24 maintains the stationary state (neutral).

In this state, when |VP|−|VM|=L, the stroke volume VP of the first hydraulic system 100 is positioned at the location of a point a in FIG. 32.

To acquire larger charge pressure than the urging force of the coil spring 124 in this state, the working oil in the shaft hole 99 is pressurized by driving the unillustrated charge pump. Then, the moving member 116 moves to the output end side of the input shaft 21 against the urging force of the coil spring 124 and closes the restriction-portion 112a side opening end portion of the fluid passage 112.

Consequently, the flow of the working oil out from the second hydraulic chamber 62 (i.e., the hydraulic closing circuit C) to the small-diameter portion 113 of the shaft hole 99 via the oil removing portion 110 or the like is stopped. Accordingly, the amount of the working oil which presses the plunger 58 of the second hydraulic system 200 is increased by the working oil which has been lost up to now.

Therefore, the absolute value of the stroke volume VM of the second hydraulic system 200 becomes relatively smaller with respect to the stroke volume VP of the first hydraulic system 100, so that in the second hydraulic system 200, the reciprocation speed of the plunger 58 of the second hydraulic system 200 becomes faster to compensate for that.

Accordingly, the projecting pressurization of the plunger 58 on the rotary inclined surface 51 increases the number of rotations in the reverse direction, and the total (sum) of the increased number of rotations and the number of rotations of the cylinder block 42 in the forward direction causes the yoke 23 and the output gear 24 to rotate in the reverse direction relative to the input rotation. The rotational torque in the reverse direction is transmitted to the final reduction gear unit via the yoke 23, the output gear 24 and the input gear 151. At this time, the number of output rotations Nout moves to a point b from the point a in FIG. 32.

Thereafter, in the case where the swash plate surface 44 is positioned on the positive maximum tilt angle position side via the cradle 45, in FIG. 32, the stroke volume VP of the first hydraulic system 100 is −VPmax=−1.7VMmax so that the number of output rotations Nout increases its reverse rotation accordingly when moved from the point b. In FIG. 32, Nout varies on the solid line indicated by the label "with seal".

This modification provides the following advantages.

(1) In the modification of the fourth embodiment, the moving member 116 (sealing mechanism) is provided which closes the restriction-portion-112a side opening end portion of the oil removing portion 110 when the yoke 23 (output rotary section) rotates reversely to the input rotation.

As a result, at the time the yoke 23 (output rotary section) rotates reversely to the input rotation, the working oil does not leak via the oil removing portion 110, i.e., the working oil does not leak from the hydraulic closing circuit C, so that the efficiency when the yoke 23 rotates reversely to the input rotation is improved.

Fifth Embodiment

Next, the fifth embodiment of the present invention will be described based on FIGS. 33 to 39. With regard to the same structure as the structure of the fourth embodiment, with regard to the same structure as, or equivalent to the structure of the fourth embodiment, the same reference symbols are given. Please see the drawings of the fourth embodiment.

This embodiment differs from the fourth embodiment in that instead of the second hydraulic system 200 in the fourth embodiment constructed as a differential hydraulic system of a fixed capacity type, it is constructed as a hydraulic system of a stroke-volume variable type. The following description centers on this different structure.

In the fourth embodiment, the support member 81 in the second hydraulic system 200 is fixed to the pin 82, and fixed to the yoke 23, in the axial direction. By way of contrast, according to this embodiment, the support member 81 is fitted over the pin 82 slidably along the axis O. Further, the holder 79 coupled to the support member 81 via the ball bearing 80 is fitted over the outer surface of the input shaft 21 in such a way as to be slidable along the axis O and rotate together with the input shaft 21. A stop ring 125 is fixed to the outer surface of the input shaft 21 more on the output end side than the portion where the holder 79 is located, and at the time the holder 79 moves toward the output end side, it can be stopped by the stop ring 125.

Therefore, the retainer 83 is made movable along the axis O together with the support member 81, the ball bearing 80, 84 and the holder 79 in such a way as to be askew to the axis O.

A coil spring 126 as an urging means, put around the outer surface of the input shaft 21, is arranged between a stop portion 46 and the holder 79, and the holder 79 is normally urged toward the output end side of the input shaft 21 by the urging force of the coil spring 126.

A pin hole 127 is formed in the input shaft 21 at the position which corresponds to the holder 79 engaged with the stop ring 125, in such a way as to extend in the diametric direction, and is connected to the large-diameter portion 115 of the shaft hole 99. An actuation pin 128 is disposed in the pin hole 127 in such a way so as to be slidable in the diametric direction of the input shaft 21.

Figure 34:
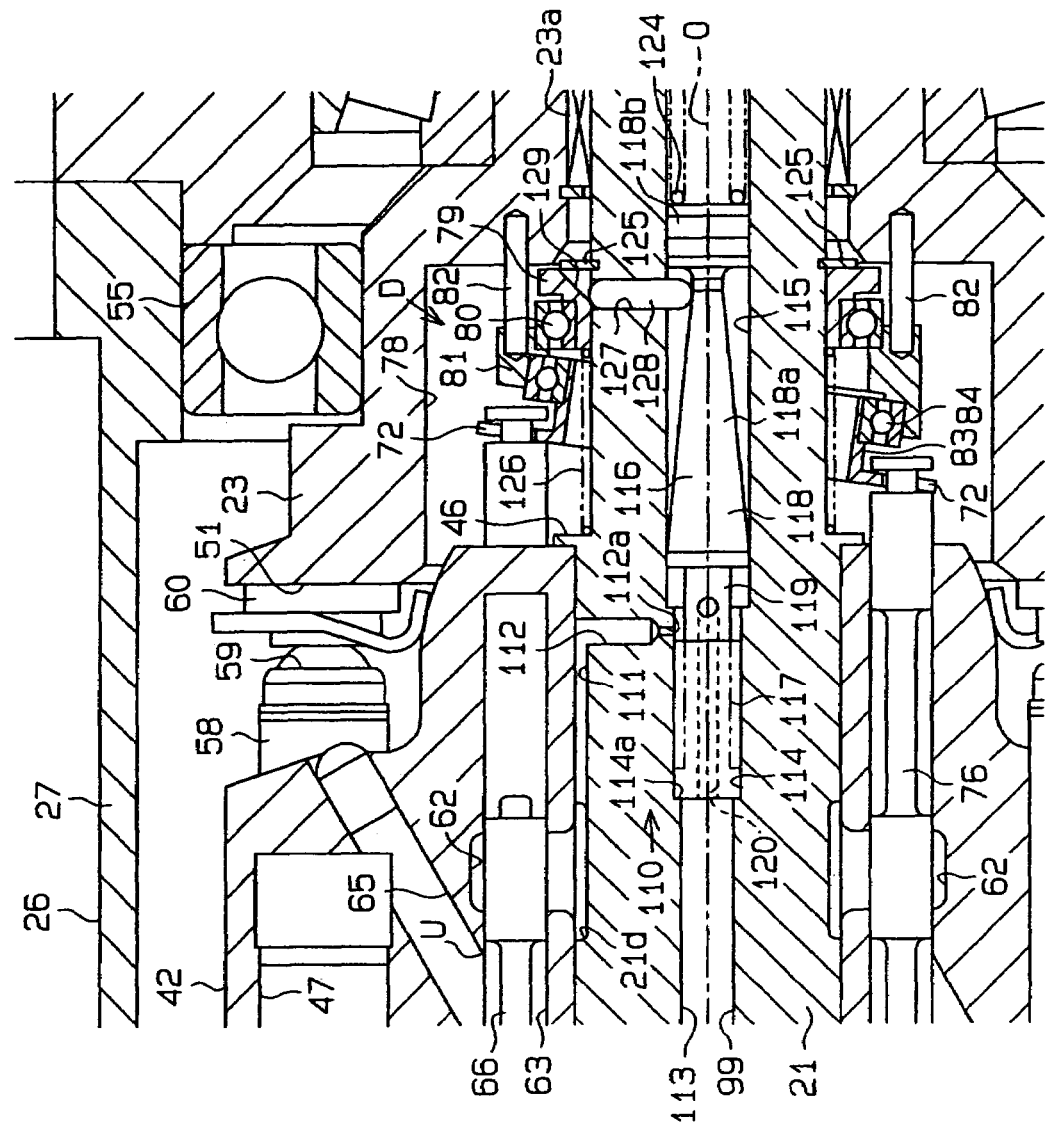
FIG. 34 is a cross-sectional view of essential portions.

As shown in FIG. 34, the moving member 116, the actuation pin 128, the holder 79, the ball bearing 80, the support member 81 and the ball bearing 84 constitute a displacing mechanism D. The displacing mechanism D is provided in such a way so as to be in vicinity of the input shaft 21 and is arranged in the inner-surface side space (retaining hole 78) of the yoke 23.

A tapered groove 129 is provided in the inner surface of the holder 79 at a portion corresponding to the pin hole 127 in the lengthwise direction of the holder 79. The bottom of the tapered groove 129 is formed obliquely to the axis of the holder 79 in such a way that it is separated farther away from the axis of the holder 79 (which coincides with the axis O of the input shaft 21) as it gets closer to the stop ring 125 (i.e., the output end side of the input shaft 21). That is, the tapered groove 129 is made inclined in the direction opposite to the tapered portion 118a of the moving member 116 and the slope of its bottom becomes sharper than the slope of the tapered portion 118a. When the amount of displacement of the moving member 116 or a first displacement amount is compared with the amount of displacement of the retainer 83 or a second displacement amount, therefore, the first displacement amount is set larger. The sharp slope mentioned here means that the degree of separation from the axis O is large at the time the tapered portion moves along the direction of the axis O.

The inner end of the actuation pin 128 abuts on the tapered portion 118a of the moving member 116 and its outer end abuts on the bottom of the tapered groove 129 of the holder 79. With the holder 79 abutting on the stop ring 125, the actuation pin 128 abuts on the close-end side of the bottom of the tapered groove 129. At the time the actuation pin 128 moves in the radial direction around the axis O of the input shaft 21, the holder 79 is moved toward the input end side of the input shaft 21 against the urging force of the coil spring 126 via the bottom of the tapered groove 129 and is abuttable on the far end side of the bottom of the tapered groove 129. The displacing-end of the second selector valve 76 engaged with the flange 72 of the retainer 83 is displaced on the input end side of the input shaft 21 by the movement of the pressure position of the actuation pin 128 from the close-end side of the tapered groove 129 to the far end side.

Figure 38:
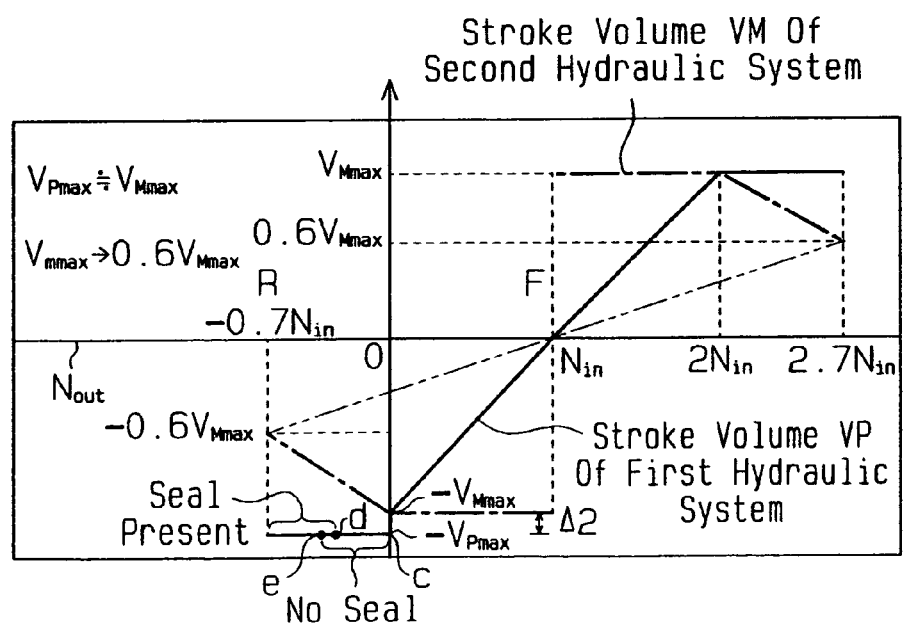
FIG. 38 is a characteristic diagram showing the relationship between stroke volume and the number of output rotations.
Figure 39:
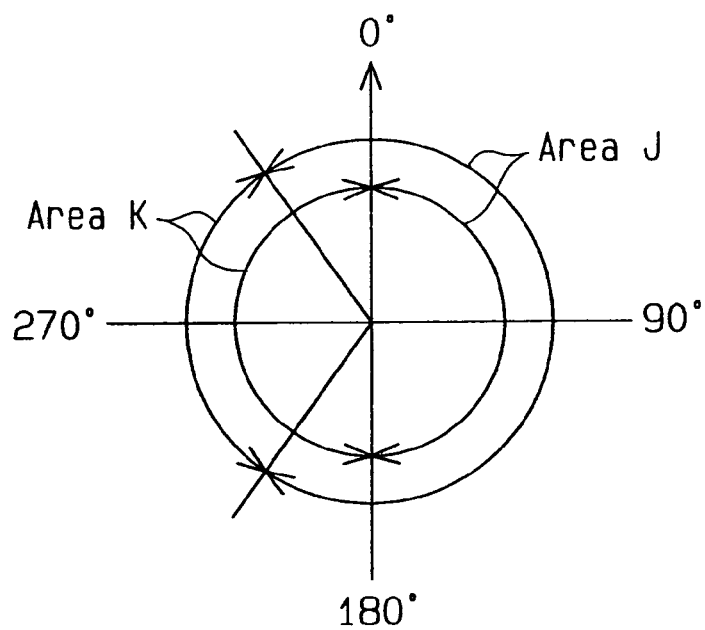
FIG. 39 is an explanatory diagram showing timings at which ports are opened.

The opening/closing timing of the port W is set to be changeable in such a way that the absolute value of the maximum stroke volume of the second hydraulic system 200 changes from VMmax to 0.6VMmax in FIG. 38 by the displacement of the displacing-end of the second selector valve 76, i.e., by a change in the ratio of the areas J and K while the yoke 23 (output rotary section) makes one turn with respect to the cylinder block 42 as shown in FIGS. 7 and 39.

In the fifth embodiment, the area J shown in FIG. 39 is the area that includes all the zones where the port W is connected to the first hydraulic chamber 61 and the area K is the area that includes all the zones where the port W is connected to the second hydraulic chamber 62.

Hereinafter, the displacement position of the second selector valve 76 at the time the actuation pin 128 abuts on the close-end side of the bottom of the tapered groove 129 is referred to as the first displacement position R1, and the displacement position of the second selector valve 76 at the time the actuation pin 128 abuts on the far end side is referred to as the second displacement position R2 (see FIG. 7). Therefore, the second selector valve 76 is actuated along the line indicated by the first displacement position R1 or the second displacement position R2 in FIG. 7.

In this embodiment, the maximum stroke volume VPmax of the first hydraulic system 100 is set slightly larger than the maximum stroke volume VMmax of the second hydraulic system 200. The difference is given by Δ1. Specifically, the inside diameter of the plunger hole 47 of the first hydraulic system 100 is set approximately the same as the inside diameter of the plunger hole 57 of the second hydraulic system 200, the diameters of the plungers 43 and 58 are set approximately the same, and the maximum tilt angle of the swash plate surface 44 is set slightly greater than the tilt angle of the rotary inclined surface 51 in such a way that the amounts of stroke of the plungers 43 and 58 have a difference in the maximum stroke volume. Since the other structure is the same as the structure of the first embodiment, its description will be omitted.

In describing the action of the continuously variable transmission 20 according to this embodiment, it is assumed that the number of input rotations Nin to be imparted to the input shaft 21 from the crankshaft of the engine 22 is constant.

(In the Case where the Number of Output Rotations Nout is Nin)

The swash plate surface 44 is positioned at the upright position via the cradle 45 by operating the unillustrated shift lever. In this state, for the same reason given in the fourth embodiment, the cylinder block 42 and the rotary inclined surface 51 come to a directly coupled state and rotate together. That is, in this state, the input shaft 21 and the output gear 24 are directly coupled. The forward-directional rotation imparted to the rotary inclined surface 51 is transmitted to the final reduction gear unit via the yoke 23, the output gear 24 and the input gear 151.

In the case where the swash plate surface 44 is positioned at the upright position, the stroke volume VP of the first hydraulic system 100 becomes 0 and the number of output rotations Nout (the number of rotations of the output gear 24) becomes equal to the number of input rotations Nin, as shown in FIG. 38.

(In the Case where the Number of Output Rotations Nout is between Nin and 2Nin)

By operating the unillustrated shift lever, the swash plate surface 44 is tilted to the negative side via the cradle 45 to be positioned in an area between a predetermined negative tilt angle position and the upright position as per the fourth embodiment. The predetermined negative tilt angle position is the position up to which the absolute value of the stroke volume VP of the first hydraulic system 100 becomes equal to the absolute value (=VMmax) of the stroke volume VM of the second hydraulic system 200.

In this case too, for the same reason given in the fourth embodiment, the rotary inclined surface 51 is rotated by the total (sum) of the number of Nin of the cylinder block 42 driven via the input shaft 21 and the number of rotations in the forward direction by the projecting pressurization of the plunger 58 on the rotary inclined surface 51. The forward-directional rotation to be imparted on the rotary inclined surface 51 is transmitted to the final reduction gear unit as the forward-directional rotation via the yoke 23, the output gear 24 and the input gear 151 to carry out the speed increasing action.

At this time, as the swash plate surface 44 is displaced toward the predetermined negative tilt angle position from the upright position, the stroke volume VP of the first hydraulic system 100 increases to VMmax from 0 and the number of output rotations Nout increases to 2Nin from Nin accordingly in FIG. 38.

Figure 35:
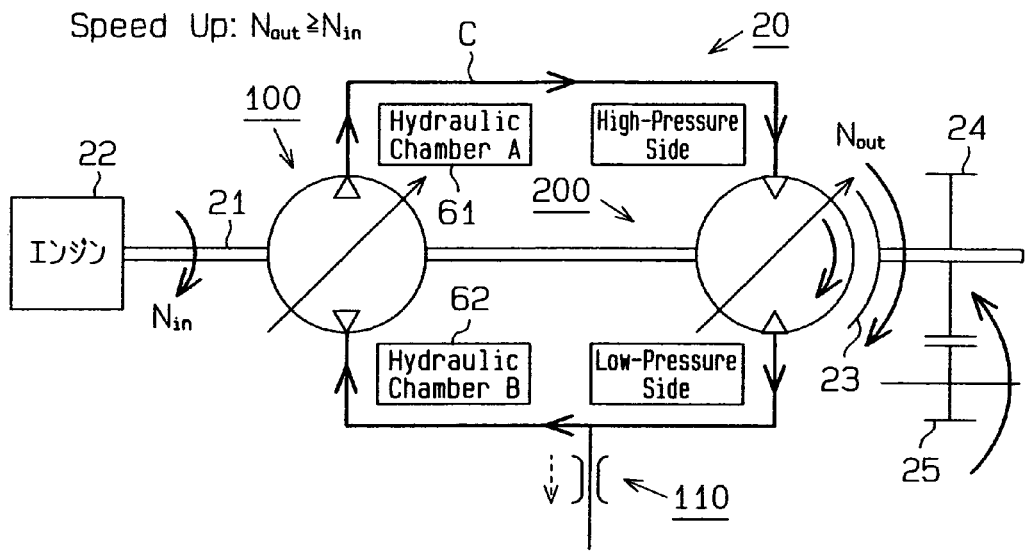
FIG. 35 is a conceptual diagram of the continuously variable transmission of the fifth embodiment.

It is to be noted that the stroke volume VM of the second hydraulic system 200 when the number of output rotations Nout changes to 2Nin from Nin remains at VMmax. In this embodiment, VPmax≈VMmax. FIG. 35 shows the flow of the working oil and how the rotation is made in this state.

In this state, as described above, a little working oil flows out of the second hydraulic chamber 62 (i.e., the hydraulic closing circuit C) to the small-diameter portion 113 of the shaft hole 99 via the oil removing portion 110 or the like, causing a slight loss. However, the amount of the working oil flowing out is small and the pressure in the second hydraulic chamber 62 (hydraulic chamber B) is lower than that of the first hydraulic chamber 61 (hydraulic chamber A), so that the efficiency of actuating the plunger 58 which presses the yoke 23 to increase the speed is not reduced, thus raising no problem.

(In the Case where the Number of Output Rotations Nout Exceeds 2Nin)

To acquire charge pressure larger than the urging force of the coil spring 124 with the swash plate surface 44 placed at the negative maximum tilt angle position, the working oil in the shaft hole 99 is pressurized by driving the unillustrated charge pump. Then, the moving member 116 moves to the output end side of the input shaft 21 against the urging force of the coil spring 124 and closes the restriction-portion 112a side opening end portion of the fluid passage 112.

As the moving member 116 moves to the output end side of the input shaft 21, the actuation pin 128 is pressed by the tapered portion 118a and moves in the radial direction from the axis O of the input shaft 21. With the close-end side of the bottom of the tapered groove 129 of the holder 79 being the start position, the actuation pin 128 keeps pressing the inclined tapered groove 129 while gradually changing this pressing point toward the far end side. Accordingly, the pressure of the actuation pin 128 moves the holder 79 toward the input end side of the input shaft 21 against the urging force of the coil spring 126. As a result, when the actuation pin 128 abuts on the far end side of the bottom of the tapered groove 129, the displacing-end of the second selector valve 76 moves to any position from the first displacement position R1 to the second displacement position R2.

Then, the zone which communicates with the port W and the second hydraulic chamber 62 is narrowed and the zone which is connected to the port W and the first hydraulic chamber 61 is widened. That is, over 2Nin, the area J becomes wider as shown in FIG. 39 and the area K becomes narrower.

As a result, as the stroke volume of the second hydraulic system 200 becomes relatively small with respect to the stroke volume VPmax of the first hydraulic system 100, the reciprocation speed of the action of the plunger 58 of the second hydraulic system 200 becomes faster to compensate for that. Accordingly, the number of forward rotations is increased by the action of the projecting pressurization of the plunger 58 on the rotary inclined surface 51, and the sum of the increased forward number of rotations and the number of rotations of the cylinder block 42 in the forward direction causes the yoke 23 and the output gear 24 to rotate at an increased speed greater than that of the case where the number of output rotations in the forward direction is 2Nin. The rotational torque in the forward direction is transmitted to the final reduction gear unit via the yoke 23, the output gear 24 and the input gear 151.

In the case where the swash plate surface 44 is positioned on the negative maximum tilt angle position side, the maximum stroke volume VPmax of the first hydraulic system 100 is slightly larger than the maximum stroke volume VMmax of the second hydraulic system 200 and the difference between them is expressed by Δ2 in FIG. 38. In FIG. 38, the portion Δ2 is illustrated enlarged for the sake of descriptive convenience.

The stroke volume VM of the second hydraulic system 200 is set to 0.6VMmax when the second selector valve 76 is at the second displacement position R2. As a result, the number of output rotations Nout is increased to approximately 2.7Nin from 2Nin. FIG. 35 shows the flow of the working oil and how the rotation is made in this state. In this embodiment, the oil removing portion 110 is closed in this state.

(In the Case where the Number of Output Rotations Nout is between 0 and Nin)

In a state where the number of output rotations Nout is between 0 and Nin, the moving member 116 is always stopped at the engage step portion 114a by the urging force of the coil spring 124, so that a little working oil is permitted to flow out from the second hydraulic chamber 62 (i.e., the hydraulic closing circuit C) to the small-diameter portion 113 of the shaft hole 99 via the oil removing portion 110 and the hole 120. That is, the displacing-end of the second selector valve 76 is positioned at the first displacement position R1.

By operating the unillustrated shift lever, the swash plate surface 44 is tilted to the positive side via the cradle 45 to be positioned in an area between a predetermined positive tilt angle position from the upright position. The predetermined positive tilt angle position in the positive tilt angle position is the position up to which the absolute value of the stroke volume VP of the first hydraulic system 100 becomes equal to the absolute value of the stroke volume VM of the second hydraulic system 200.

In this case, for the same reason given in the fourth embodiment, the projecting pressurization of the plunger 58 on the rotary inclined surface 51 provides reverse rotation to that of the "in the case where the number of output rotations Nout is between Nin and 2Nin and exceeds Nin". Therefore, the total (sum) of the number of rotations in the reverse direction and the number of rotations of the cylinder block 42 in the forward direction rotates the yoke 23 and the output gear 24. As the sum of the number of rotations at this time becomes the number of rotations in the forward direction reduced by the number of rotations in the reverse direction, the number of output rotations Nout becomes smaller as compared with that "In the case where the number of output rotations Nout is Nin".

In this embodiment, as the swash plate surface 44 is shifted toward the positive maximum tilt angle position from the upright position at this time, the stroke volume VP of the first hydraulic system 100 increases to −VMmax from 0 and the number of output rotations Nout accordingly reduces to 0 from Nin as shown in FIG. 38.

Figure 36:
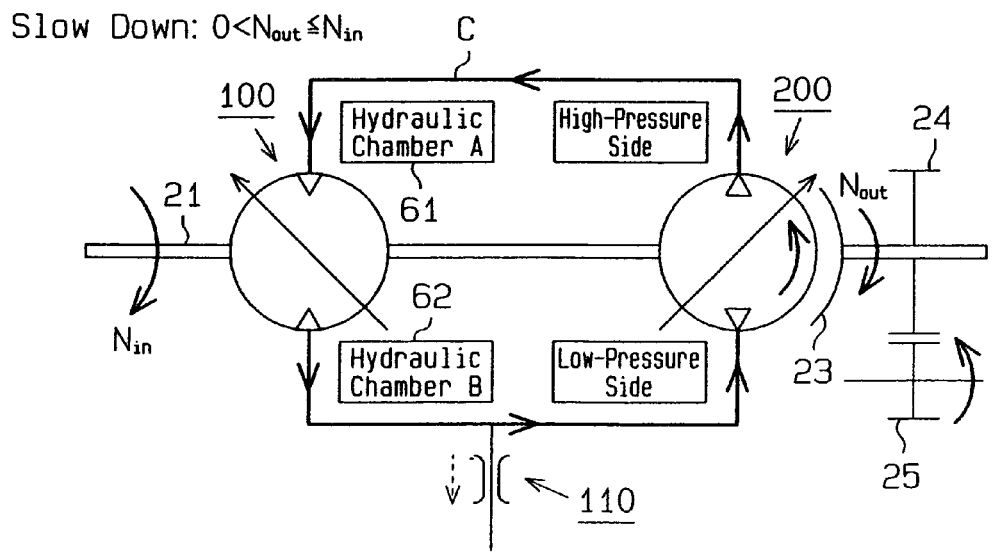
FIG. 36 is a conceptual diagram illustrating the action of the continuously variable transmission.

It is to be noted that the stroke volume VM of the second hydraulic system 200 per rotation when the number of output rotations Nout changes to zero from Nin is −VMmax. In this state, as described above, a little working oil flows out of the second hydraulic chamber 62 (i.e., the hydraulic closing circuit C) to the small-diameter portion 113 of the shaft hole 99 via the oil removing portion 110 or the like, causing a slight loss. However, the amount of the working oil flowing out is small and the pressure in the second hydraulic chamber 62 (hydraulic chamber B) is lower than that of the first hydraulic chamber 61 (hydraulic chamber A), so that the efficiency of actuation of the plunger 58 which presses the yoke 23 to increase the speed is not reduced, thus raising no problem. FIG. 36 is an exemplary diagram in that state. The pressure of the first hydraulic chamber 61 (hydraulic chamber A) becomes higher than that of the second hydraulic chamber 62 (hydraulic chamber B) and the working oil flows in the hydraulic closing circuit C as indicated by the arrows illustrated in the diagram.

(In the Case where the Number of Output Rotations Nout is Zero)

Next, by operating the unillustrated shift lever, the swash plate surface 44 is positioned at that position in the positive tilt angle position at which the absolute value of the stroke volume VP of the first hydraulic system 100 becomes equal to the absolute value of the stroke volume VM of the second hydraulic system 200.

In this case, in the present embodiment, the stroke volume VP of the first hydraulic system 100 becomes −VMmax. As a result, since −VP≈−VMmax, the number of rotations in the reverse direction and the number of rotations Nin at which the cylinder block 42 is driven via the input shaft 21 are balanced out, i.e., the sum of the number of rotations becomes zero (the number of output rotations Nout is zero) and the output gear 24 stops.

As the swash plate surface 44 is further tilted from the predetermined positive tilt angle position via the cradle 45 in this state, the absolute value of the stroke volume VP of the first hydraulic system 100 enters the range where it is greater than the absolute value (=VMmax) of the stroke volume VM of the second hydraulic system 200.

Therefore, the absolute value of the stroke volume VM of the second hydraulic system 200 becomes relatively small with respect to the absolute value of the stroke volume VP of the first hydraulic system 100, so that to compensate for it, the reciprocation speed of the plunger 58 of the second hydraulic system 200 should properly become faster in the second hydraulic system 200.

However, the pressure of the second hydraulic chamber 62 is higher as compared with that of the first hydraulic chamber 61 at this time, so that the high-pressure working oil flows out of the second hydraulic chamber 62 (i.e., the hydraulic closing circuit C) to the small-diameter portion 113 of the shaft hole 99 via the oil removing portion 110 or the like. Given that L is the maximum amount of loss flowing out from the hydraulic closing circuit C at the time the cylinder block 42 makes one turn, while the difference between the absolute value of the stroke volume VP of the first hydraulic system 100 and the absolute value of the stroke volume VM of the second hydraulic system 200. (|VP|−|VM|) satisfies |VP|−|VM|≦L (=Δ1), |VP| and |VM|+ loss amount are balanced out, so that in the second hydraulic system 200, the number of rotations in the reverse direction and the number of rotations Nin at which the cylinder block 42 is driven via the input shaft 21 are kept balanced out, i.e., the sum of the number of rotations becomes 0 (the number of output rotations Nout is 0) and the output gear 24 maintains the stationary state (neutral). In FIG. 38, Δ2 indicates the difference between the stroke volumes of both systems until |VP|−|VM| becomes L from 0.

(In the Case where the Number of Output Rotations Nout is Less than 0)

Further, to acquire charge pressure larger than the urging force of the coil spring 124 with the swash plate surface 44 placed at the positive maximum tilt angle position, the working oil in the shaft hole 99 is pressurized by driving the unillustrated charge pump. Then, the moving member 116 moves to the output end side of the input shaft 21 against the urging force of the coil spring 124 and closes the restriction-portion 112a side opening end portion of the fluid passage 112.

As the moving member 116 moves to the output end side of the input shaft 21, the actuation pin 128 is pressed by the tapered portion 118a and moves in the radial direction from the axis O of the input shaft 21. With the close-end side of the bottom of the tapered groove 129 of the holder 79 being the start position, the actuation pin 128 keeps pressing the inclined tapered groove 129 while gradually changing this pressing point toward the far-end side. Accordingly, the pressure of the actuation pin 128 moves the holder 79 toward the input end side of the input shaft 21 against the urging force of the coil spring 126. As a result, when the actuation pin 128 abuts on the far-end side of the bottom of the tapered groove 129, the displacing-end of the second selector valve 76 moves to any position from the first displacement position R1 to the second displacement position R2.

Then, as shown in FIG. 39, the zone which communicates with the port W and the second hydraulic chamber 62 is narrowed and the zone which is connected to the port W and the first hydraulic chamber 61 is widened. That is, when the number of output rotations Nout becomes smaller than zero, the area J becomes wider and the area K becomes narrower.

As a result, as the stroke volume of the second hydraulic system 200 becomes relatively small with respect to the stroke volume VPmax of the first hydraulic system 100, the reciprocation speed of the plunger 58 of the second hydraulic system 200 becomes faster to compensate for that. Accordingly, the number of rotations in the reverse direction is increased by the action of the projecting pressurization of the plunger 58 on the rotary inclined surface 51, and the sum of the increased number of rotations in the reverse direction and the number of rotations of the cylinder block 42 in the forward direction causes the yoke 23 and the output gear 24 to rotate at an increased speed than that of the case where the number of output rotations in the reverse direction is zero (see FIG. 38).

As the moving member 116 moves toward the output end of the input shaft 21 and closes the restriction-portion 112a side opening end portion of the fluid passage 112, the flow of the working oil out from the second hydraulic chamber 62 (i.e., the hydraulic closing circuit C) to the small-diameter portion 113 of the shaft hole 99 via the oil removing portion 110 or the like is stopped. Accordingly, the amount of the working oil which presses the plunger 58 of the second hydraulic system 200 is increased by the working oil which has been lost up to now.

Therefore, the absolute value of the stroke volume VM of the second hydraulic system 200 becomes relatively smaller with respect to the stroke volume VP of the first hydraulic system 100, so that in the second hydraulic system 200, the reciprocation speed of the plunger 58 of the second hydraulic system 200 becomes faster to compensate for that.

Accordingly, the projecting pressurization of the plunger 58 on the rotary inclined surface 51 increases the number of rotations in the reverse direction, and the total (sum) of the increased number of rotations in the reverse direction and the number of rotations of the cylinder block 42 in the forward direction causes the yoke 23 and the output gear 24 to rotate in the reverse direction to the input rotation.

The rotational torque in the reverse direction is transmitted to the final reduction gear unit via the yoke 23, the output gear 24 and the input gear 151. At this time, the number of output rotations Nout moves to a point d from a point c (in the point c, the number of output rotations Nout is zero and the stroke volume is −VPmax) in FIG. 38.

In the case where the swash plate surface 44 is positioned on the positive maximum tilt angle position side via the cradle 45, in FIG. 38, the absolute value of the maximum stroke volume VPmax of the first hydraulic system 100 is VPmax≈VMmax, though there is a slight difference, and the absolute value of the stroke volume of the second hydraulic system 200 becomes 0.6VMmax. Therefore, the number of output rotations Nout is accordingly reduced from 0, but the number of output rotations Nout increases its reverse rotation accordingly from the present point d. That is, in FIG. 38, the number of output rotations Nout becomes faster in the backward direction in such a way as to go further leftward from the present point d.

Figure 37:
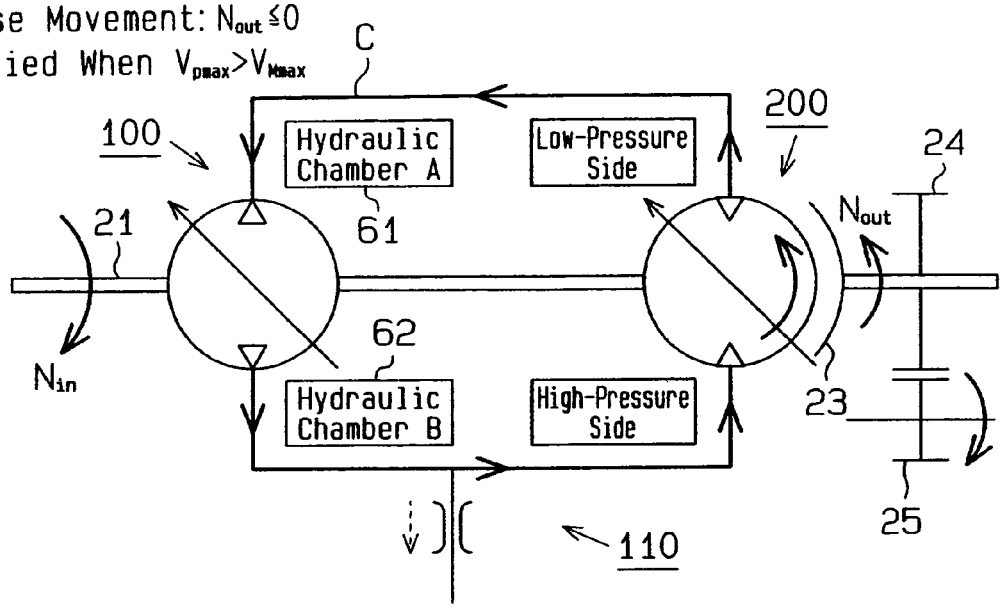
FIG. 37 is a conceptual diagram illustrating the action of the continuously variable transmission.

As shown in FIG. 38, Nout varies on the solid line indicated by the label "with seal ". The rotational torque in the reverse direction is transmitted to the final reduction gear unit via the yoke 23, the output gear 24 and the input gear 151. FIG. 37 is an exemplary diagram showing the state at this time. The pressure of the second hydraulic chamber 62 (hydraulic chamber B) becomes higher than that of the first hydraulic chamber 61 (hydraulic chamber A) and the working oil flows in the hydraulic closing circuit C as indicated by the arrows illustrated in the diagram.

This embodiment provides the following advantages.

(1) In the continuously variable transmission 20 (hydraulic continuously variable transmission) of the fifth embodiment, the maximum stroke volume VPmax of the first hydraulic system 100 has a range exceeding the maximum stroke volume VMmax of the second hydraulic system 200, and the oil removing portion 110 is provided in the second hydraulic chamber 62, the pressure of which becomes lower when the yoke 23 rotates forwardly with respect to the input rotation in the fluid passage (hydraulic closing circuit C) which connects the first hydraulic system 100 to the second hydraulic system 200.

As a result, in the range from the point where the stroke volume VP of the first hydraulic system 100 becomes equal to the stroke volume VMmax of the second hydraulic system 200 to the point at which it can cope with the oil escape amount of the oil removing portion 110 (the amount of loss flowing out of the hydraulic closing circuit C), the number of output rotations Nout becomes 0 so that neutral can be realized, as per the fourth embodiment. Therefore, the range where neutral can be carried out can have a margin by the oil escape amount.

(2) According to the fifth embodiment, the volume difference between the maximum stroke volume VPmax of the first hydraulic system 100 and the maximum stroke volume VMmax of the second hydraulic system 200 is set very small. That is, as the stroke amount of the first plunger 43, 58 is made very slight by making the maximum tilt angle of the swash plate surface 44 and the tilt angle of the rotary inclined surface 51 very small, a plunger common to both the first hydraulic system 100 and the second hydraulic system 200 can be prepared so that the part can be shared by both systems. Since the stroke amount is very slight, the cylinder block 42 can be made compact.

In this specification, a slight difference is such a degree as to be able to provide the range where neutral can take place with a margin of the oil escape amount.

(3) In the fifth embodiment, the retainer 83 which reciprocates the second selector valve 76 is provided and the displacing mechanism D for displacing the retainer 83 along the axis O is provided. As the retainer 83 is moved by pressure toward the cylinder block 42 by the displacing mechanism D, the second selector valve 76 is displaced from the first displacement position R1 to the second displacement position R2. And, the second selector valve 76 is arranged closer to the axis O (inner side) than the plunger 43, 58. Accordingly, the displacing mechanism D of the continuously variable transmission 20 can be laid out on the inner surface of the yoke 23.

In addition, the hydraulic continuously variable transmission in which the distributing valve or selector valve is located in the vicinity of the outer periphery of the cylinder block outside the first and second plungers has been known. In such a conventional hydraulic continuously variable transmission, the displacing mechanism for displacing the distributing valve is so arranged as to extend outward from the first and second plungers, which results in the problem that the transmission becomes enlarged. By way of contrast, the continuously variable transmission 20 can be made compact as compared with the conventional hydraulic continuously variable transmission.

(4) In the fifth embodiment, the retainer 83 is moved by pressure by the hydraulic pressure of the working oil acting on the displacing mechanism D. It is therefore possible to displace the second selector valve 76 along the axis O by the hydraulic pressure of the working oil without providing a special link mechanism, so that the displacing mechanism D can be made simple.

(5) In this embodiment, the slope of the tapered portion 118a of the moving member 116 is formed gentler than the slope of the tapered groove 129 of the holder 79. When the moving member 116 is pressed by the hydraulic pressure of the working oil, therefore, the amount of displacement of the retainer 83 becomes smaller than the amount of displacement of the moving member 116. Thus, it is possible to make the amount of displacement of the retainer 83 very small. As a result, the adjustment of the amount of movement of the second selector valve 76 can be carried out accurately and easily even if the hydraulic pressure of the working oil is used as the drive source.

Sixth Embodiment

Next, the sixth embodiment of the present invention will be described based on FIGS. 40 to 46. The description will be given centering on structures different from the fourth embodiment. The description will be given using the same reference symbols corresponding to the structures of the fourth embodiment.

The sixth embodiment differs from the fourth embodiment in that a small hole 130 open to the outer surface of the center portion of the cylinder block 42 is formed in the bottom of each second plunger hole 57 and a cylindrical cover member 131 is fitted over the outer surface of the center portion of the cylinder block 42 in such a way as to be slidable along the axial direction.

In detail, a projection 132 is formed on the outer surface of the center portion of the cylinder block 42 at one axial-directional end and a stop ring 133 is fixed to the other end. A coil spring 134 is put around the outer surface of the center portion of the cylinder block 42 between the cover member 131 and the stop ring 133 and is urged in such a way as to stop the cover member 131 at the projection 132. At the time the cover member 131 is stopped at the projection 132, the small hole 130 is closed by the cover member 131 and at the time the cover member 131 is moved toward the output end of the input shaft 21, the small hole 130 can be released to the outside.

Protrusively provided on the outer surface of the cover member 131 is a flange 135 which goes around. An actuation member 136 is inserted in the case 26 via an operation hole 27a provided in the cylinder member 27 of the case 26. The actuation member 136 is provided, at its distal end, with a roller 137 which is rotatable about its axis and abuts on the flange 135 of the cover member 131 via the roller 137. And, the cover member 131 is driven toward the output end of the input shaft 21 via the flange 135 against the urging force of the coil spring 134 by an unillustrated actuator (e.g., a solenoid) or the like. At the time the shift lever 146 is shifted toward the backward movement area, the actuator works for a predetermined time by a control signal from the unillustrated control unit to drive the cover member 131 toward the output end of the input shaft 21 by means of the actuation member 136, and after the predetermined time elapses, the control signal vanishes so as to release its driving.

The cover member 131, the actuation member 136, the coil spring 134 and so forth constitute an oil removing mechanism M.

In the sixth embodiment, the maximum stroke volume VPmax of the first hydraulic system 100 is set slightly larger than the maximum stroke volume VMmax of the second hydraulic system 200 so that there is a difference Δ2 between them as per the above-described embodiment. Specifically, in this embodiment, the inside diameter of the plunger hole 47 of the first hydraulic system 100 is set approximately the same as the inside diameter of the plunger hole 57 of the second hydraulic system 200, the diameters of the plungers 43 and 58 are set approximately the same, and the maximum tilt angle of the swash plate surface 44 is set slightly greater than the tilt angle of the rotary inclined surface 51 in such a way that the stroke amount of the plunger 43 has a difference in the maximum stroke volume so as to become greater than the stroke amount of the plunger 58.

In this embodiment, the output gear 24 is omitted and instead, the gear transmission 150 (CST) similar to that of the embodiment shown in FIG. 8 is connected to the yoke 23 as the output rotary section.

Next, the action of the continuously variable transmission 20 of this embodiment will be discussed.

In the sixth embodiment, the number of output rotations Nout is the number of rotations of the output shaft 155.

(In the Case where the Number of Output Rotations Nout is Nin)

It is assumed that the cover member 131 that constitutes the oil removing mechanism M is stopped at the projection 132 and the small hole 130 is closed by the cover member 131.

The swash plate surface 44 is positioned at the upright position via the cradle 45 by operating the shift lever 146 shown in FIG. 11.

Figure 43:
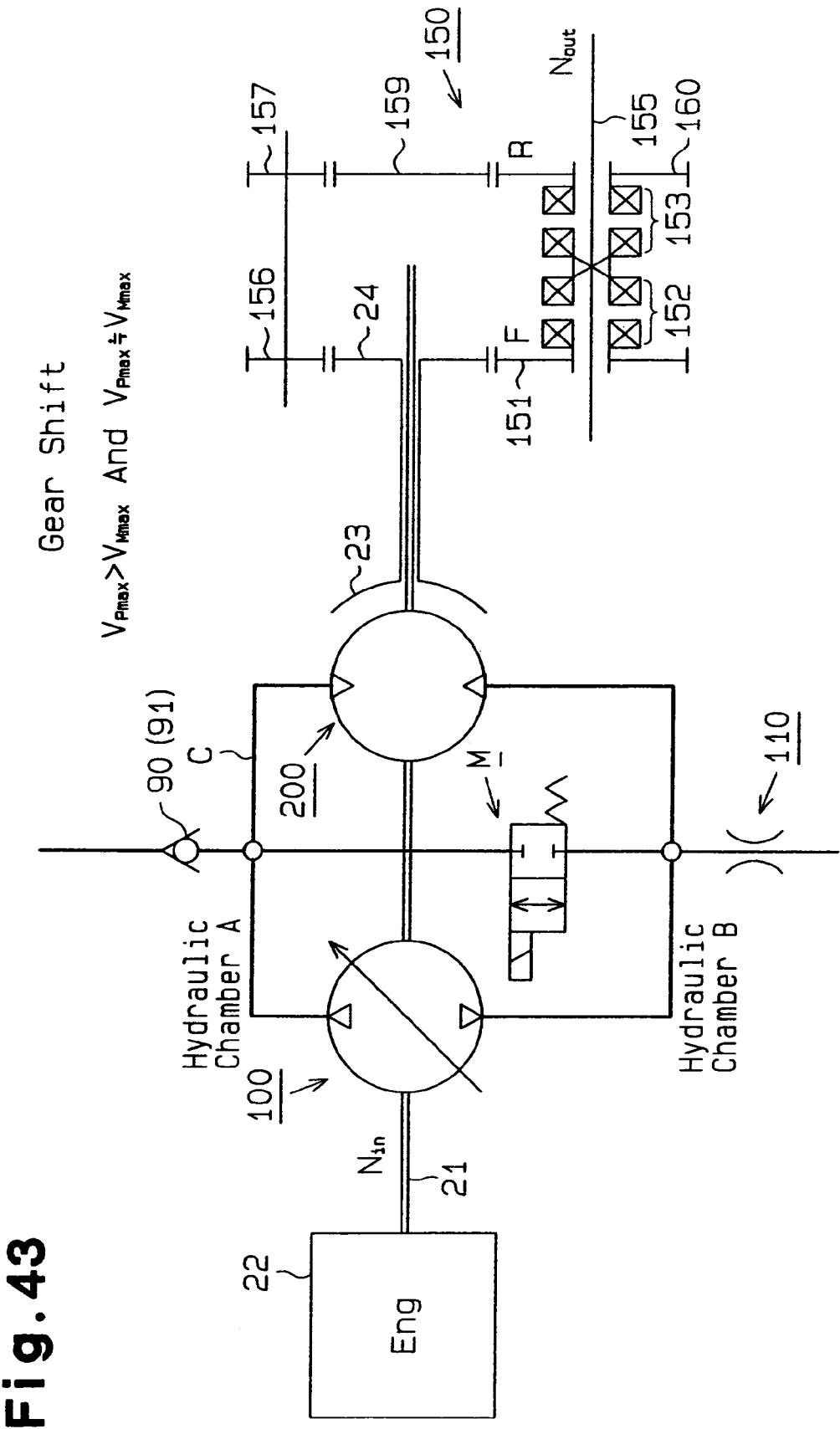
FIG. 43 is a conceptual diagram of the continuously variable transmission of the sixth embodiment.

In this state, for the same reason given in the fourth embodiment, the cylinder block 42 and the rotary inclined surface 51 come to a directly coupled state and rotate together. That is, in this state, the input shaft 21 and the output gear 142 are directly coupled. The rotation imparted to the rotary inclined surface 51 is transmitted to the final reduction gear unit via the yoke 23 and the coupled first clutch 152, gear 24 and gear 151. In the case where the gear transmission 150 shown in FIG. 43 is to be connected, it is referred to as rotation in the forward direction when the output shaft 155 rotates reversely to Nin.

Figure 46:
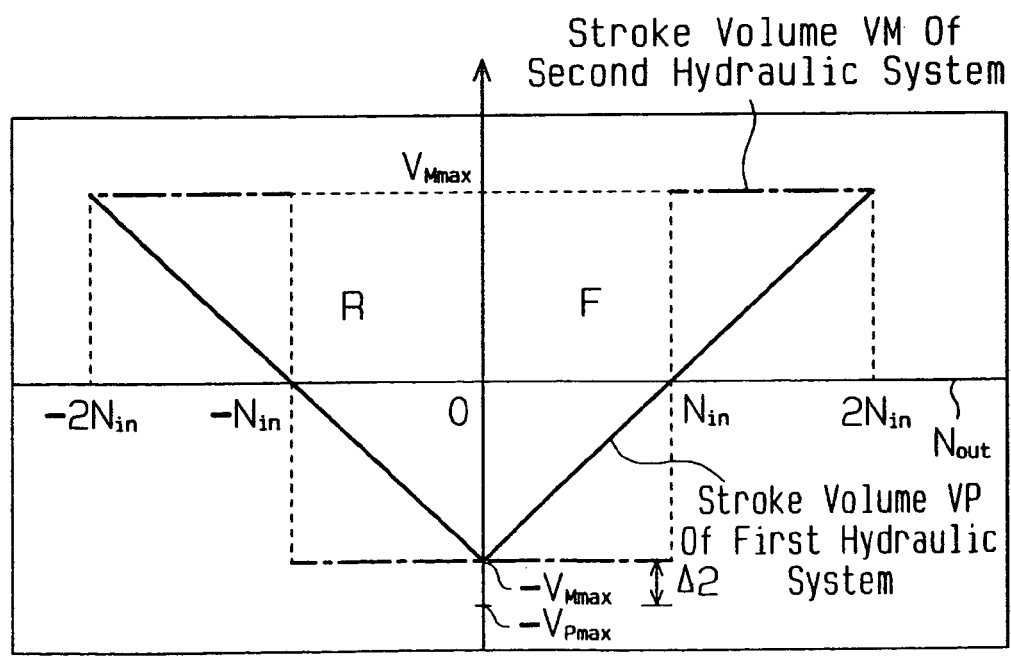
FIG. 46 is a characteristic diagram showing the relationship between stroke volume and the number of output rotations.

In the case where the swash plate surface 44 is positioned at the upright position, the stroke volume VP of the first hydraulic system 100 becomes 0 and the number of output rotations Nout (the number of rotations of the output shaft 155) becomes equal to the number of input rotations Nin, as shown in FIG. 46.

(In the Case where the Number of Output Rotations Nout is between Nin and 2Nin)

By operating the shift lever 146, the swash plate surface 44 is tilted to the negative side via the cradle 45 to be positioned in an area between a predetermined negative tilt angle position and the upright position as per the fourth embodiment. The predetermined negative tilt angle position is the position up to which the absolute value of the stroke volume VP of the first hydraulic system 100 becomes equal to the absolute value (=VMmax) of the stroke volume VM of the second hydraulic system 200.

In this case too, for the same reason given in the fourth embodiment, the rotary inclined surface 51 is rotated by the total (sum) of the number of input rotations Nin of the cylinder block 42 driven via the input shaft 21 and the number of rotations in the forward direction by the projecting pressurization of the plunger 58 on the rotary inclined surface 51. The forward-directional rotation to be imparted on the rotary inclined surface 51 is transmitted to the final reduction gear unit as the forward-directional rotation via the yoke 23 and the coupled first clutch 152, gear 24 and gear 151 to carry out the speed increasing action.

At this time, as the swash plate surface 44 is displaced toward the predetermined negative tilt angle position from the upright position, the stroke volume VP of the first hydraulic system 100 increases to VMmax from 0 and the number of output rotations Nout increases to 2Nin from Nin accordingly in FIG. 46.

Figure 45:
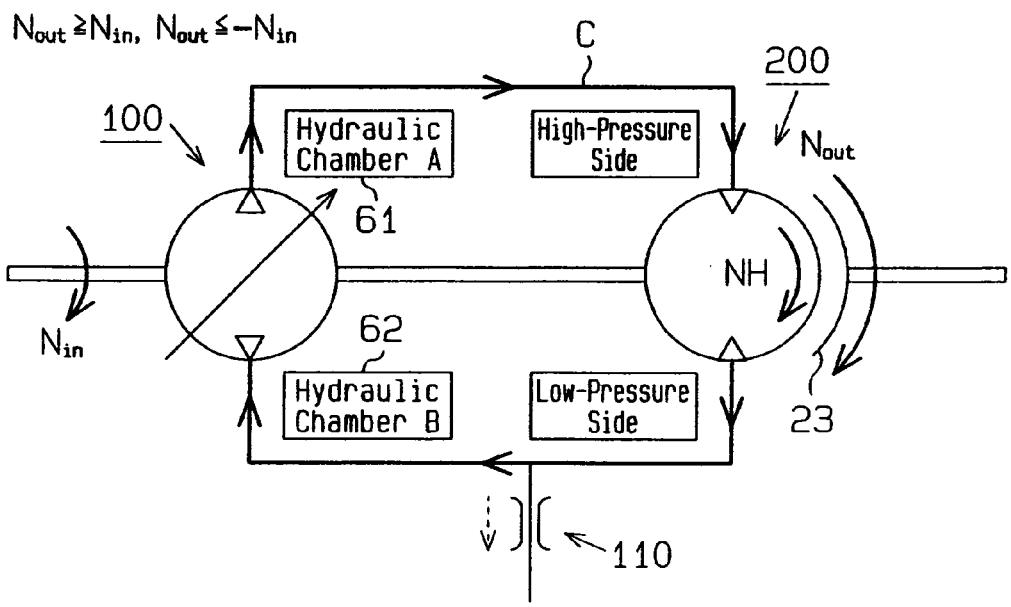
FIG. 45 is a conceptual diagram illustrating the action of the continuously variable transmission.

It is to be noted that the stroke volume VM of the second hydraulic system 200 when the number of output rotations Nout changes to 2Nin from Nin remains at VMmax. FIG. 45 shows the flow of the working oil and how the rotation is made in this state.

In this state, as described above, a little working oil flows out of the second hydraulic chamber 62 (i.e., the hydraulic closing circuit C) to the small-diameter portion 113 of the shaft hole 99 via the oil removing portion 110 or the like, causing a slight loss. However, the amount of the working oil flowing out is small and the pressure in the second hydraulic chamber 62 (hydraulic chamber B) is lower than that of the first hydraulic chamber 61 (hydraulic chamber A), so that the efficiency of actuating the plunger 58 which presses the yoke 23 to increase the speed is not reduced, thus raising no problem.

(In the Case where the Number of Output Rotations Nout is between 0 and Nin)

By operating the shift lever 146, the swash plate surface 44 is tilted to the positive side via the cradle 45 to be positioned at a positive tilt angle position from the upright position. The predetermined positive tilt angle position in the positive tilt angle position is the position up to which the absolute value of the stroke volume VP of the first hydraulic system 100 becomes equal to the absolute value of the stroke volume VM of the second hydraulic system 200.

In this case, for the same reason given in the fourth embodiment, the projecting pressurization of the plunger 58 on the rotary inclined surface 51 provides reverse rotation to that of the "in the case where the number of output rotations Nout is between Nin and 2Nin and exceeds 2Nin". Therefore, the total (sum) of the number of rotations in the reverse direction and the number of rotations of the cylinder block 42 in the forward direction is transmitted to the final reduction gear unit via the yoke 23 and the coupled first clutch 152, gear 24 and gear 151.

As the sum of the number of rotations at this time becomes the number of rotations in the forward direction reduced by the number of rotations in the reverse direction, the number of output rotations Nout becomes smaller as compared with that "in the case where the number of output rotations Nout is Nin".

In this embodiment, as the swash plate surface 44 is shifted toward the positive maximum tilt angle position from the upright position at this time, the stroke volume VP of the first hydraulic system 100 increases to −VMmax from zero and the number of output rotations Nout accordingly increases to zero from Nin in FIG. 46.

It is to be noted that the stroke volume VM of the second hydraulic system 200 per rotation when the number of output rotations Nout changes to zero from Nin is −VMmax. In this state, as described above, a little working oil flows out of the second hydraulic chamber 62 (i.e., the hydraulic closing circuit C) to the small-diameter portion 113 of the shaft hole 99 via the oil removing portion 110 or the like, causing a slight loss. However, the amount of the working oil flowing out is small and the pressure in the second hydraulic chamber 62 (hydraulic chamber B) is lower than that of the first hydraulic chamber 61 (hydraulic chamber A), so that the efficiency of actuation of the plunger 58 which presses the yoke 23 to increase the speed is not reduced, thus raising no problem.

Figure 44:
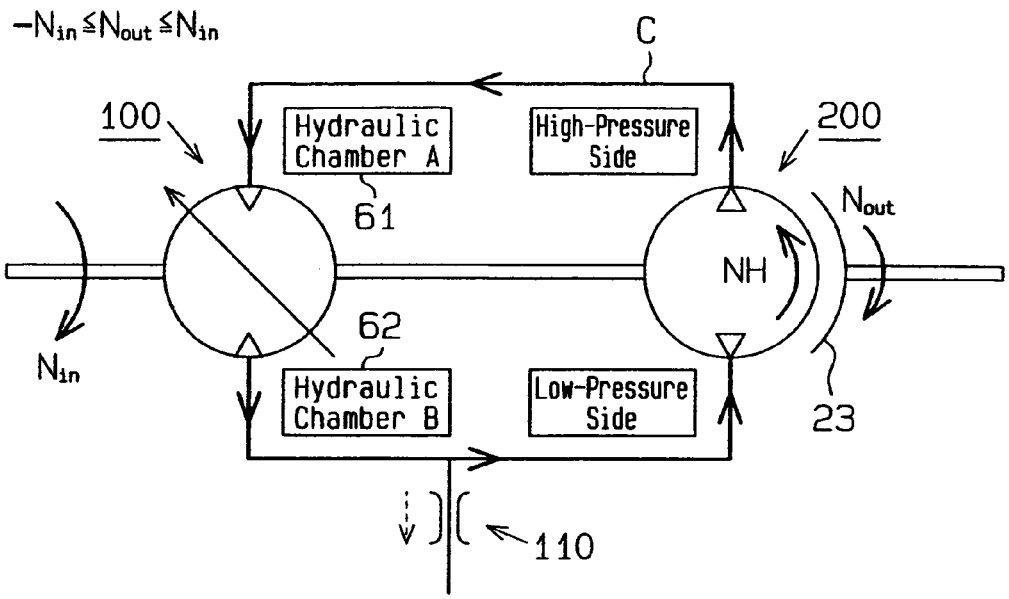
FIG. 44 is a conceptual diagram illustrating the action of the continuously variable transmission.

FIG. 44 is an exemplary diagram in that state. The pressure of the first hydraulic chamber 61 (hydraulic chamber A) becomes higher than that of the second hydraulic chamber 62 (hydraulic chamber B) and the working oil flows in the hydraulic closing circuit C as indicated by the arrows illustrated in the diagram.

(In the Case where the Number of Output Rotations Nout is Zero)

Next, by operating the shift lever 146, the swash plate surface 44 is positioned via the cradle 45 at that position in the positive tilt angle position at which the absolute value of the stroke volume VP of the first hydraulic system 100 becomes equal to the absolute value of the stroke volume VM of the second hydraulic system 200. In this case, in the present embodiment, the stroke volume VP of the first hydraulic system 100 becomes −VMmax. As a result, since of −VP≈−VMmax, the number of rotations in the reverse direction and the number of rotations Nin at which the cylinder block 42 is driven via the input shaft 21 are balanced out, i.e., the sum of the number of rotations becomes zero (the number of output rotations Nout is zero) and the output gear 24 stops.

As the swash plate surface 44 is further tilted from the predetermined positive tilt angle position via the cradle 45 in this state, the absolute value of the stroke volume VP of the first hydraulic system 100 enters the range where it is greater than the absolute value (=VMmax) of the stroke volume VM of the second hydraulic system 200.

Therefore, the absolute value of the stroke volume VM of the second hydraulic system 200 becomes relatively small with respect to the absolute value of the stroke volume VP of the first hydraulic system 100, so that to compensate for it, the reciprocation speed of the plunger 58 of the second hydraulic system 200 should properly become faster in the second hydraulic system 200.

However, at this time since the pressure of the second hydraulic chamber 62 is higher as compared with that of the first hydraulic chamber 61, and the high-pressure working oil flows out of the second hydraulic chamber 62 (i.e., the hydraulic closing circuit C) to the small-diameter portion 113 of the shaft hole 99 via the oil removing portion 110 or the like, so that the amount of the working oil flowing out becomes large. Given that L is the maximum amount of loss flowing out from the hydraulic closing circuit C at the time the cylinder block 42 makes one turn, while the difference between the absolute value of the stroke volume VP of the first hydraulic system 100 and the absolute value of the stroke volume VM of the second hydraulic system 200 (|VP|−|VM|) satisfies |VP|−|VM|≦L (=Δ1), |VP| and |VM|+ loss amount are balanced out as a consequence, so that in the second hydraulic system 200, the number of rotations in the reverse direction and the number of input rotations Nin at which the cylinder block 42 is driven via the input shaft 21 are kept balanced out, i.e., the sum of the number of rotations becomes zero (the number of output rotations Nout is zero) and the output gear 24 maintains the stationary state (neutral).

In FIG. 46, Δ2 indicates the difference between the stroke volumes of both systems until |VP|−|VM| becomes L from zero. In FIG. 46, the portion of Δ2 is illustrated enlarged for the sake of descriptive convenience.

(In the Case where the Number of Output Rotations Nout is Less than Zero)

Further, as the shift lever 146 is shifted toward the backward movement side in this state, the unillustrated actuator (solenoid) is activated for a given time in response to the operation of the shift lever 146, causing the actuation member 136 to drive the cover member 131 to the output end side of the input shaft 21.

As a result, the movement of the cover member 131 opens the small hole 130 to the outside, so that the hydraulic pressure of the working oil is released. When the hydraulic pressure is released, the pressurization action of the plunger 58 on the rotary inclined surface 51 vanishes, setting the yoke 23 free from the second hydraulic system 200. Therefore, the first clutch 152 of the gear transmission 150 can be disconnected, so that the second clutch 153 is connected in response to the operation of the shift lever 146. At the time of returning to the forward movement side, the hydraulic pressure of the working oil in the second plunger hole 57 is released for the same reason.

After the predetermined time elapses, the driving of the actuator is released, so that the cover member 131 moves due to the urging force of the coil spring 134 until it is stopped at the projection 132, closing the small hole 130 again. Consequently, the hydraulic pressure of the working oil acts on the second plunger hole 57 and the plunger 58 starts pressing the rotary inclined surface 51.

(In the Case where the Number of Output Rotations Nout is between 0 and −Nin)

After connection for backward movement is achieved by the second clutch 140, the number of output rotations Nout and the state of a change in the stroke volume of the first hydraulic system 100 are the same as those of the case of the forward movement (forward rotation) as shown in FIG. 46, and their descriptions are the same as those (In the case where the number of output rotations Nout is between 0 and Nin), so that the descriptions will be omitted. FIG. 44 shows the flow of the working oil and how the rotation is made.

(In the Case where the Number of Output Rotations Nout is between −Nin and −2Nin)

In this case too, the actions of the first hydraulic system 100 and the second hydraulic system 200 are the same as those (In the case where the number of output rotations Nout is between Nin and 2Nin), so that the descriptions will be omitted. FIG. 45 shows the flow of the working oil and how the rotation is made.

The sixth embodiment provides the following advantages.

(1) In the sixth embodiment, the oil removing mechanism M is provided which works to release the hydraulic pressure to be applied to the plunger 58 of the second hydraulic system 200 at the time the rotational direction of the yoke 23 (output rotary section) is switched (from forward to reverse and from reverse to forward).

Consequently, the torque at the time the rotational direction of the yoke 23 is switched can be released, making it possible to easily perform the switching of the forward/reverse rotation. Particularly, as the plunger hole 57 is directly released to the outside of the cylinder block 42, this embodiment can easily realize the above effect.

(2) In the sixth embodiment, the continuously variable transmission 20 is constructed to have the input shaft 21 which acquires the input rotation from the engine 22 (motor) and the input shaft 21 is constructed as the output shaft extending opposite to the motor. And, the yoke 23 (output rotary section) is provided on the outer surface of the extended input shaft 21 and the gear transmission 150 (forward/reverse rotation switching device) which carries out power transmission of the yoke 23 and can be switched between forward and reverse rotations is provided to constitute the power transmission apparatus.

As a result, it can demonstrate the action and effect of the above (1) as the power transmission apparatus.

Seventh Embodiment

Next, the seventh embodiment of the present invention will be described.

The seventh embodiment is embodied into the variable transmission 20 whose cylinder block 42 is shared by the first hydraulic system and the second hydraulic system and has the plungers 43, 58 laid out radially (hereinafter referred to as a radial type).

The following description is given referring to FIG. 47 to FIG. 51.

Figure 47:
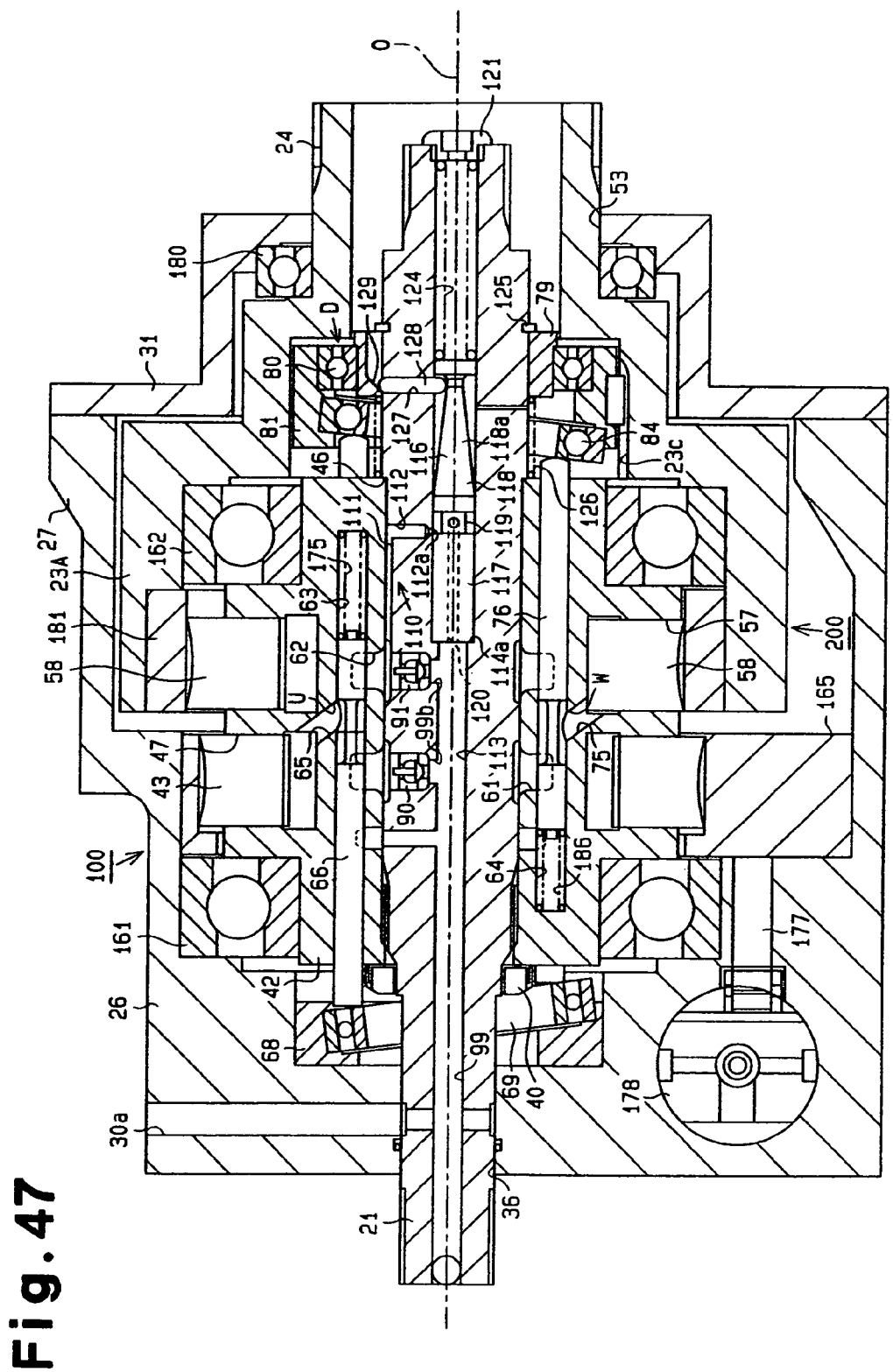
FIG. 47 is a horizontal cross-sectional view of a continuously variable transmission according to a seventh embodiment.

FIG. 47 shows a radial type hydraulic continuously variable transmission. With regard to the structure same as or equivalent to the structure of the above-described embodiment, the same reference symbols are given to omit its description and the description will center on the differences.

In the cylinder block 42, the input side end portion of the input shaft 21 is rotatably supported on the inner surface of the case 26 via a bearing 161 and the output side end portion is coupled to the inner surface of an output rotary cylinder 23A as the output rotary section via a bearing 162 in a relatively rotatable manner. The output rotary cylinder 23A is rotatably supported on the side-wall member 31 via a bearing 180. The output rotary cylinder 23A has a function equivalent to the yoke 23 of the other embodiments.

In the radial type first hydraulic system 100, a plurality of plungers 43 are laid out around the axis O in such a way as to be protractable and retractable with respect to the cylinder block 42.

A ring-shaped member 165 has its outer surface formed to have a circular transverse cross section (the cross section cut in a direction orthogonal to the axis O) and is rotatably fitted in the inner surface of the case 26 in a slide contact therewith about its own axis. That is, the axis (center) of an outer surface 165s of the ring-shaped member 165 is located coaxial to an axis S of the inner surface fitted in the case 26.

An inner surface 165r of the ring-shaped member 165 is formed to have a circular transverse cross section and its axis R (center) is arranged eccentric to the axis (center) of the outer surface. That is, the axis R is arranged eccentric to the axis S.

The ring-shaped member 165 is equivalent to the abutting portion.

Figure 48:
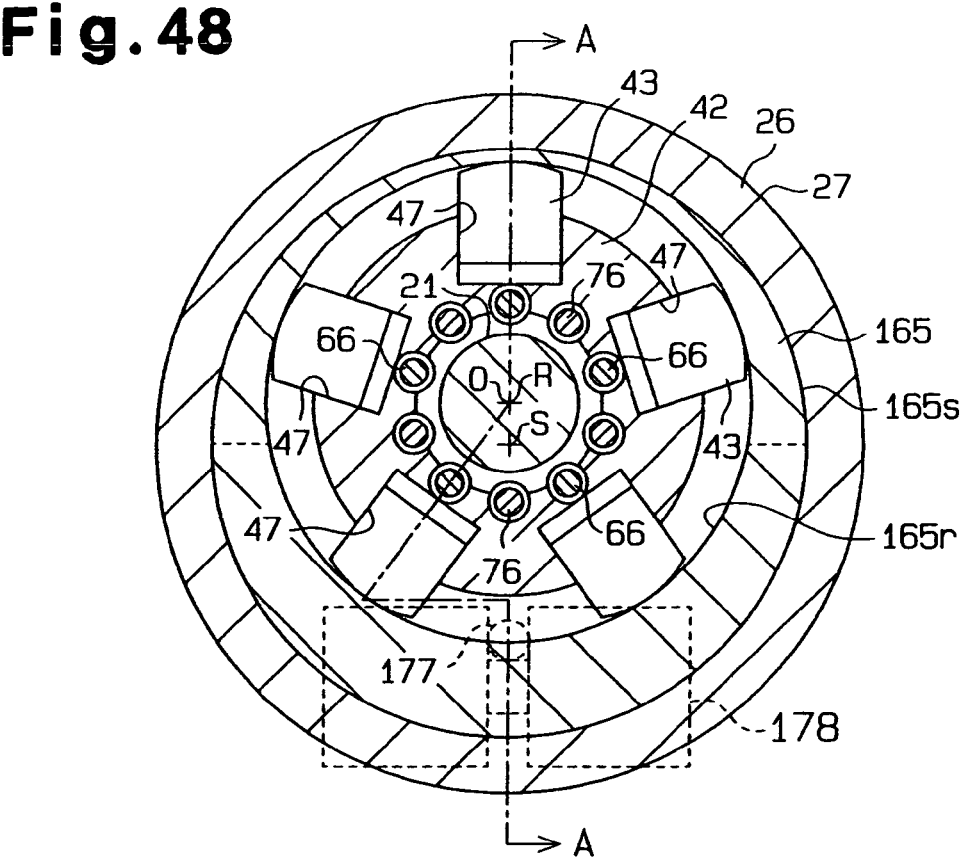
FIG. 48 is a transverse cross-sectional view of a first hydraulic system.
Figure 49:
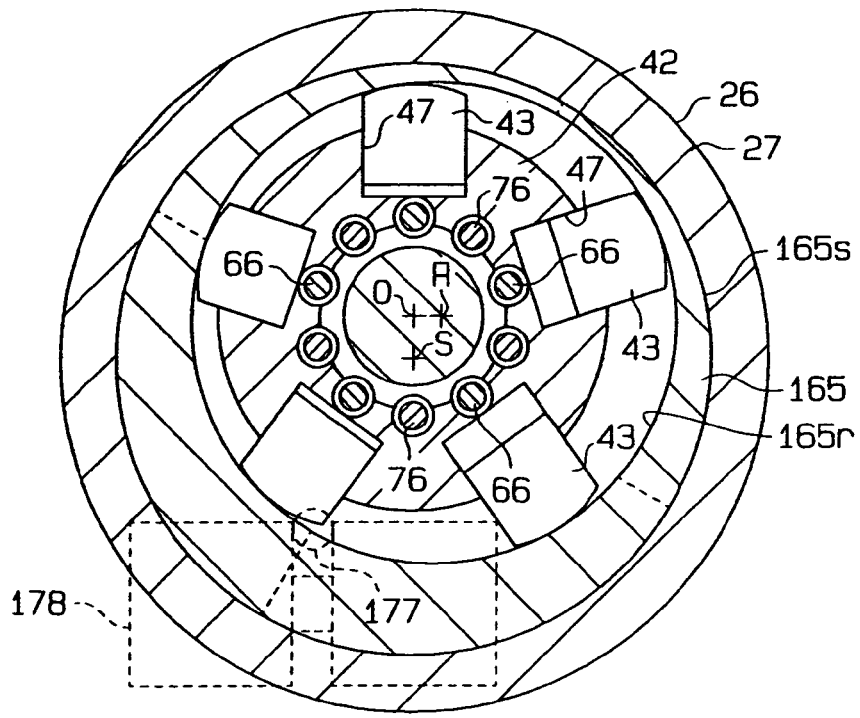
FIG. 49 is a transverse cross-sectional view showing the operational state of the continuously variable transmission.
Figure 50:
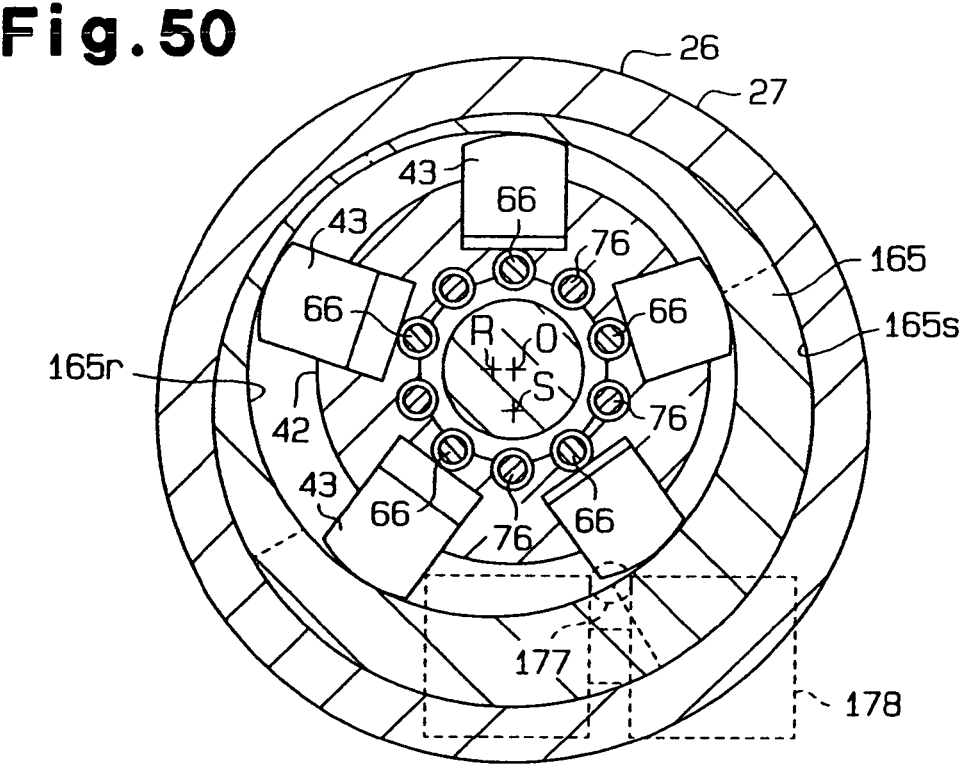
FIG. 50 is a transverse cross-sectional view showing the operational state of the continuously variable transmission.
Figure 51:
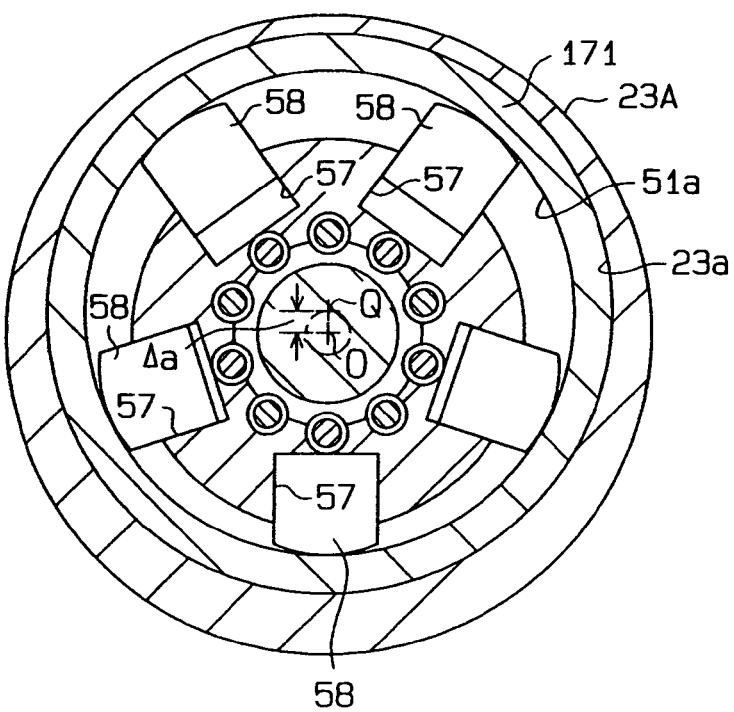
FIG. 51 is a transverse cross-sectional view of a second hydraulic system.

And, as shown in FIG. 48, the ring-shaped member 165 is made rotatable in a predetermined range including a position where the inner surface axis R coincides with the axis O (hereinafter referred to as the neutral position). That is, with the neutral position as a reference, the ring-shaped member 165 is made rotatable between a position turned clockwise by a predetermined angle as shown in FIG. 49 (hereinafter, this position is called first position in this embodiment) and a position turned counterclockwise by a predetermined angle as shown in FIG. 50 (hereinafter, this position is called second position in the seventh embodiment). It is assumed that the rotation of the input shaft 21 is counterclockwise in FIG. 48. The ring-shaped member 165 reciprocates between the first position and the second position by the driving of a hydraulic system 178 housed in the case 26 via a coupling shaft 177.

In the seventh embodiment, with the ring-shaped member 165 position at the neutral position as a reference, the position turned clockwise is a negative rotational position (see FIG. 49) and the position turned counterclockwise is a positive rotational position (see FIG. 50).

And, in the seventh embodiment, with the number of output rotations Nout=Nin as the boundary, it is moved to a negative rotational position when Nout>Nin and it is moved to a positive rotational position when Nout<Nin. The number of output rotations is the number of output rotations of the output rotary cylinder 23A.

FIG. 49 shows the ring-shaped member 165 positioned at the first position or the state where it is positioned to the maximum rotational position in the negative rotational position. FIG. 50 shows the ring-shaped member 165 positioned at the second position or the state where it is positioned to the maximum rotational position in the positive rotational position.

A plurality of plunger holes 47 are laid out radially and at equiangular distances about the rotational center (axis O) at that portion of the cylinder block 42 which faces the ring-shaped member 165. The plunger hole 47 has an opening formed in the outer surface of the cylinder block 42. The plunger 43 is slidably placed in each plunger hole 47 in such a way as to protract and retract through the opening.

The ring-shaped member 165 positioned at the positive rotational position or the negative rotational position causes the plunger 43 to reciprocate as the cylinder block 42 rotates, and imparts the actions of suction and discharge strokes. As a result, the first hydraulic system 100 in this embodiment is constructed so as to cause the plunger 43 to retract and protract as in the case where the swash plate surface 44 in the fourth embodiment to the sixth embodiment is tilted in the positive and negative directions.

The radial type second hydraulic system 200 includes the cylinder block 42, a plurality of plungers 58 slidably laid out on the cylinder block 42 and the output rotary cylinder 23A equipped with a slide-contact member 181 which abuts on the plungers 58. The plural plungers 58 are laid out so as-to be protractable and retractable in the radial direction about the axis O with respect to the cylinder block 42. The slide-contact member 181 is formed in a circular ring shape in such a way that the inner and outer surfaces become coaxial to each other and is securely fitted to the inner surface of the inner end of the output rotary cylinder 23A as shown in FIG. 34. The inner surface of the slide-contact member 181 is formed to have a circular transverse cross section whose center is arranged so as to coincide with the center Q of the inner surface that is fitted over the output rotary cylinder 23A.

Therefore, the slide-contact member 181 is laid out in such a way that its axis (center Q) is eccentric to the axis O of the input shaft 21 by a predetermined offset Δa and the center Q moves about the axis O, drawing a circle, at the time the output rotary cylinder 23A rotates.

A plurality of plunger holes 57 are laid out radially and at equiangular locations about the rotational center (axis O) at that portion of the cylinder block 42 which faces the slide-contact member 181. The plunger hole 57 has an opening formed in the outer surface of the cylinder block 42. The plunger 58 is slidably placed in each plunger hole 57 in such a way as to protract and retract through the opening.

At the time of the relative rotation of the slide-contact member 181 and the cylinder block 42, the abutment of the plunger 58 and the slide-contact member 181 causes the plunger 58 to reciprocate and repeat the suction and discharge strokes.

In the seventh embodiment, the maximum stroke volume VPmax of the first hydraulic system 100 is set slightly larger than the maximum stroke volume VMmax of the second hydraulic system 200 with a difference Δ2 between them as per the fifth embodiment. Specifically, the inside diameter of the plunger hole 47 of the first hydraulic system 100 is set approximately the same as the inside diameter of the plunger hole 57 of the second hydraulic system 200, the diameters of the plungers 43 and 58 are set approximately the same, and the maximum rotational position of the ring-shaped member 165 is set in such a way that the stroke amounts of the plungers 43, 58 have a difference in the maximum stroke volume.

In the seventh embodiment, the first selector valve 66 abuts on the inner ring of the ball bearing 69 as a bearing in a pressed state by a coil spring 175 arranged on the bottom of the first valve hole 63. The ball bearing 69 is laid out in such a way that its axis is askew to the axis O as per the fourth embodiment. The second selector valve 76 abuts on the inner ring of the ball bearing 84 as a bearing in a pressed state by a coil spring 186 arranged on the bottom of the second valve hole 64.

The ball bearing 84 is laid out in such a way that its axis is askew to the axis O.

In this embodiment, the support member 81 is engaged with the inner surface of the output rotary cylinder 23A in such a way as to be slidable along a guide groove 23c formed in parallel to the axis O. Further, the holder 79 coupled to the support member 81 via the ball bearing 80 is fitted over the outer surface of the input shaft 21 in such a way as to be slidable along the axis O.

The coil spring 126 as urging means, put around the outer surface of the input shaft 21, is arranged between the cylinder block 42 and the holder 79 and the holder 79 is normally urged toward the output end of the input shaft 21 by the urging force of the coil spring 126. The urging force of the coil spring 126 is set to such a strength that the holder 79 does not move toward the input end of the input shaft 21 even if centrifugal force in the radial direction is applied to the actuation pin 128 by the rotation of the input shaft 21.

The action of the continuously variable transmission 20 constructed in the above-described manner will be discussed using FIG. 7 and FIGS. 35 to 39. For the sake of descriptive convenience, the description will be given on the premise that the number of input rotations Nin to be imparted to the input shaft 21 from the crankshaft of the engine 22 is constant.

(In the Case where the Number of Output Rotations Nout is Nin)

The ring-shaped member 165 is actuated via the hydraulic system 178 and positioned at the neutral position by operating the unillustrated shift lever. In this state, for the same reason given in the fifth embodiment, the cylinder block 42 and the slide-contact member 181 (output rotary cylinder 23A) come to a directly coupled state and rotate together.

In the case where the ring-shaped member 165 is positioned at the upright position, the stroke volume VP of the first hydraulic system 100 becomes 0 and the number of output rotations Nout (the number of rotations of the output gear 24) becomes equal to the number of input rotations Nin, as shown in FIG. 38.

(In the Case where the Number of Output Rotations Nout is between Nin and 2Nin)

By operating the unillustrated shift lever, the ring-shaped member 165 is rotated via the hydraulic system 178 to be positioned in an area between the neutral position and a negative rotational position at the first position.

In this case too, for the same reason given in the fifth embodiment, the slide-contact member 181 (output rotary cylinder 23A) is rotated by the total (sum) of the number of rotations Nin of the cylinder block 42 driven via the input shaft 21 and the number of rotations in the forward direction by the projecting pressurization of the plunger 58 on the slide-contact member 181. The forward-directional rotation to be imparted on the slide-contact member 181 is transmitted to the final reduction gear unit as the forward-directional rotation via the output rotary cylinder 23A, the output gear 151, etc. to carry out the speed increasing action.

At this time, as the ring-shaped member 165 is displaced to the negative rotational position from the neutral position, the stroke volume VP of the first hydraulic system 100 increases to VMmax from 0 and the number of output rotations Nout accordingly increases to 2Nin from Nin in FIG. 38.

It is to be noted that the stroke volume VM of the second hydraulic system 200 when the number of output rotations Nout changes to 2Nin from Nin remains at VMmax. In this embodiment, VPmax≈VMmax. FIG. 35 shows the flow of the working oil and how the rotation is made in this state.

In this state, a little working oil flows out of the second hydraulic chamber 62 (i.e., the hydraulic closing circuit C) to the small-diameter portion 113 of the shaft hole 99 via the oil removing portion 110 or the like, causing a slight loss, as per the fifth embodiment. However, the amount of the working oil flowing out is small and the pressure in the second hydraulic chamber 62 (hydraulic chamber B) is lower than that of the first hydraulic chamber 61 (hydraulic chamber A), so that the efficiency of actuating the plunger 58 which presses the output rotary cylinder 23A to increase the speed is not reduced, thus raising no problem.

(In the Case where the Number of Output Rotations Nout Exceeds 2Nin)

To acquire charge pressure larger than the urging force of the coil spring 124 with the ring-shaped member 165 placed at the first position, the working oil in the shaft hole 99 is pressurized by driving the unillustrated charge pump.

Then, the moving member 116 moves to the output end side of the input shaft 21 against the urging force of the coil spring 124 and closes the restriction-portion 112a side opening end portion of the fluid passage 112.

As the moving member 116 moves to the output end side of the input shaft 21, the actuation pin 128 is pressed by the tapered portion 118a and moves in the radial direction from the axis O of the input shaft 21. With the close-end side of the bottom of the tapered groove 129 of the holder 79 being the start position, the actuation pin 128 keeps pressing the inclined tapered groove 129 while gradually changing this pressing point toward the far end side.

Accordingly, the pressure of the actuation pin 128 moves the holder 79 toward the input end side of the input shaft 21 against the urging force of the coil spring 126. As a result, when the actuation pin 128 abuts on the far end side of the bottom of the tapered groove 129, the displacing-end of the second selector valve 76 moves to any position from the first displacement position R1 to the second displacement position R2.

Then, the zone which communicates with the port W and the second hydraulic chamber 62 is narrowed and the zone which is connected to the port W and the first hydraulic chamber 61 is widened. That is, over 2Nin, the area J becomes wider as shown in FIG. 39 and the area K becomes narrower.

As a result, for the same reason given in the fifth embodiment, the stroke volume of the second hydraulic system 200 becomes relatively small with respect to the stroke volume VPmax of the first hydraulic system 100, so that the reciprocation speed of the action of the projecting pressurization of the plunger 58 of the second hydraulic system 200 becomes faster to compensate for that.

Accordingly, the number of forward rotations is increased by the action of the projecting pressurization of the plunger 58 on the slide-contact member 181, and the sum of the increased forward number of rotations and the number of rotations of the cylinder block 42 in the forward direction causes the output rotary cylinder 23A and the output gear 24 to rotate at an increased speed than that of the case where the number of output rotations in the forward direction is 2Nin.

In the case where the ring-shaped member 165 is positioned at the first position, the maximum stroke volume VPmax of the first hydraulic system 100 is slightly larger than the maximum stroke volume VMmax of the second hydraulic system 200 and there is a difference Δ2 between them in FIG. 38.

The stroke volume of the second hydraulic system 200 is set to 0.6VMmax when the second selector valve 76 is at the second displacement position R2. As a result, the number of output rotations Nout is increased to approximately 2.7Nin from 2Nin. FIG. 35 shows the flow of the working oil and how the rotation is made in this state. In this embodiment, the oil removing portion 110 is closed in this state.

(In the Case where the Number of Output Rotations Nout is between 0 and Nin)

In this state, the moving member 116 is always stopped at the engage step portion 114a by the urging force of the coil spring 124, so that a little working oil is permitted to flow out from the second hydraulic chamber 62 (i.e., the hydraulic closing circuit C) to the small-diameter portion 113 of the shaft hole 99 via the oil removing portion 110 and the hole 120. That is, the displacing-end of the second selector valve 76 is positioned at the first displacement position R1.

By operating the unillustrated shift lever, the ring-shaped member 165 is actuated via the hydraulic system 178 and is positioned in an area of a positive rotational position from the neutral position.

In this case, for the same reason given in the fifth embodiment, the projecting pressurization of the plunger 58 on the slide-contact member 181 gives reverse rotation to that of the "in the case where the number of output rotations Nout is between Nin and 2Nin and exceeds 2Nin". Therefore, the total (sum) of the number of input rotations in the reverse direction and the number of rotations of the cylinder block 42 in the forward direction rotates the output rotary cylinder 23A and the output gear 24. As the sum of the number of rotations at this time becomes the number of rotations in the forward direction reduced by the number of rotations in the reverse direction, the number of output rotations Nout becomes smaller as compared with that "in the case where the number of output rotations Nout is Nin".

In this embodiment, when the ring-shaped member 165 is shifted to the second position from the neutral position at this time, the stroke volume VP of the first hydraulic system 100 increases to −VMmax from zero and the number of output rotations Nout decreases to zero from Nin accordingly in FIG. 38.

It is to be noted that the stroke volume VM of the second hydraulic system 200 per rotation when the number of output rotations Nout changes to zero from Nin is −VMmax.

In this state, as described above, a little working oil flows out of the second hydraulic chamber 62 (i.e., the hydraulic closing circuit C) to the small-diameter portion 113 of the shaft hole 99 via the oil removing portion 110 or the like, causing a slight loss. However, the amount of the working oil flowing out is small and the pressure in the second hydraulic chamber 62 (hydraulic chamber B) is lower than that of the first hydraulic chamber 61. (hydraulic chamber A), so that the efficiency of actuation of the plunger 58 which presses the output rotary cylinder 23A for speed reduction is not decreased, thus raising no problem. FIG. 36 is an exemplary diagram in that state.

(In the Case where the Number of Output Rotations Nout is Zero)

Next, the unillustrated shift lever is operated to rotate the ring-shaped member 165 via the hydraulic system 178 and position the ring-shaped member 165 at the second position.

In this case, in the present embodiment, the stroke volume VP of the first hydraulic system 100 becomes −VMmax. As a result, since of −VP≈−VMmax, the number of rotations in the reverse direction and the number of input rotations Nin at which the cylinder block 42 is driven via the input shaft 21 are balanced out, i.e., the sum of the number of rotations becomes zero (the number of output rotations Nout is zero) and the output gear 24 stops.

As the ring-shaped member 165 is further rotated via the hydraulic system 178 to be further turned on the positive side from the second position, the absolute value of the stroke volume VP of the first hydraulic system 100 enters the range where it is greater than the absolute value (=VMmax) of the stroke volume VM of the second hydraulic system 200.

Therefore, the absolute value of the stroke volume VM of the second hydraulic system 200 becomes relatively small with respect to the absolute value of the stroke volume VP of the first hydraulic system 100, so that to compensate for it, the reciprocation speed of the plunger 58 of the second hydraulic system 200 should properly become faster in the second hydraulic system 200.

However, the pressure of the second hydraulic chamber 62 is higher as compared with that of the first hydraulic chamber 61 at this time, so that the high-pressure working oil flows out of the second hydraulic chamber 62 (i.e., the hydraulic closing circuit C) to the small-diameter portion 113 of the shaft hole 99 via the oil removing portion 110 or the like.

Given that L is the maximum amount of loss flowing out from the hydraulic closing circuit C at the time the cylinder block 42 makes one turn, while the difference between the absolute value of the stroke volume VP of the first hydraulic system 100 and the absolute value of the stroke volume VM of the second hydraulic system 200 (|VP|−|VM|) satisfies |VP|−|VM|≦L (=Δ1), |VP| and |VM|+loss amount are balanced out, so that in the second hydraulic system 200, the number of rotations in the reverse direction and the number of input rotations Nin at which the cylinder block 42 is driven via the input shaft 21 are kept balanced out, i.e., the sum of the number of rotations becomes zero (the number of output rotations Nout is zero) and the output gear 24 maintains the stationary state (neutral) as per the fifth embodiment. In FIG. 38, Δ2 indicates the difference between the stroke volumes of both systems until |VP|−|VM| becomes L from zero.

(In the Case where the Number of Output Rotations Nout is Less than Zero)

Further, to acquire charge pressure larger than the urging force of the coil spring 124 in this state, the working oil in the shaft hole 99 is pressurized by driving the unillustrated charge pump. Then, the moving member 116 moves to the output-end-side of the input shaft 21 against the urging force of the coil spring 124 and closes the restriction-portion-112a side opening end portion of the fluid passage 112.

As the moving member 116 moves to the output-end-side of the input shaft 21, the actuation pin 128 is pressed by the tapered portion 118a and moves in the radial direction from the axis O of the input shaft 21. With the close-end side of the bottom of the tapered groove 129 of the holder 79 being the start position, the actuation pin 128 keeps pressing the inclined tapered groove 129 while gradually changing this pressing point toward the far-end side. Accordingly, the pressure of the actuation pin 128 moves the holder 79 toward the input-end side of the input shaft 21 against the urging force of the coil spring 126. As a result, when the actuation pin 128 abuts on the far-end side of the bottom of the tapered groove 129, the displacing-end of the second selector valve 76 moves to any position from the first displacement position R1 to the second displacement position R2.

Then, as shown in FIG. 39, the zone which communicates with the port W and the second hydraulic chamber 62 is narrowed and the zone which is connected to the port W and the first hydraulic chamber 61 is widened. That is, when the number of output rotations Nout becomes smaller than zero, the area J becomes wider and the area K becomes narrower.

As a result, as the stroke volume of the second hydraulic system 200 becomes relatively small with respect to the stroke volume VPmax of the first hydraulic system 100, the reciprocation speed of the action of the projecting pressurization of the plunger 58 of the second hydraulic system 200 becomes faster to compensate for that. Accordingly, the number of rotations in the reverse direction is increased by the action of the projecting pressurization of the plunger 58 on the rotary inclined surface 51, and the sum of the increased number of rotations in the reverse direction and the number of rotations of the cylinder block 42 in the forward direction causes the output rotary cylinder 23A and the output gear 24 to rotate at an increased speed than that of the case where the number of output rotations in the reverse direction is zero (see FIG. 38).

As the moving member 116 moves toward the output end of the input shaft 21 and closes the restriction-portion-112a side opening end portion of the fluid passage 112, the flow-out of the working oil from the second hydraulic chamber 62 (i.e., the hydraulic closing circuit C) to the small-diameter portion 113 of the shaft hole 99 via the oil removing portion 110 or the like is stopped. Accordingly, the action to press the plunger 58 of the second hydraulic system 200 is increased by the working oil which has been lost up to now.

Therefore, the absolute value of the stroke volume VM of the second hydraulic system 200 becomes relatively smaller with respect to the stroke volume VP of the first hydraulic system 100, so that in the second hydraulic system 200, the reciprocation speed of the plunger 58 of the second hydraulic system 200 becomes faster to compensate for that.

Accordingly, the projecting pressurization of the plunger 58 on the slide-contact member 181 increases the number of rotations in the reverse direction, and the total (sum) of the increased number of rotations and the number of rotations of the cylinder block 42 in the forward direction causes the output rotary cylinder 23A and the output gear 24 to rotate in the reverse direction relative to the input rotation. The rotational torque in the reverse direction is transmitted to the final reduction gear unit via the output rotary cylinder 23A, the output gear 24, etc.

At this time, the number of output rotations Nout moves to the point d from the point c in FIG. 38, as per the fifth embodiment. The point c is where the number of output rotations Nout is zero and the stroke volume is −VPmax.

In the case where the ring-shaped member 165 is positioned at the second position via the hydraulic system 178, in FIG. 38, the absolute value of the maximum stroke volume VPmax of the first hydraulic system 100 is VPmax≈VMmax, though there is a slight difference, and the absolute value of the stroke volume of the second hydraulic system 200 becomes 0.6VMmax. Therefore, the number of output rotations Nout is reduced from zero accordingly, but the number of output rotations Nout accordingly increases its reverse rotation from the current point d. That is, the number of output rotations Nout becomes faster in the reverse direction from the current point d.

As shown in FIG. 38, Nout varies on the solid line indicated by the label "with seal" affixed thereto. FIG. 37 is the exemplary diagram that shows the state at this time. The pressure of the second hydraulic chamber 62 (hydraulic chamber B) becomes higher than that of the first hydraulic chamber 61 (hydraulic chamber A) and the working oil flows in the hydraulic closing circuit C as indicated by the arrows illustrated in the diagram.

The seventh embodiment provides the following advantages.

(1) The continuously variable transmission 20 (hydraulic continuously variable transmission) of the seventh embodiment has, as the first hydraulic system 100, the plunger 43 and the protraction and retraction of the plunger 43 are performed by the ring-shaped member 165 (abutting portion). As the second hydraulic system 200, the output rotary cylinder 23A (output rotary section) is provided which has the plunger 58 and causes the relative or synchronous rotation with respect to the input rotation by the abutment of the plunger 58. The cylinder block 42, which retains the plungers 43, 58 of both the first hydraulic system 100 and second hydraulic system 200, is shared, and the cylinder block 42 is constructed so as to provide the input rotation and synchronous rotation.

Further, the the maximum stroke volume VPmax of the first hydraulic system 100 has a range exceeding the maximum stroke volume VMmax of the second hydraulic system 200, and the oil removing portion 110 is provided in the second hydraulic chamber 62, the pressure of which becomes lower when the output rotary cylinder 23A rotates forwardly with respect to the input rotation in the fluid passage (hydraulic closing circuit C) which connects the first hydraulic system 100 to the second hydraulic system 200.

As a result, in the range from the point where the stroke volume VP of the first hydraulic system 100 becomes equal to the stroke volume VMmax of the second hydraulic system 200 to the point at which it can cope with the oil escape amount of the oil removing portion 110 (the amount of loss L flowing out of the hydraulic closing circuit C), the number of output rotations Nout becomes zero so that neutral can be realized as per the fifth embodiment. Therefore, the range where neutral can be carried out can have a margin by the oil escape amount.

(2) The seventh embodiment provides the same advantage as the advantage (2) of the fifth embodiment.

(3) In the seventh embodiment, the ball bearing 84 (the member that reciprocates the distributing valve) is provided, which reciprocates the second selector valve 76, and also provided is the displacing mechanism D for displacing the ball bearing 84 along the axis O. The displacing mechanism D comprises the moving member 116, the actuation pin 128, the holder 79, the ball bearing 80 and the support member 81. As the ball bearing 84 is moved by pressure toward the cylinder block 42 from the normal position by the displacing mechanism D, the second selector valve 76 is displaced from the first displacement position R1 to the second displacement position R2. The second selector valve 76 is arranged closer to the axis O than the plunger 43, 58, so that the displacing mechanism D of the continuously variable transmission 20 can be laid out in the inner-surface side space of the output rotary cylinder 23A (output rotary section).

The embodiments of the present invention are not limited to the above-described embodiments but may be modified as follows.

In the sixth embodiment, the oil removing mechanism M may be omitted and the charge valve 90 shown in FIG. 26 may be used as the oil removing mechanism M instead. That is, as the shift lever 146 is shifted to the reverse movement side, the charge pressure of the charge pump is made lower than the urging force of the coil spring 197, 198 in response to the operation of the shift lever 146 in (in the case where the number of output rotations Nout is less than zero). Then, as shown in FIG. 26, the charge valve 90, 91 is pressed and stopped on the inner bottom portion of the valve retaining hole 85, 86. (FIG. 26 shows the movement of only the charge valve 91.) Then, the working oil in the first hydraulic chamber 61 and the second hydraulic chamber 62 is released to the outside via the openings 88, 89 of the valve retaining holes 85, 86.

As the hydraulic pressure is released, the hydraulic pressure of the working oil in the plunger hole 57 is released, so that the pressuring action of the plunger 43 on the swash plate surface 44 and the pressuring action of the plunger 58 on the rotary inclined surface 51 disappear. Particularly, the yoke 23 becomes free of the second hydraulic system 200. This can allow the first clutch 152 of the gear transmission 150 to be disconnected, so that the second clutch 153 is connected in response to the operation of the shift lever 146. At the time of returning to the forward movement side, the hydraulic pressure of the working oil in the plunger hole 57 is released for the same reason.

After the predetermined time elapses, the charge pressure is returned to the original one by the unillustrated charge pump, the charge valve 90, 91 closes the opening 88, 89. As a result, the hydraulic pressure of the working oil acts on the plunger hole 47, 57 so that the plunger 43 and the plunger 58 start pressing the swash plate surface 44 and the rotary inclined surface 51. Even this can provide the same action and effects as those of the sixth embodiment.

The fifth embodiment and the seventh embodiment may be modified as follows.

Although the oil removing portion 110 is closed when the number of output rotations Nout is less than zero in the fifth embodiment and the seventh embodiment, a structure may be provided that does not close the oil removing portion 110 when the number of output rotations Nout is less than zero by omitting the first land 117 of the moving member 116 or making the link portion 119 indicated by the two-dot chain line in FIG. 34 longer and making the axial length of the first land 117 shorter instead. This case may be feasible though the working oil is removed from the oil removing portion 110 when the number of output rotations Nout is less than zero, making the efficiency of the number of output rotations Nout poorer than that in the third embodiment.

That is, in this case, while the amount of rotation for the amount of the loss of the working oil from the oil removing portion 110 is decreased, it is moved from the point c to a point e (at which the number of output rotations Nout is larger than −0.7Nin and the stroke volume is the value of −VPmax) and the number of output rotations Nout is reduced from zero (is increased in the reverse direction from zero). In FIG. 38, Nout varies according to the solid line indicated by the label "without seal".

In the structure of the seventh embodiment, the holder 79 may be fixed to the input shaft 21 and the coil spring 126, the pin hole 127, the actuation pin 128 and the tapered groove 129 may be omitted. The maximum stroke volume VPmax of the first hydraulic system 100 may be made apparently greater than the maximum stroke volume VMmax of the second hydraulic system 200. For example, it may be set to 1.7 times as in the fourth embodiment. Providing a difference between the maximum stroke volumes of the first hydraulic system 100 and the second hydraulic system 200 yields such a structure in which the stroke volume VP of the first hydraulic system 100 has a range exceeding the stroke volume VM of the second hydraulic system 200. This can allow the radial type hydraulic continuously variable transmission to demonstrate the same effects as the fourth embodiment.

Eighth Embodiment

Next, the eighth embodiment will be described based on FIGS. 52 to 55.

Figure 33:
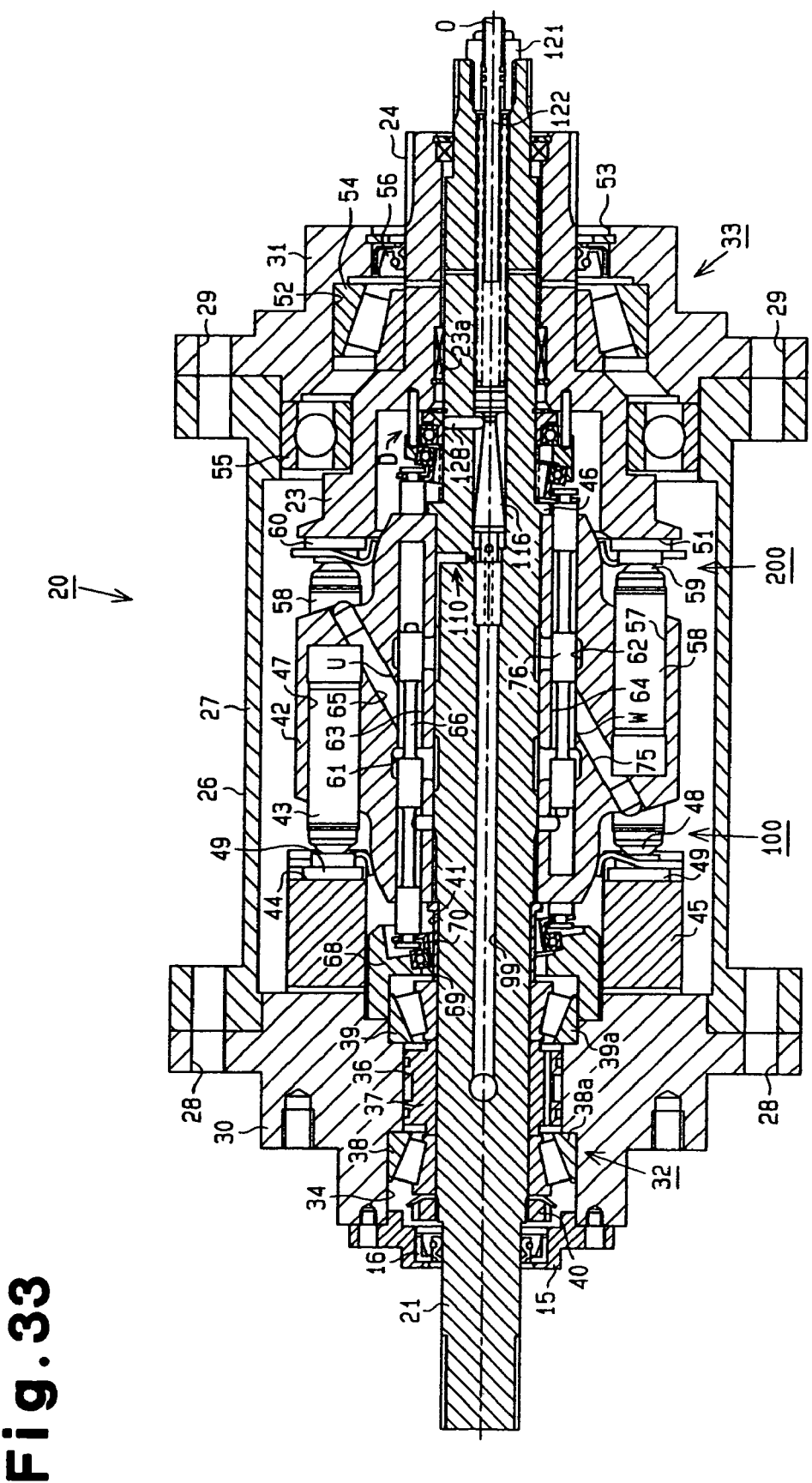
FIG. 33 is a horizontal cross-sectional view of a continuously variable transmission according to a fifth embodiment.
Figure 40:
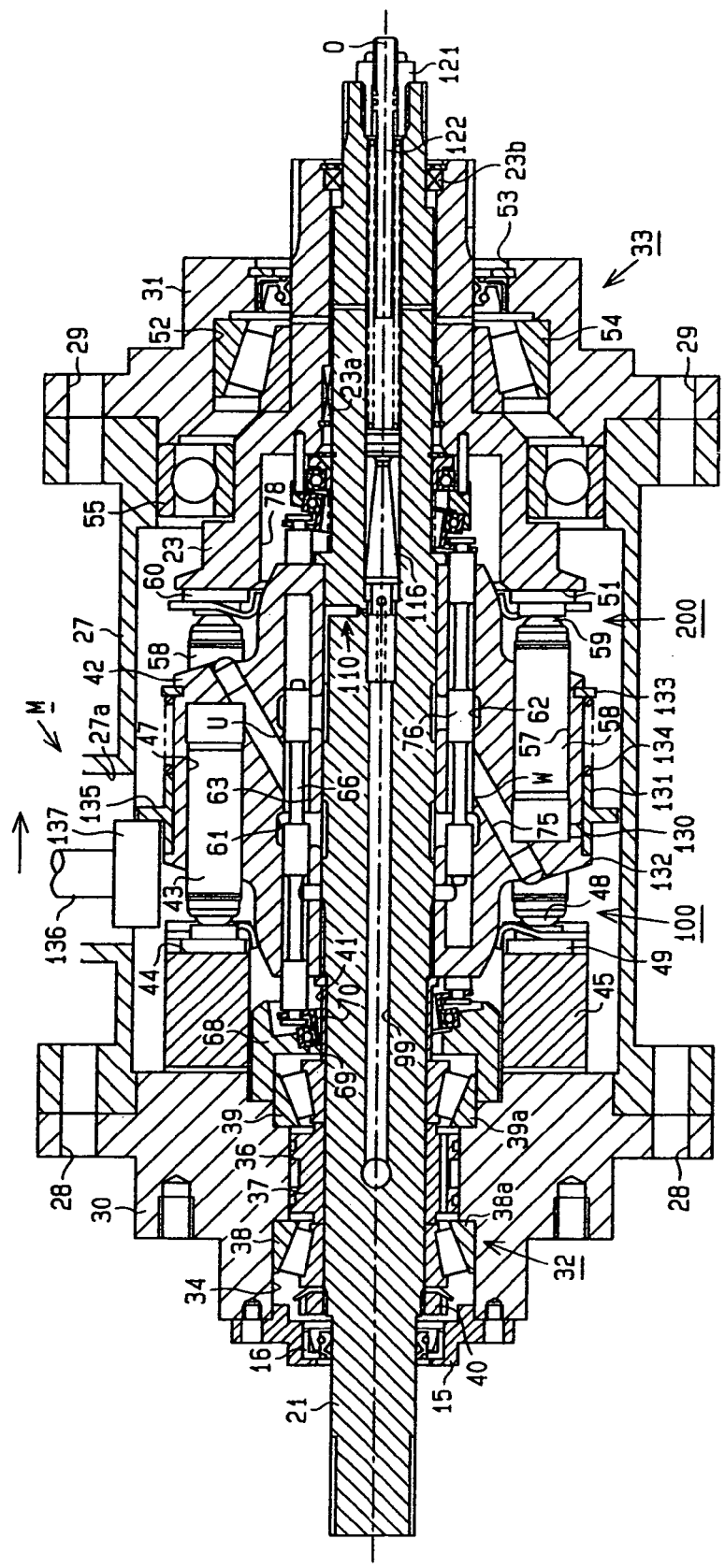
FIG. 40 is a horizontal cross-sectional view of a continuously variable transmission according to a sixth embodiment.
Figure 41:
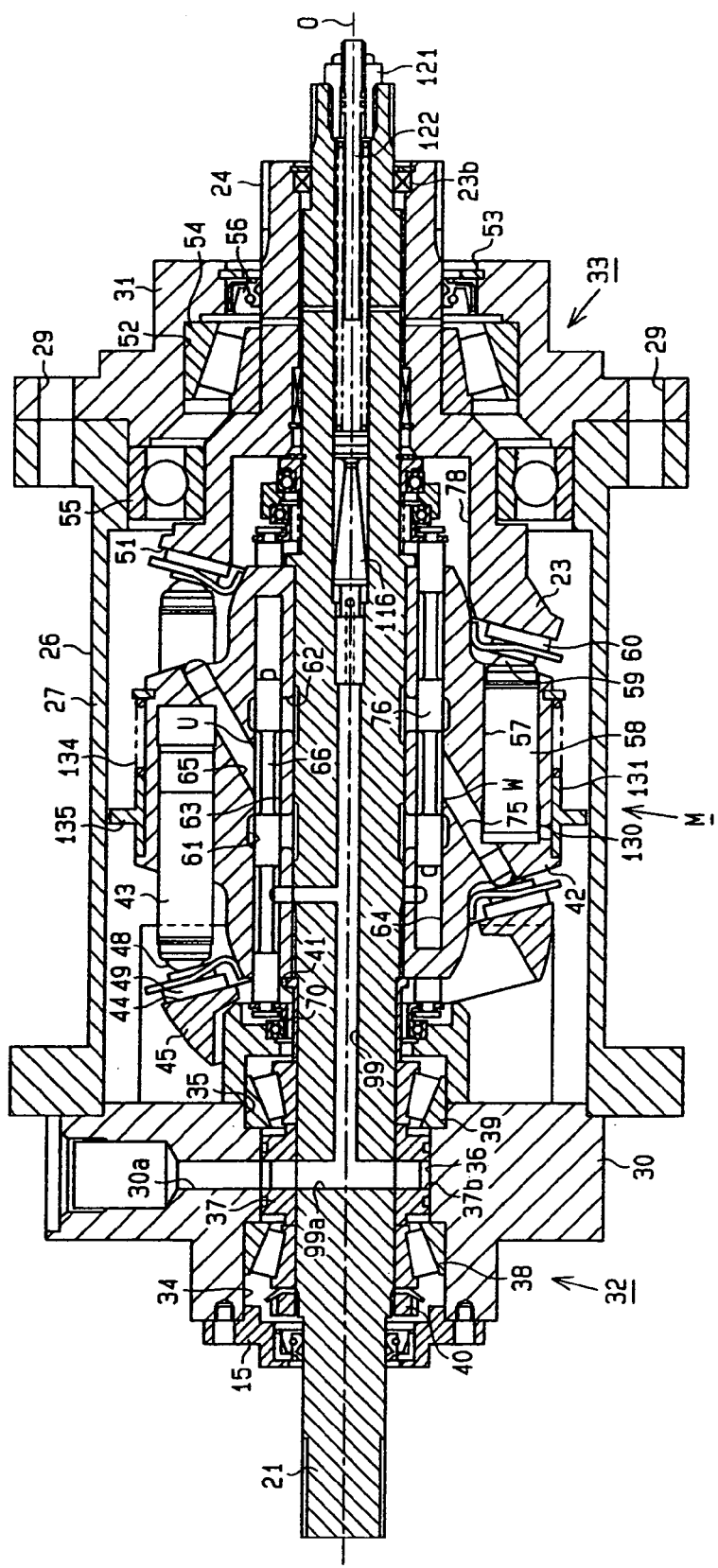
FIG. 41 is a cross-sectional view of essential portions.
Figure 42:
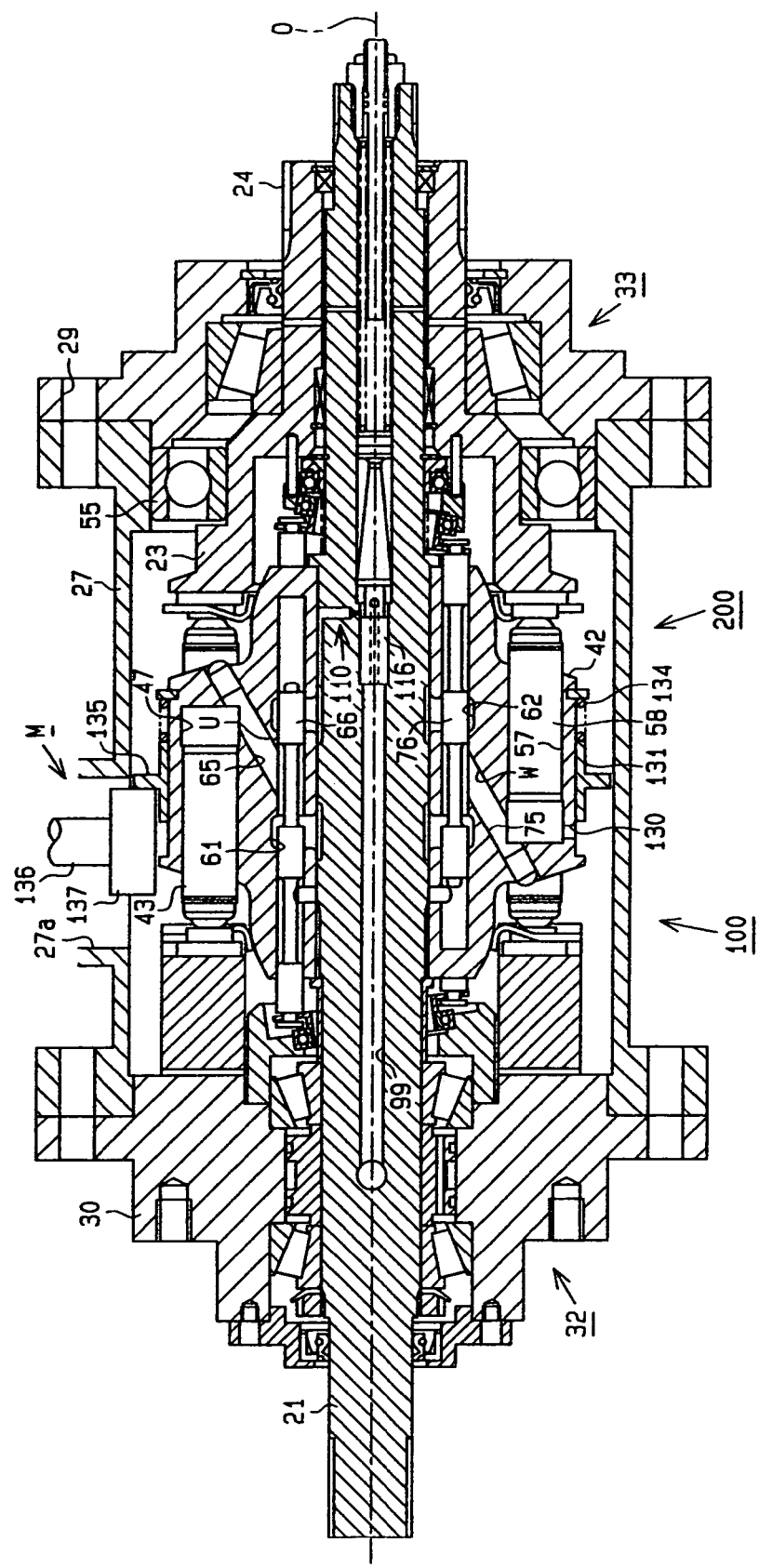
FIG. 42 is a cross-sectional view showing the operational state of the continuously variable transmission.
Figure 52:
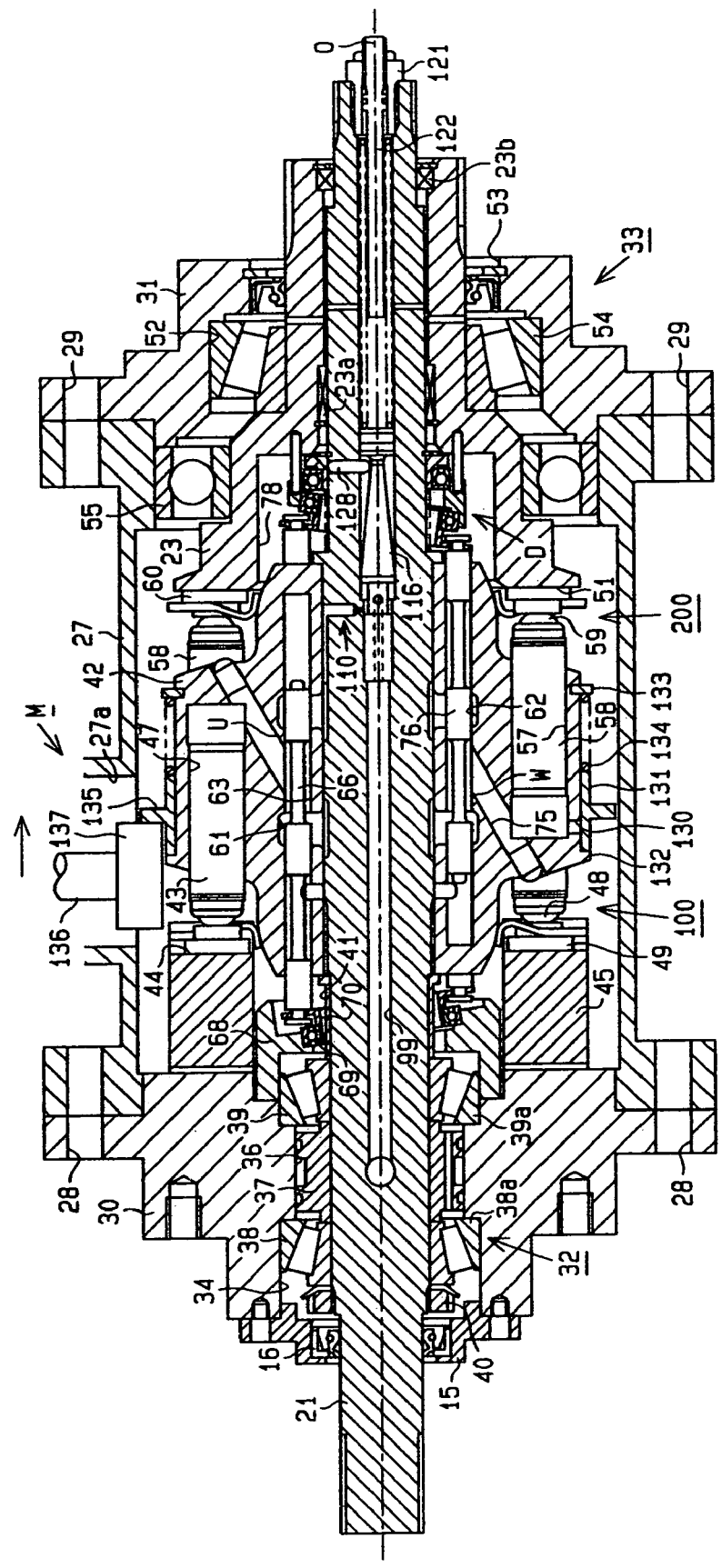
FIG. 52 is a cross-sectional view of essential portions of a continuously variable transmission according to an eighth embodiment.
Figure 53:
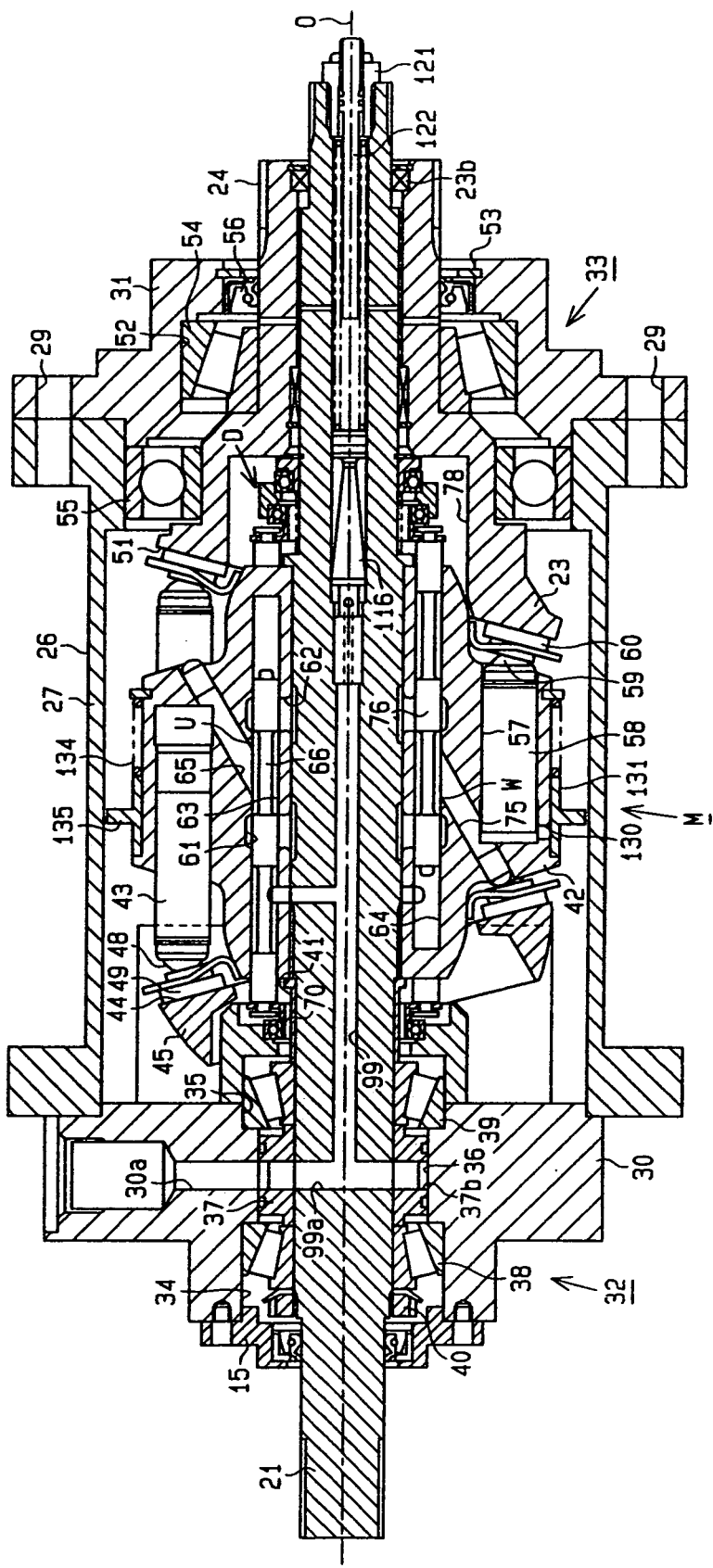
FIG. 53 is a cross-sectional view of the essential portions of the continuously variable transmission.
Figure 54:
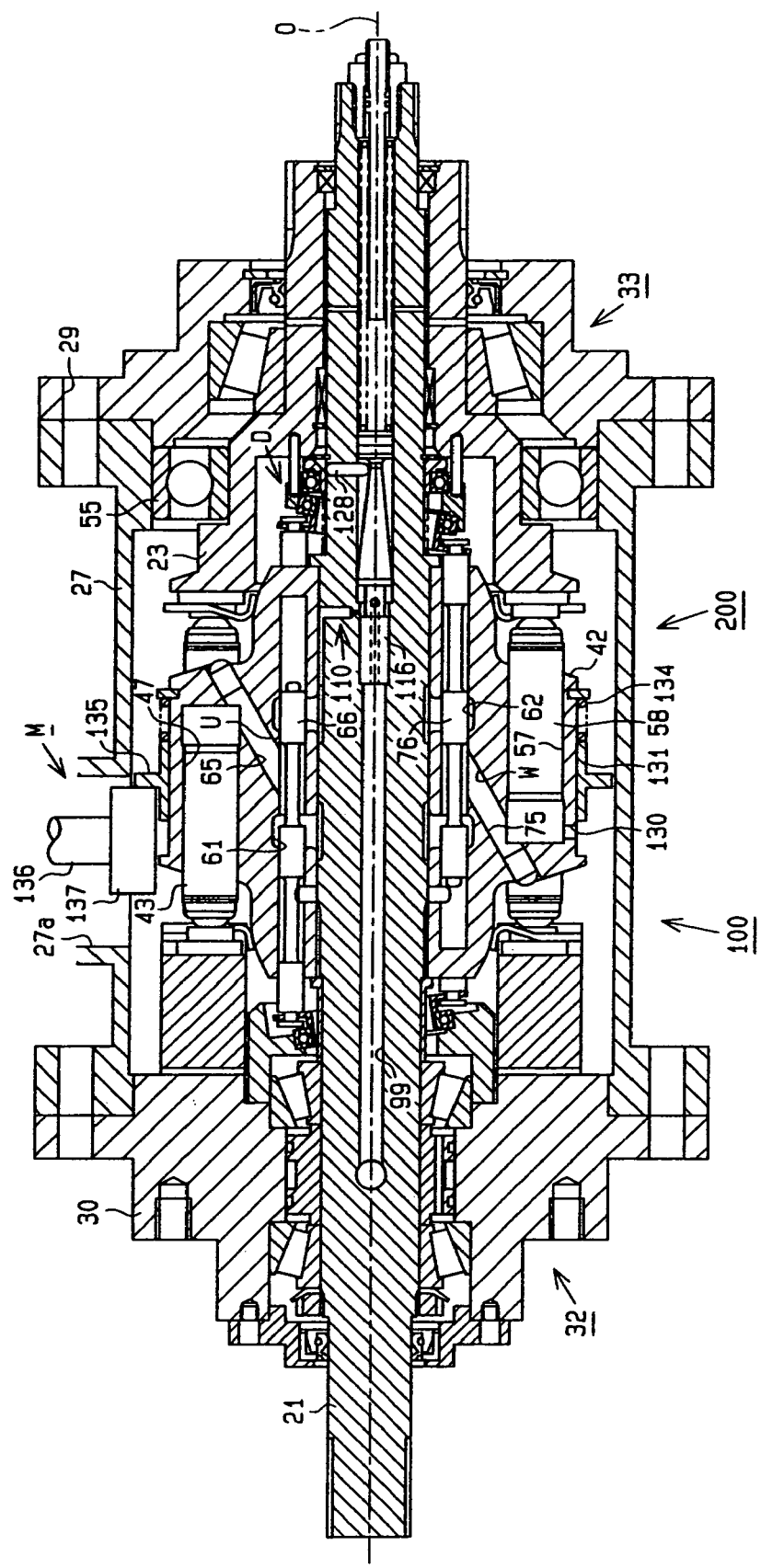
FIG. 54 is a conceptual diagram showing the operational state of the continuously variable transmission.

As shown in FIGS. 52 to 54, the transmission of this embodiment has the displacing mechanism D comprising the moving member 116, the actuation pin 128, the holder 79, the ball bearing 80, the support member 81 and the ball bearing 84 in the fifth embodiment as shown in FIG. 33, etc., in addition to the oil removing mechanism M comprising the cover member 131, and the actuation member 136 and the coil spring 134 in the sixth embodiment as shown in FIG. 40, etc. Therefore, to avoid redundant description, the detailed structural description of the structure of this embodiment will be omitted.

Figure 55:
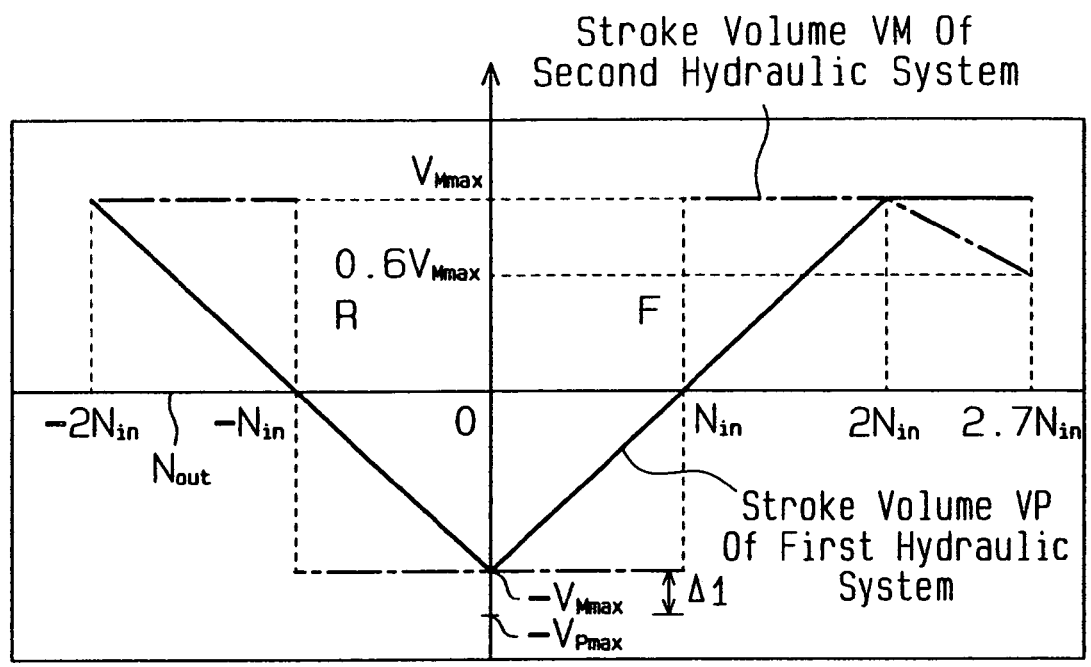
FIG. 55 is a characteristic diagram showing stroke volume and the number of output rotations.

As apparent from the comparison of FIG. 46 with FIG. 55, the action of the transmission of this embodiment differs from that of the sixth embodiment (see FIG. 46) in the case where the number of output rotations Nout exceeds 2Nin.

(In the Case where the Number of Output Rotations Nout Exceeds 2Nin)

With the swash plate surface 44 placed at the negative maximum tilt angle position, the working oil in the shaft hole 99 is pressurized by driving the unillustrated charge pump. Then, the moving member 116 moves to the output-end side of the input shaft 21 against the urging force of the coil spring 124 and closes the restriction-portion-112$a$ side opening end portion of the fluid passage 112.

As the moving member 116 moves to the output-end side of the input shaft 21, the actuation pin 128 is pressed by the tapered portion 118$a$ and moves in the radial direction from the axis O of the input shaft 21. With the close-end side of the bottom of the tapered groove 129 of the holder 79 being the start position, the actuation pin 128 keeps pressing the inclined tapered groove 129 while gradually changing this pressing point toward the far end side. Accordingly, the pressure of the actuation pin 128 moves the holder 79 toward the input-end side of the input shaft 21 against the urging force of the coil spring 126. As a result, when the actuation pin 128 abuts on the far-end side of the bottom of the tapered groove 129, the displacing-end of the second selector valve 76 moves to any position from the first displacement position R1 to the second displacement position R2.

Then, the zone which communicates with the port W and the second hydraulic chamber 62 is narrowed and the zone which is connected to the port W and the first hydraulic chamber 61 is widened. That is, over 2Nin, the area J becomes wider as shown in FIG. 39 and the area K becomes narrower.

As a result, as the stroke volume of the second hydraulic system 200 becomes relatively small with respect to the stroke volume VPmax of the first hydraulic system 100, the reciprocation speed of the action of the projecting pressurization of the plunger 58 of the second hydraulic system 200 becomes faster to compensate for that. Accordingly, the number of forward rotations is increased by the action of the projecting pressurization of the plunger 58 on the rotary inclined surface 51, and the sum of the increased forward number of rotations and the number of rotations of the cylinder block 42 in the forward direction makes the number of output rotations of the gear 142 in the forward direction greater than that of the case where it is 2Nin. The rotational torque in the forward direction is transmitted to the final reduction gear unit via the yoke 23 and the coupled first clutch 139, gear 141 and gear 142.

In the case where the swash plate surface 44 is positioned on the negative maximum tilt angle position side, the maximum stroke volume VPmax of the first hydraulic system 100 is approximately equal to the maximum stroke volume VMmax of the second hydraulic system 200 (VPmax≈VMmax) but strictly speaking, VPmax is slightly larger and there is a difference of Δ1 in FIG. 55. In FIG. 55, the portion Δ1 is illustrated enlarged for the sake of descriptive convenience, The stroke volume VM of the second hydraulic system 200 is set to 0.6VMmax when the second selector valve 76 is at the second displacement position R2. As a result, the number of output rotations Nout is increased to approximately 2.7Nin from 2Nin. Please see FIG. 35 of the fifth embodiment for the flow of the working oil and how the rotation is made in this state. The oil removing portion 110 is closed.

This embodiment provides the following advantages.

(1) In this embodiment, the oil removing mechanism M is provided which works to release the hydraulic pressure to be applied to the plunger 58 of the second hydraulic system 200 at the time the rotational direction of the yoke 23 (output rotary section) is switched.

As a result, the torque at the time the rotational direction of the yoke 23 is switched can be released, making it possible to easily perform the switching of the forward/reverse rotation. Particularly, as the plunger hole 57 is directly released to outside the cylinder block 42, this embodiment can easily realize the above effect.

(2) In this embodiment, the continuously variable transmission 20 is constructed to have the input shaft 21 which acquires the input rotation from the engine 22 (motor) and the input shaft 21 is so constructed as to extend opposite to the motor as the output shaft. And, the yoke 23 (output rotary section) is provided on the outer surface of the extended input shaft 21 and the gear transmission 138 (forward/reverse rotation switching device) which carries out power transmission of the yoke 23 and can be switched between forward and reverse rotations is provided to constitute the power transmission apparatus. As a result, it can demonstrate the action and effect of the above (1) as the power transmission apparatus.

Ninth Embodiment

Next, the ninth embodiment will be described based on FIG. 56.

While the structure of this embodiment is the same as the structure of the fifth embodiment shown in FIGS. 33 and 34, it differs from the fifth embodiment in the control system for the number of output rotations Nout, thus, this point will be discussed.

In the following description, the position of the retainer 83 at the time the actuation pin 128 abuts on the close-end side of the bottom of the tapered groove 129 is called a first action position. The position of the retainer 83 at the time the actuation pin 128 abuts on the far-end side of the bottom of the tapered groove 129 is called a second action position. The retainer 83 functions as restriction means for the selector valve 76.

The displacement position of the second selector valve 76 at the time the retainer 83 is positioned at the first action position is called the first displacement position R1, and the displacement position of the second selector valve 76 at the time the retainer 83 is positioned at the second action position is called the second displacement position R2 (see FIG. 7). Therefore, the second selector valve 76 is actuated along the line indicated by the first displacement position R1 or the second displacement position R2.

Figure 56:
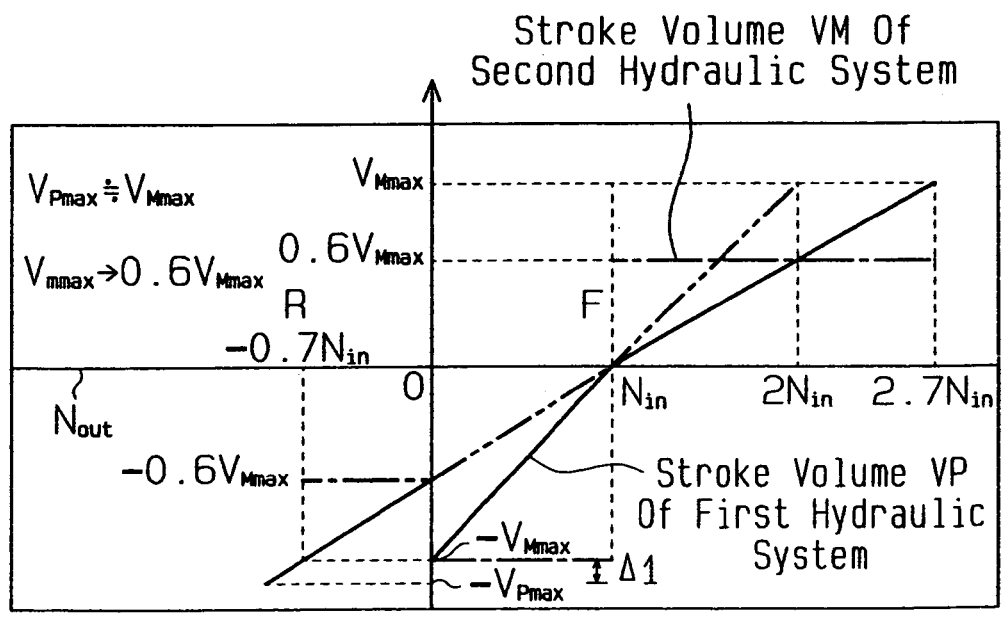
FIG. 56 is a characteristic diagram showing stroke volume and the number of output rotations in continuously variable transmissions according to ninth and eleventh embodiments.

The opening/closing timing of the port W is set to be changeable in such a way that the absolute value of the maximum stroke volume of the second hydraulic system 200 changes from VMmax to 0.6VMmax in FIG. 56 as the ratio of the areas J and K in one period is changed as shown in FIGS. 7 and 39 by the displacement of the displacing-end of the second selector valve 76.

The action of the continuously variable transmission 20 constructed in the above-described manner will be described.

Hereinafter, for the sake of descriptive convenience, description of this embodiment and other embodiments will be given on the premise that the number of input rotations Nin to be imparted to the input shaft 21 from the crankshaft of the engine 22 is constant.

(In the Case where the Number of Output Rotations Nout is Nin)

By operating the unillustrated shift lever, the swash plate surface 44 is positioned at the upright position via the cradle 45.

In this state, the driving force of the engine 22 causes the cylinder block 42 to rotate by Nin via the input shaft 21. Hereinafter, the rotation in the same direction as Nin is referred to as rotation in the forward direction. The swash plate surface 44 is in the neutral state or the upright position with respect to the axis O of the input shaft 21. The first plunger 43 of the first hydraulic system 100 is not reciprocated by the swash plate surface 44, so that in this state the working oil does not circulate in the hydraulic closing circuit C. In the second hydraulic system 200, therefore, the protruding end of each second plunger 58 engages in abutment with the rotary inclined surface 51 via the shoe 60 in such a state where it cannot take a stroke action, so that the cylinder block 42 and the rotary inclined surface 51 are directly coupled to each other and rotate together.

That is, in this state, the input shaft 21 is directly coupled to the output gear 24. The forward-directional rotation imparted to the rotary inclined surface 51 is transmitted to the final reduction gear unit via the yoke 23, the output gear 24 and the input gear 25.

In the case where the swash plate surface 44 is positioned at the upright position, the stroke volume VP of the first hydraulic system 100 becomes 0 and the number of output rotations Nout (the number of rotations of the output gear 24) becomes equal to the number of input rotations Nin, as shown in FIG. 56.

(In the Case where the Number of Output Rotations Nout Exceeds Nin)

To begin with, with the swash plate surface 44 placed at the upright position, i.e., in a state where the working oil in the hydraulic closing circuit C is not circulating, the working oil in the shaft hole 99 is pressurized by driving the unillustrated charge pump. Then, the moving member 116 moves to the output-end side of the input shaft 21 against the urging force of the coil spring 124 and closes the restriction-portion-112a side opening end portion of the fluid passage 112.

As the moving member 116 moves to the output-end side of the input shaft 21, the actuation pin 128 is pressed by the tapered portion 118a and moves in the radial direction from the axis O of the input shaft 21. The actuation pin 128 is displaced to the far-end from the close-end of the bottom of the tapered groove 129 of the holder 79. Accordingly, the pressure of the actuation pin 128 moves the holder 79 toward the input-end side of the input shaft 21 against the urging force of the coil spring 126. As a result, when the actuation pin 128 abuts on the far-end of the bottom of the tapered groove 129, the retainer 83 moves to the second action position from the first action position and the displacing-end of the second selector valve 76 is switched to the second displacement position R2 from the first displacement position R1.

Then, the zone which communicates with the port W and the second hydraulic chamber 62 is narrowed and the zone which is connected to the port W and the first hydraulic chamber 61 is widened. That is, over Nin, the area J becomes wider as shown in FIG. 39 and the area K becomes narrower. Consequently, as shown in FIG. 39, the amount of the working oil per one stroke which flows out to the second hydraulic chamber 62 from the plunger hole 57 through the port W becomes smaller. Therefore, the stroke volume which communicates with the second hydraulic chamber 62 of the second hydraulic system 200 becomes 0.6VMmax.

The unillustrated shift lever is operated to tilt the swash plate surface 44 to the negative side via the cradle 45 to be positioned in an area between a predetermined negative tilt angle position and the upright position. This predetermined negative tilt angle position is the position up to which the absolute value of the stroke volume VP of the first hydraulic system 100 becomes equal to the absolute value (=0.6VMmax) of the stroke volume VM of the second hydraulic system 200.

In this case, the driving force of the engine 22 causes the cylinder block 42 to rotate by Nin via the input shaft 21. Then, the first hydraulic system 100 draws the working oil into the first plunger hole 47 via the port U in the range of the rotational angle of 0 degrees to 180 degrees about the axis O of the cylinder block 42 and discharges the working oil from the first plunger hole 47 via the port U in the range of 180 degrees to 360 (0) degrees. The hydraulic chamber for discharge and the hydraulic chamber for suction are determined by the areas H and I corresponding to the rotational angle about the axis O of the cylinder block 42. The amounts of the working oil to be discharged and drawn by the first hydraulic system increase as the tilt angle of the swash plate surface 44 on the negative side increases. At this time, the second hydraulic system 200 draws the working oil into the plunger hole 57 via the port W in the range of the relative rotational angle of 0 degrees to 180 degrees about the axis O of the yoke 23 (output rotary section) with respect to the cylinder block 42 and discharges the working oil from the plunger hole 57 via the port W in the range of 180 degrees to 360 (0) degrees. The hydraulic chamber for discharge and the hydraulic chamber for suction are determined by the areas J and K corresponding to the relative rotational angle of the yoke 23 (output rotary section) about the axis O with respect to the cylinder block 42.

As a result, the rotary inclined surface 51 is rotated by the total (sum) of the number of input rotations Nin of the cylinder block 42 driven via the input shaft 21 and the number of rotations in the forward direction by the projecting pressurization of the plunger 58 on the rotary inclined surface 51. The forward-directional rotation to be imparted on the rotary inclined surface 51 is transmitted to the final reduction gear unit as the forward-directional rotation via the yoke 23, the output gear 24 and the input gear 25 to carry out the speed increasing action.

As the swash plate surface 44 is shifted toward the predetermined negative tilt angle position from the upright position at this time, the stroke volume VP of the first hydraulic system 100 increases to VMmax from 0 and the number of output rotations Nout increases to 2.7Nin from Nin accordingly in FIG. 56.

It is to be noted that the stroke volume VM of the second hydraulic system 200 when the number of output rotations Nout changes to 2.7Nin from Nin remains at 0.6VMmax. FIG. 35 shows the flow of the working oil and how the rotation is performed in this state and the oil removing portion 110 is closed.

When Nout changes from "Nout>Nin" to "Nout<Nin", on the other hand, the displacing-end of the second selector valve 76 is switched to the first displacement position R1 from the second displacement position R2 and the stroke volume VM of the second hydraulic system 200 becomes −VMmax from 0.6VMmax.

(In the Case where the Number of Output Rotations Nout is between 0 and Nin)

In this state, the moving member 116 is always stopped at the engage step portion 114a by the urging force of the coil spring 124, so that a little working oil is permitted to flow out from the second hydraulic chamber 62 (i.e., the hydraulic closing circuit C) to the small-diameter portion 113 of the shaft hole 99 via the oil removing portion 110 and the hole 120. That is, the displacing-end of the second selector valve 76 is positioned at the first displacement position R1.

By operating the unillustrated shift lever, the swash plate surface 44 is tilted to the positive side via the cradle 45 to be positioned in an area of a predetermined positive tilt angle position from the upright position. The predetermined positive tilt angle position in the positive tilt angle position is the position up to which the absolute value of the stroke volume VP of the first hydraulic system 100 becomes equal to the absolute value of the stroke volume VM of the second hydraulic system 200.

In this case, since the swash plate surface 44 is tilted in the forward direction, the driving force of the engine 22 causes the cylinder block 42 to rotate via the input shaft 21. Then, the first hydraulic system 100 discharges the working oil from the plunger hole 47 via the port U in the range of the rotational angle of 0 degrees to 180 degrees about the axis O of the cylinder block 42 and draws the working oil into the first plunger hole 47 via the port U in the range of 180 degrees to 360 (0) degrees. The hydraulic chamber from which the working oil is discharged and the hydraulic chamber into which the working oil is drawn are determined by the areas H and I corresponding to the rotational angle about the axis O of the cylinder block 42. The amounts of the working oil to be discharged and drawn by the first hydraulic system 100 increase as the tilt angle of the swash plate surface 44 on the positive side increases. At this time, the second hydraulic system 200 discharges the working oil from the plunger hole 57 via the port W in the range of the relative rotational angle of 0 degrees to 180 degrees about the axis O of the yoke 23 (output rotary section) with respect to the cylinder block 42 and draws the working oil into the plunger hole 57 via the port W in the range of 180 degrees to 360 (0) degrees. The hydraulic chamber from which the working oil is discharged and the hydraulic chamber into which the working oil is drawn are determined by the areas J and K corresponding to the relative rotational angle of the yoke 23 (output rotary section) about the axis O with respect to the cylinder block 42.

As a result, rotation reverse to that of the "in the case where the number of output rotations Nout is between Nin and 2Nin and exceeds 2Nin" is applied to the yoke 23 by the projecting pressurization of the plunger 58 on the rotary inclined surface 51. Therefore, the total (sum) of the number of input rotations in the reverse direction and the number of rotations of the cylinder block 42 in the forward direction rotates the yoke 23 and the output gear 24. As the sum of the number of rotations at this time becomes the number of rotations in the forward direction reduced by the number of rotations in the reverse direction, the number of output rotations Nout becomes smaller as compared with that "in the case where the number of output rotations Nout is Nin".

In this embodiment, as the swash plate surface 44 is shifted toward the positive maximum tilt angle position from the upright position at this time, the stroke volume VP of the first hydraulic system 100 increases to −VMmax from 0 (the "−" means a case of discharge into the second hydraulic chamber 62 from the port U) and the number of output rotations Nout accordingly decreases to 0 from Nin in FIG. 56.

It is to be noted that the stroke volume VM of the second hydraulic system 200 per rotation when the number of output rotations Nout changes to 0 from Nin is −VMmax. (The "−" means a case of suction into the port W from the second hydraulic chamber 62.)

FIG. 36 is an exemplary diagram in that state. The pressure of the first hydraulic chamber 61 (hydraulic chamber A) becomes higher than that of the second hydraulic chamber 62 (hydraulic chamber B) and the working oil flows in the hydraulic closing circuit C as indicated by the arrows illustrated in the diagram.

(In the Case where the Number of Output Rotations Nout is 0)

Next, by operating the unillustrated shift lever, the swash plate surface 44 is positioned at that position in the positive tilt angle position at which the absolute value of the stroke volume VP of the first hydraulic system 100 becomes equal to the absolute value of the stroke volume VM of the second hydraulic system 200.

In this case, in the present embodiment, the stroke volume VP of the first hydraulic system 100 becomes −VMmax. As a result, the number of rotations in the reverse direction and the number of input rotations Nin at which the cylinder block 42 is driven via the input shaft 21 are balanced out, i.e., the sum of the number of rotations becomes 0 (the number of output rotations Nout is 0) and the output gear 24 stops.

As the swash plate surface 44 is further tilted from the predetermined positive tilt angle position via the cradle 45 in this state, the absolute value of the stroke volume VP of the first hydraulic system 100 enters the range where it is greater than the absolute value (=VMmax) of the stroke volume VM of the second hydraulic system 200.

Therefore, the absolute value of the stroke volume VM of the second hydraulic system 200 becomes relatively small with respect to the absolute value of the stroke volume VP of the first hydraulic system 100, so that to compensate for it, the reciprocation speed of the plunger 58 of the second hydraulic system 200 should properly become faster in the second hydraulic system 200.

However, the second hydraulic chamber 62 is higher as compared with the that of the first hydraulic chamber 61 at this time, so that the high-pressure working oil flows out of the second hydraulic chamber 62 (i.e., the hydraulic closing circuit C) to the small-diameter portion 113 of the shaft hole 99 via the oil removing portion 110 or the like. Given that L is the maximum amount of loss flowing out from the hydraulic closing circuit C at the time the cylinder block 42 makes one turn, while the difference between the absolute value of the stroke volume VP of the first hydraulic system 100 and the absolute value of the stroke volume VM of the second hydraulic system 200 (|VP|–|VM|) satisfies |VP|–|VM|≦L (=Δ1) , |VP| and |VM|+loss amount are balanced out as a consequence, so that in the second hydraulic system 200, the number of rotations in the reverse direction and the number of input rotations Nin at which the cylinder block 42 is driven via the input shaft 21 are kept balanced out, i.e., the sum of the number of rotations becomes 0 (the number of output rotations Nout is 0) and the output gear 24 maintains the still state (neutral).

In FIG. 56, Δ1 indicates the difference between the stroke volumes of both systems until |VP|–|VM| becomes L from 0. In FIG. 56, the portion Δ1 is illustrated enlarged for the sake of descriptive convenience, (In the Case where the Number of Output Rotations Nout is Less than 0)

To begin with, a process of displacing the swash plate surface 44 from the positive maximum tilt angle position to a position where the stroke volume VP of the first hydraulic system 100 becomes –0.6VMmax (hereinafter referred to as a specific position) is executed. At the time of executing this process, the number of output rotations Nout is kept at the state of 0 by changing the stroke volume VM of the second hydraulic system 200 to –0.6 VMmax from –VMmax at the same time as the swash plate surface 44 is displaced to the specific position from the positive maximum tilt angle position.

At the time of changing the stroke volume VM of the second hydraulic system 200 to –0.6VMmax from –VMmax, the second selector valve 76 is moved to the second displacement position R2 from the first displacement position R1 by compressing the working oil in the shaft hole 99 by driving the unillustrated charge pump as discussed in the "in the case where the number of output rotations Nout exceeds Nin". At this time, the retainer 83 is moved to the second action position from the first action position. In this state, the oil removing portion 110 is closed.

Therefore, the zone where the port W communicates with the second hydraulic chamber 62 becomes narrower and the zone which is connected to the port W and the first hydraulic chamber 61 becomes wider as shown in FIG. 39. As a result, the stroke volume of the second hydraulic system 200 becomes –0.6VMmax.

And, at the time the number of output rotations Nout is set less than 0, the following takes place.

The unillustrated shift lever is operated to tilt the swash plate surface 44 to the positive side via the cradle 45 to be positioned in an area of a predetermined positive tilt angle position from the specific position.

In this case, since the swash plate surface 44 is tilted in the forward direction, as the driving force of the engine 22 causes the cylinder block 42 to rotate via the input shaft 21. Then, the first hydraulic system 100 discharges the working oil from the first plunger hole 47 via the port U in the range of the rotational angle of 0 degree to 180 degrees about the axis O of the cylinder block 42 and draws the working oil into the first plunger hole 47 via the port U in the range of 180 degrees to 360 (0) degrees. The hydraulic chamber for discharge and the hydraulic chamber for suction are determined by the areas H and I corresponding to the rotational angle about the axis O of the cylinder block 42. The amounts of the working oil to be discharged and drawn by the first hydraulic system 100 increase as the tilt angle of the swash plate surface 44 on the positive side increases. At this time, the second hydraulic system 200 discharges the working oil from the plunger hole 57 via the port W in the range of the relative rotational angle of 0 degrees to 180 degrees about the axis O of the yoke 23 (output rotary section) with respect to the cylinder block 42 and draws the working oil into the plunger hole 57 via the port W in the range of 180 degrees to 360 (0) degrees. The hydraulic chamber for discharge and the hydraulic chamber for suction are determined by the areas J and K corresponding to the relative rotational angle of the yoke 23 (output rotary section) about the axis O with respect to the cylinder block 42.

The stroke volume VP of the first hydraulic system 100 is in the range where the stroke volume VM (=0.6VMmax) of the second hydraulic system 200 (0.6VMmax<VP≦VMmax). Therefore, the stroke volume VM of the second hydraulic system 200 becomes relatively small with respect to the stroke volume VP of the first hydraulic system 100, so that the reciprocation speed of the plunger 58 of the second hydraulic system 200 becomes faster to compensate for it.

As a result, the projecting pressurization of the plunger 58 on the rotary inclined surface 51 provides reverse rotation to that of the "in the case where the number of output rotations Nout is between Nin and 2Nin and exceeds 2Nin". Therefore, the number of rotations in the reverse direction causes the yoke 23 and the output gear 24 to rotate. The number of rotations at this time becomes smaller than that when the number of output rotations Nout is 0.

In this embodiment, as the swash plate surface 44 is shifted toward the positive tilt angle position from the specific position at this time, the stroke volume VP of the first hydraulic system 100 increases to –VMmax from 0 (the "–" means a case of discharge into the second hydraulic chamber 62 from the port U) and the number of output rotations Nout decreases to approximately –0.7Nin from 0 accordingly in FIG. 56.

The stroke volume VM of the second hydraulic system 200 per rotation when the number of output rotations Nout changes to approximately –0.7Nin from 0 is –0.6VMmax. (The "–" means a case of suction into the port W from the second hydraulic chamber 62.)

At this time, when the swash plate surface 44 is shifted toward the positive tilt angle position from the specific position at this time, the stroke volume VP of the first hydraulic system 100 increases to –VPmax from –0.6VPmax and the number of output rotations Nout increases to approximately –0.7Nin from 0 accordingly in FIG. 12.

FIG. 37 is an exemplary diagram in that state. The pressure of the first hydraulic chamber 61 (hydraulic chamber A) becomes lower than that of the second hydraulic chamber 62 (hydraulic chamber B) and the working oil flows in the hydraulic closing circuit C as indicated by the arrows illustrated in the diagram.

This embodiment provides the following advantages.

(1) The fixed positions of the retainer 83 in the axial direction by the displacing mechanism D are the first action position where the stroke volume VM of the second hydraulic system 200 becomes VMmax (–VMmax) and the second action position where this stroke volume VM becomes 0.6VMmax (–0.6VMmax). The swash plate surface 44 (cradle 45) of the first hydraulic system 100 is constructed so as to be displaceable at the time the retainer 83 is held at the first action position and the second action position.

Meanwhile, the output rotation is changed between 0 and the intermediate speed by changing the discharge amount of the working oil of the variable displacement type hydraulic system. Further, in the conventional hydraulic continuously variable transmission, the output rotation is changed between the intermediate speed and the fast speed by changing the timing of the working oil flowing into the plunger hole of the differential hydraulic system while keeping the discharge amount of the working oil of the variable displacement type hydraulic system. In the conventional hydraulic continuously variable transmission, however, the mechanism for changing the timing of the working oil flowing into the plunger hole of the differential hydraulic system rotates together with the output rotary section, so that it is difficult to finely change the timing for the flow of the working oil into the plunger hole.

As a result, it was difficult to control the number of output rotations between the intermediate speed and the fast speed.

According to the continuously variable transmission 20 of this embodiment, by way of comparison, the continuously variable transmission 20 can easily perform the speed control on the number of output rotations Nout over the entire rotation speed range from reverse rotation to fast forward rotation (the range from approximately −0.7Nin to 2.7Nin in this embodiment) merely by displacing the swash plate surface 44 (cradle 45) of the first hydraulic system 100 when the retainer 83 is at the first action position or at the second action position.

It is therefore possible to accurately control the number of output rotations Nout as compared with the case where the unillustrated charge pump is driven to supply the working oil under pressure into the shaft hole 99 and gradually move the retainer 83 to the second action position from the first action position.

(2) The continuously variable transmission 20 according to this embodiment is constructed in such a way that at the time the flowing of the working oil in the hydraulic closing circuit C is stopped, the rotational speed of the yoke 23 is maintained even if the retainer 83 is displaced to either one of the first action position and the second action position. As shown in FIG. 56, therefore, when the number of output rotations Nout is Nin, the movement of the retainer 83 to the second action position from the first action position which is preparation for increasing the number of output rotations Nout to 2.7Nin from Nin can be carried out while keeping the number of output rotations Nout at Nin.

(3) The continuously variable transmission 20 according to this embodiment is constructed in such a way that the fixed positions of the retainer 83 are two positions, the first action position and the second action position, and when the retainer 83 is placed at the second action position, the rotational speed of the yoke 23 becomes faster than that when the retainer 83 is placed at the first action position. When the retainer 83 is at the first action position, the stroke volume VM becomes VMmax (−VMmax) and when the retainer 83 is at the second action position, the stroke volume VM becomes 0.6VMmax (−0.6VMmax). The swash plate surface 44 of the cradle 45 is so constructed as to be displaceable in response to the displacement of the retainer 83 to the second action position from the first action position.

When the number of output rotations Nout is 0, therefore, the number of output rotations Nout can be kept at 0 by changing the stroke volume VM of the second hydraulic system 200 to −0.6VMmax from −VMmax in accordance with the displacement of the swash plate surface 44 to the specific position from the positive maximum tilt angle position.

Tenth Embodiment

Next, the tenth embodiment will be described based on FIGS. 57 and 58.

Figure 58:
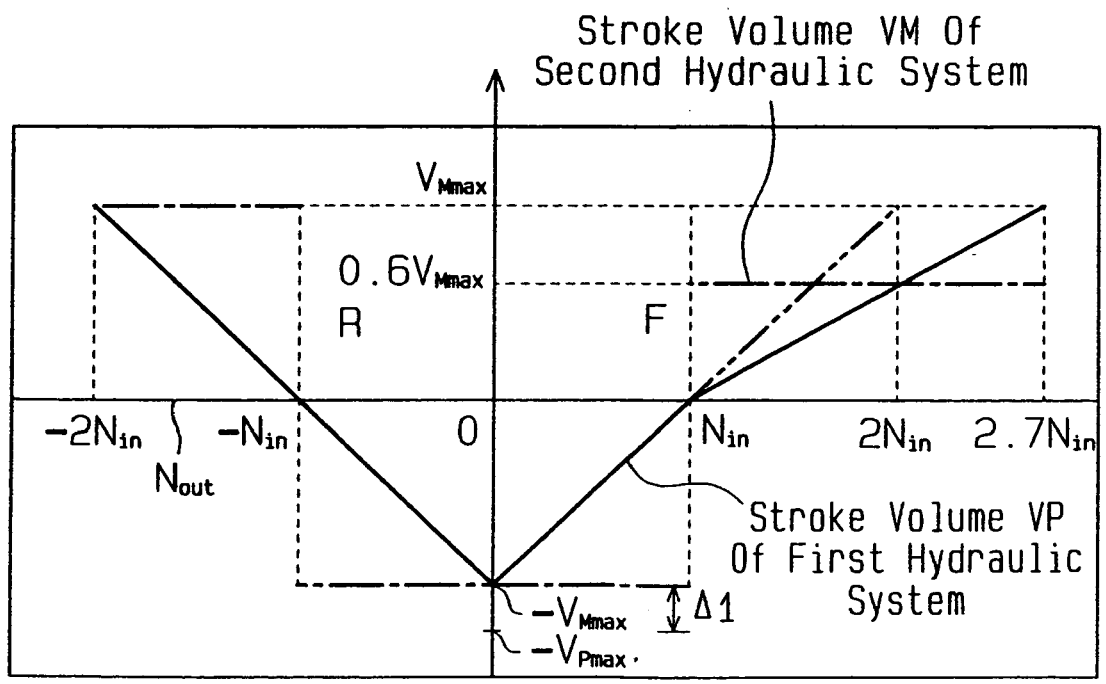
FIG. 58 is a characteristic diagram showing the relationship between stroke volume and the number of output rotations in the continuously variable transmission according to the tenth embodiment.

As apparent from the comparison of FIG. 55 with FIG. 58, the action of the transmission of this embodiment differs from that of the eighth embodiment (see FIG. 55) in the case where the number of output rotations Nout exceeds 2Nin. The differences will be discussed below.

(In the Case where the Number of Output Rotations Nout is Nin)

It is assumed that the cover member 131 that constitutes the oil removing mechanism M is stopped at the projection 132 and the small hole 130 is closed by the cover member 131.

Figure 57:
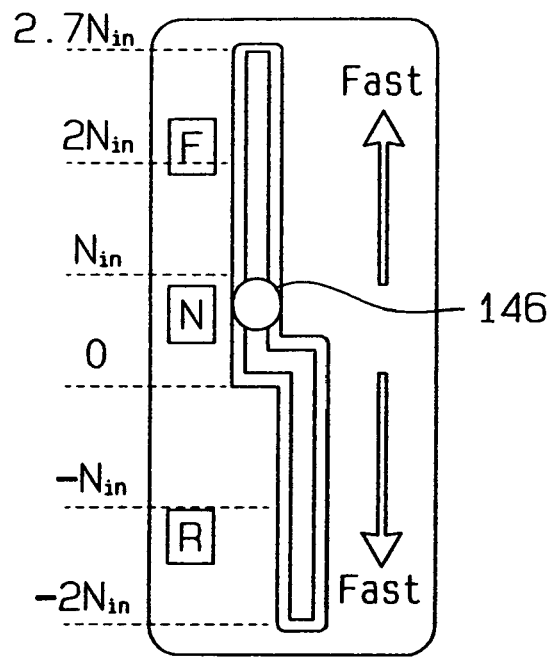
FIG. 57 is a diagram illustrating a shifter of a continuously variable transmission according to a tenth embodiment.

The swash plate surface 44 is positioned at the upright position via the cradle 45 by operating the shift lever 146 shown in FIG. 57. In this state, as described above, the cylinder block 42 and the rotary inclined surface 51 come to a directly coupled state and rotate together. That is, in this state, the input shaft 21 and the output gear 142 are directly coupled. The rotation imparted to the rotary inclined surface 51 is transmitted to the final reduction gear unit via the yoke 23 and the coupled first clutch 139, gear 141 and gear 142. In this embodiment, it is called rotation in the forward direction when the gear 142 rotates reversely to Nin.

Figure 21:
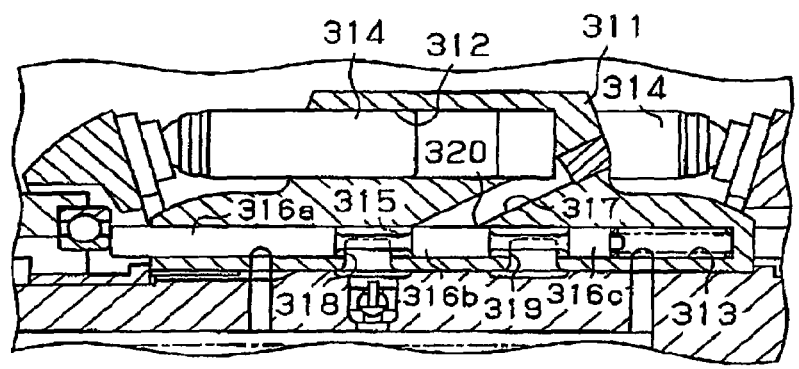
FIG. 21 is a cross-sectional view of essential portions showing a conventional hydraulic system.
Figure 22:
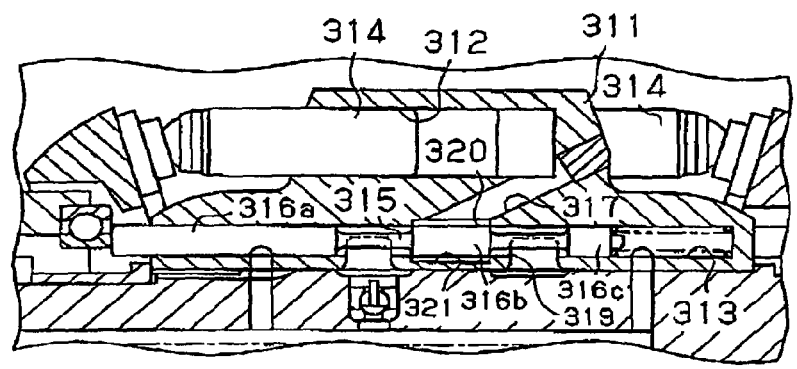
FIG. 22 is a cross-sectional view of essential portions showing another conventional hydraulic system.

In the case where the swash plate surface 44 is positioned at the upright position, the stroke volume VP of the first hydraulic system 100 becomes 0 and the number of output rotations Nout (the number of rotations of the output gear 24) becomes equal to the number of input rotations Nin, as shown in FIG. 21.

(In the Case where the Number of Output Rotations Nout Exceeds Nin)

In this case, the rotary inclined surface 51 is rotated by the total (sum) of the number of input rotations Nin of the cylinder block 42 driven via the input shaft 21 and the number of rotations in the forward direction by the projecting pressurization of the plunger 58 on the rotary inclined surface 51. The forward-directional rotation to be imparted on the rotary inclined surface 51 is transmitted to the final reduction gear unit as the forward-directional rotation via the yoke 23 and the coupled first clutch 139, gear 141 and gear 142 to carry out the speed increasing action.

As the swash plate surface 44 is shifted toward the predetermined negative tilt angle position from the upright position at this time, the stroke volume VP of the first hydraulic system 100 increases to VMmax from 0 and the number of output rotations Nout increases to 2.7Nin from Nin accordingly in FIG. 58.

It is to be noted that the stroke volume VM of the second hydraulic system 200 when the number of output rotations Nout changes to 2.7Nin from Nin remains at 0.6VMmax. Please see FIG. 35 for the flow of the working oil and how the rotation is made in this state. In this state, the oil removing portion 110 is closed.

Therefore, as this embodiment is provided with the oil removing mechanism M which works to release the hydraulic pressure to be applied to the plunger 58 of the second hydraulic system 200 at the time of switching the rotational direction of the yoke 23, it is possible to easily switch the forward and reverse rotations in addition to the effects of the ninth embodiment. Particularly, as the plunger hole 57 is directly released to outside the cylinder block 42 in this embodiment, the aforementioned effect can easily be realized.

Eleventh Embodiment

Next, the eleventh embodiment is intended to control the number of output rotations Nout in the mode shown in FIG.

56 in the radial type hydraulic continuously variable transmission of the seventh embodiment shown in FIGS. 47 to 51. Referring to FIGS. 47–51, therefore, its control system will be described below.

(In the Case where the Number of Output Rotations Nout is Nin)

The ring-shaped member 165 is actuated via the hydraulic system 178 and positioned at the neutral position shown in FIG. 50 by operating the unillustrated shift lever. In this state, for the same reason given in the fifth embodiment, the cylinder block 42 and the slide-contact member 181 (output rotary cylinder 23A) come to a directly coupled state and rotate together.

In the case where the ring-shaped member 165 is positioned at the upright position, the stroke volume VP of the first hydraulic system 100 becomes 0 and the number of output rotations Nout (the number of rotations of the output gear 24) becomes equal to the number of input rotations Nin, as shown in FIG. 56.

(In the Case where the Number of Output Rotations Nout Exceeds Nin)

To begin with, with the ring-shaped member 165 placed at the upright position, i.e., in a state where the working oil in the hydraulic closing circuit C is not circulating, the working oil in the shaft hole 99 is pressurized by driving the unillustrated charge pump. Then, the moving member 116 moves to the output end side of the input shaft 21 against the urging force of the coil spring 124 and closes the restriction-portion 112a side opening end portion of the fluid passage 112.

As the moving member 116 moves to the output-end side of the input shaft 21, the actuation pin 128 is pressed by the tapered portion 118a and moves in the radial direction from the axis O of the input shaft 21. With the close-end of the bottom of the tapered groove 129 of the holder 79 as the start position of the pressing point, the actuation pin 128 is displaced to the far end.

Accordingly, the pressure of the actuation pin 128 moves the holder 79 toward the input-end side of the input shaft 21 against the urging force of the coil spring 126. As a result, when the actuation pin 128 abuts on the far end of the bottom of the tapered groove 129, the bearing 84 moves to the second action position from the first action position and the displacing-end of the second selector valve 76 is switched to the second displacement position R2 from the first displacement position R1.

Then, the zone which communicates with the port W and the second hydraulic chamber 62 is narrowed and the zone which is connected to the port W and the first hydraulic chamber 61 is widened. That is, over Nin, the area J becomes wider and the area K becomes narrower. Consequently, the amount of the working oil per one stroke which flows out to the second hydraulic chamber 62 from the plunger hole 57 through the port W becomes smaller. Therefore, the stroke volume which communicates with the second hydraulic chamber 62 of the second hydraulic system 200 becomes 0.6VMmax.

The unillustrated shift lever is operated to rotate the ring-shaped member 165 via the hydraulic system 178 to be positioned in the area of the negative rotational position between the neutral position and the first position. In this case too, the slide-contact member 181 (output rotary cylinder 23A) is rotated by the total (sum) of the number of rotations Nin by which the cylinder block 42 is driven via the input shaft 21 and the number of rotations in the forward direction by the action of the projecting pressurization of the second plunger 58 on the slide-contact member 181. The rotation in the forward direction to be imparted to the slide-contact member 181 is transmitted as forward rotation to the final reduction gear unit via the output rotary cylinder 23A, the output gear 24, etc., to carry out the speed increasing action.

As the ring-shaped member 165 is shifted toward the negative rotational position from the neutral position at this time, the stroke volume VP of the first hydraulic system 100 increases to VMmax from 0 and the number of output rotations Nout increases to 2.7Nin from Nin accordingly in FIG. 56. The stroke volume VM of the second hydraulic system 200 when the number of output rotations Nout changes to 2.7Nin from Nin remains at 0.6VMmax. Please see FIG. 16 for the flow of the working oil and how the rotation is made in this state. In this state, the oil removing portion 110 is closed.

When Nout changes from "Nout>Nin" to "Nout<Nin", on the other hand, the displacing-end of the second selector valve 76 is switched to the first displacement position R1 from the second displacement position R2 and the stroke volume VM of the second hydraulic system 200 becomes −VMmax from 0.6VMmax.

(In the Case where the Number of Output Rotations Nout is between 0 and Nin)

In this state, the moving member 116 is always stopped at the engage step portion 114a by the urging force of the coil spring 124, so that a little working oil is permitted to flow out from the second hydraulic chamber 62 (i.e., the hydraulic closing circuit C) to the small-diameter portion 113 of the shaft hole 99 via the oil removing portion 110 and the hole 120. That is, the displacing-end of the second selector valve 76 is positioned at the first displacement position R1.

The unillustrated shift lever is operated to position the ring-shaped member 165 in the area of a positive rotational position from the neutral position. In this case, for the same reason given in the fifth embodiment, the projecting pressurization of the plunger 58 on the slide-contact member 181 gives reverse rotation to that of the "in the case where the number of output rotations Nout is between Nin and 2Nin and exceeds Nin". Therefore, the total (sum) of the number of input rotations in the reverse direction and the number of rotations of the cylinder block 42 in the forward direction rotates the output rotary cylinder 23A and the output gear 24.

As the sum of the number of rotations at this time becomes the number of rotations in the forward direction reduced by the number of rotations in the reverse direction, the number of output rotations Nout becomes smaller as compared with that "in the case where the number of output rotations Nout is Nin".

In this embodiment, when the ring-shaped member 165 is shifted to the second position in FIG. 50 from the neutral position in FIG. 48 at this time, the stroke volume VP of the first hydraulic system 100 increases to −VMmax from 0 and the number of output rotations Nout decreases to 0 from Nin accordingly in FIG. 56.

It is to be noted that the stroke volume VM of the second hydraulic system 200 per rotation when the number of output rotations Nout changes to 0 from Nin is −VMmax. In this state, as described above, a little working oil flows out of the second hydraulic chamber 62 (i.e., the hydraulic closing circuit C) to the small-diameter portion 113 of the shaft hole 99 via the oil removing portion 110 or the like, causing a slight loss. However, the amount of the working oil flowing out is small and the pressure in the second hydraulic chamber 62 (hydraulic chamber B) is lower than that of the first hydraulic chamber 61 (hydraulic chamber A), so that the efficiency of actuation of the plunger 58 which presses the output rotary cylinder 23A for speed reduction is not decreased, thus raising no problem. FIG. 36 is an exemplary diagram in that state.

(In the Case where the Number of Output Rotations Nout is 0)

Next, the unillustrated shift lever is operated to rotate the ring-shaped member 165 via the hydraulic system 178 and position the ring-shaped member 165 at the second position.

In this case, in this embodiment, the stroke volume VP of the first hydraulic system 100 becomes −VMmax. As a result, since of −VP≈−VMmax, the number of rotations in the reverse direction and the number of input rotations Nin at which the cylinder block 42 is driven via the input shaft 21 are balanced out, i.e., the sum of the number of rotations becomes 0 (the number of output rotations Nout is 0) and the output gear 24 stops.

As the ring-shaped member 165 is further rotated via the hydraulic system 178 to be further turned to the positive side from the second position, the absolute value of the stroke volume VP of the first hydraulic system 100 enters the range where it is greater than the absolute value (=VMmax) of the stroke volume VM of the second hydraulic system 200.

Therefore, the absolute value of the stroke volume VM of the second hydraulic system 200 becomes relatively small with respect to the absolute value of the stroke volume VP of the first hydraulic system 100, so that to compensate for it, the reciprocation speed of the plunger 58 of the second hydraulic system 200 should properly become faster in the second hydraulic system 200.

However, the pressure of the second hydraulic chamber 62 is higher as compared with the that of the first hydraulic chamber 61 at this time, so that the high-pressure working oil flows out of the second hydraulic chamber 62 (i.e., the hydraulic closing circuit C) to the small-diameter portion 113 of the shaft hole 99 via the oil removing portion 110 or the like.

Given that L is the maximum amount of loss flowing out from the hydraulic closing circuit C at the time the cylinder block 42 makes one turn, while the difference between the absolute value of the stroke volume VP of the first hydraulic system 100 and the absolute value of the stroke volume VM of the second hydraulic system 200 (|VP|−|VM|) satisfies |VP|−|VM|≦L (=Δ1), |VP| and |VM|+loss amount are balanced out, so that in the second hydraulic system 200, the number of rotations in the reverse direction and the number of input rotations Nin at which the cylinder block 42 is driven via the input shaft 21 are kept balanced out, i.e., the sum of the number of rotations becomes 0 (the number of output rotations Nout is 0) and the output gear 24 maintains the still state (neutral) as per the first embodiment. In FIG. 56, Δ1 indicates the difference between the stroke volumes of both systems until |VP|−|VM| becomes L from 0.

(In the Case where the Number of Output Rotations Nout is Less than 0)

To begin with, a process of displacing the ring-shaped member 165 from the second position to a position where the stroke volume VP of the first hydraulic system 100 becomes −0.6VMmax (hereinafter referred to as a specific position) is executed. At the time of executing this process, the number of output rotations Nout is kept at the state of 0 by changing the stroke volume VM of the second hydraulic system 200 to −0.6VMmax from −VMmax at the same time as the ring-shaped member 165 is displaced to the specific position from the second position from the positive maximum tilt angle position.

At the time of changing the stroke volume VM of the second hydraulic system 200 to −0.6VMmax from −VMmax, the second selector valve 76 is moved to the second displacement position R2 from the first displacement position R1 by compressing the working oil in the shaft hole 99 by driving the unillustrated charge pump as discussed in the "in the case where the number of output rotations Nout exceeds Nin". At this time, the retainer 83 is moved to the second action position from the first action position. In this state, the oil removing portion 110 is closed.

Therefore, the zone where the port W communicates with the second hydraulic chamber 62 becomes narrower and the zone which is connected to the port W and the first hydraulic chamber 61 becomes wider. As a result, the stroke volume which communicates with the second hydraulic system 200 becomes 0.6VMmax.

At the time the number of output rotations Nout is set to less than 0, the following takes place.

The unillustrated shift lever is operated to tilt the ring-shaped member 165 to the positive rotational position via the hydraulic system 178 to be positioned in the area of the positive rotational position from the specific position.

The stroke volume VP of the first hydraulic system 100 is in the range where it becomes larger than the stroke volume VM (=0.6VMmax) of the second hydraulic system 200 (0.6VMmax<VP≦VMmax).

As a result, the stroke volume VM of the second hydraulic system 200 becomes relatively small with respect to the stroke volume VP of the first hydraulic system 100, so that the reciprocation speed of the plunger 58 of the second hydraulic system 200 becomes faster in the second hydraulic system 200.

In this case, for the same reason given in the ninth embodiment, the projecting pressurization of the plunger 58 on the slide-contact member 181 provides reverse rotation to that of the "in the case where the number of output rotations Nout is between Nin and 2Nin and exceeds 2Nin". Therefore, the output rotary cylinder 23A and the output gear 24 are rotated by the number of rotations in the reverse direction. The number of rotations at this time becomes smaller as compared with that when the number of output rotations Nout is 0.

As the ring-shaped member 165 is shifted toward the second position from the specific position, the stroke volume VP of the first hydraulic system 100 increases to −VMmax from −0.6VPmax and the number of output rotations Nout decreases to approximately −0.7Nin from 0 accordingly in FIG. 56. See FIG. 37.

The eleventh embodiment provides the same advantages as the ninth embodiment.

What is claimed is:

1. A hydraulic continuously variable transmission for use with working oil, the hydraulic continuously variable transmission comprising:
   a variable displacement type first hydraulic system having a first plunger and a plunger abutting section which actuates the first plunger;
   a second hydraulic system having a second plunger and provided with an output rotary section which rotates with abutment on the second plunger;
   a cylinder block constructed so as to be rotatable about an axis and provided with a first plunger hole and a second plunger hole which respectively retain the first and second plungers;

a hydraulic closing circuit for connecting the first and second plunger holes and circulating working oil between the first and second lunger holes;

a distributing valve for controlling circulation of the working oil in said hydraulic closing circuit;

a valve hole, formed in said cylinder block, for retaining the distributing valve; and a shaft which penetrates said cylinder block and rotates in synchronism with the cylinder block and around which said output rotary section is rotatably supported, wherein said valve hole is formed in parallel to said shaft, and wherein restriction means is provided which is arranged inclined with respect to said shaft and rotates in synchronism with said cylinder block to reciprocate said distributing valve with the distributing valve being restricted, the restriction means including a retainer which has a top surface facing said cylinder block and a bottom surface opposite to the top surface, and the retainer moves said distributing valve toward the insider of said valve hole via contact with said top surface and moves said distributing valve toward the outside of said valve hole via contact with said bottom surface.

2. A power transmission apparatus which is equipped with a hydraulic continuously variable transmission as recited in claim 1, the power transmission apparatus including:

first control means which controls input of power to said shaft; and second control means which controls an output of torque by said output rotary section.

3. The power transmission apparatus according to claim 2, wherein said first control means has a motor for generating power and a clutch mechanism for selectively transmitting the power of the motor to said shaft, and said second control means has a shift device having an output shaft and said shift device selectively transmits the torque of said output rotary section to said output shaft and changes a rotational direction of the output rotary section to a forward direction or a reverse direction.

4. The hydraulic continuously variable transmission according to claim 1, further including means for releasing pressure of the working oil in the second plunger of said second hydraulic system.

5. A power transmission apparatus which is equipped with a hydraulic continuously variable transmission as recited in claim 4, the power transmission apparatus including:

first control means which controls input of power to said shaft; and second control means which controls an output of torque by said output rotary section.

6. The hydraulic continuously variable transmission according to claim 1, wherein said hydraulic closing circuit has a first hydraulic chamber and a second hydraulic chamber, wherein a zone where the first plunger hole communicates with the first hydraulic chamber and a zone where the first plunger hole communicates with the second hydraulic chamber are set while said cylinder block makes one turn about the axis, a zone where the second plunger hole communicates with the first hydraulic chamber and a zone where the second plunger hole communicates with the second hydraulic chamber are set while the output rotary section makes one turn about the axis with respect to the cylinder block, and there is a range over which a stroke volume of the first hydraulic system exceeds a stroke volume of the second hydraulic system, and wherein oil removing means is provided in one of the first and second hydraulic chambers the pressure of which is lower than that of the other when said output rotary section rotates in the forward direction, and seal means is provided or sealing said oil removing means when the output rotary section rotates in the reverse direction.

7. The hydraulic continuously variable transmission according to claim 6, having displacement means for displacing said restriction means along the axis of said cylinder block and wherein a maximum stroke volume of the first hydraulic system is set larger than a maximum stroke volume of the second hydraulic system.

8. The hydraulic continuously variable transmission according to claim 6, wherein said restriction means is held at any of two different positions along an axial direction of said cylinder block.

* * * * *